(12) United States Patent
Kawano et al.

(10) Patent No.: US 8,170,381 B2
(45) Date of Patent: May 1, 2012

(54) OPTICAL MODULATOR

(75) Inventors: Kenji Kawano, Astugi (JP); Eiji Kawazura, Ebina (JP); Yuji Sato, Atsugi (JP); Masaya Nanami, Zama (JP); Seiji Uchida, Atsugi (JP); Nobuhiro Igarashi, Sagamihara (JP); Toru Nakahira, Atsugi (JP); Satoshi Matsumoto, Tokyo (JP)

(73) Assignee: Anritsu Corporation, Atsugi-shi (JP)

( * ) Notice: Subject to any disclaimer, the term of this patent is extended or adjusted under 35 U.S.C. 154(b) by 260 days.

(21) Appl. No.: 12/678,534

(22) PCT Filed: Sep. 19, 2008

(86) PCT No.: PCT/JP2008/002589
§ 371 (c)(1),
(2), (4) Date: Mar. 17, 2010

(87) PCT Pub. No.: WO2009/037849
PCT Pub. Date: Mar. 26, 2009

(65) Prior Publication Data
US 2010/0209040 A1 Aug. 19, 2010

(30) Foreign Application Priority Data

| Sep. 19, 2007 | (JP) | 2007-242071 |
| Aug. 20, 2008 | (JP) | 2008-211616 |
| Aug. 22, 2008 | (JP) | 2008-213936 |
| Sep. 1, 2008 | (JP) | 2008-223670 |

(51) Int. Cl.
*G02F 1/035* (2006.01)

(52) U.S. Cl. ......................................................... 385/2
(58) Field of Classification Search ....................... 385/2
See application file for complete search history.

(56) References Cited

U.S. PATENT DOCUMENTS

| 2006/0056766 A1* | 3/2006 | Sugiyama ..................... 385/40 |
| 2006/0147145 A1* | 7/2006 | Shinriki et al. ................. 385/3 |
| 2009/0297087 A1* | 12/2009 | Kawano et al. ................ 385/2 |
| 2010/0232736 A1* | 9/2010 | Ichikawa et al. .............. 385/2 |
| 2010/0310206 A1* | 12/2010 | Kawano et al. ................ 385/2 |
| 2010/0329600 A1* | 12/2010 | Sugiyama ....................... 385/2 |

FOREIGN PATENT DOCUMENTS

| JP | 04-288518 | 10/1992 |
| JP | 2004-157500 | 6/2004 |
| JP | 2006-84537 | 3/2006 |

* cited by examiner

*Primary Examiner* — Sung Pak
(74) *Attorney, Agent, or Firm* — Greer, Burns & Crain, Ltd.

(57) ABSTRACT

In an optical modulator comprising substrate 1 having electro-optical effect, two optical waveguides 3a, 3b formed in the substrate, buffer layer 2 formed on the substrate, traveling-wave electrode 4 having center conductor 4a and ground conductors 4b, 4c above the buffer layer, and ridge sections formed with recessed sections 9a to 9c by carving at least a part of the substrate where an electrical field strength of high-frequency electrical signal propagating the traveling-wave electrode is strong, in which the ridge sections include center conductor ridge section 8a having the center conductor formed above and ground conductor ridge section 8b having the ground conductor formed above, and the center conductor ridge section has one of the two optical waveguides formed therein, the recessed sections are practically symmetrical to the center line between the two optical waveguides and the traveling-wave electrode is practically symmetrical to the center line of the center conductor.

22 Claims, 41 Drawing Sheets

OPTICAL MODULATOR

TECHNICAL FIELD

The present invention relates to an optical modulator which modulates incident light entered into an optical waveguide with a high-frequency electrical signal and emits as an optical pulse signal utilizing an electro-optical effect.

BACKGROUND ART

In recent years, a high-speed and high-capacity optical communication system has been realized. To incorporate into such a high-speed and high-capacity optical communication system, the development of a small, high speed, low cost and highly stable optical modulator has been demanded.

As an optical modulator to meet such demand, there is a lithium niobate optical modulator of traveling-wave electrode type (hereinafter referred to as an LN optical modulator) in which an optical waveguide and a traveling-wave electrode are formed on a substrate, such as lithium niobate (LiNbO$_3$) (hereinafter referred to as an LN substrate), which has a so-called electro-optical effect, i.e., an effect of refraction index being changed by an electrical field applied. This LN optical modulator has been applied to high-capacity optical communication systems of 2.5 Gbit/s and 10 Gbit/s because of its excellent chirping characteristics. Recently, an application to an ultrahigh-capacity optical communication system of 40 Gbit/s is being further considered.

Now, LN optical modulators that have been put into practical use or been proposed utilizing the electro-optical effect of lithium niobate will be described below.

First Related Art

FIG. 52 is a perspective view of a so-called ridge type LN optical modulator structured with an LN substrate having a z-cut surface as a first example of optical modulators in related art that is disclosed in Japanese Patent Laid-Open Publication No. H04-288518. FIG. 53 is a cross-sectional view taken along the line A-A' shown in FIG. 52.

An optical waveguide 3 is formed on a z-cut LN substrate 1. The waveguide 3 is an optical waveguide formed with Ti metal by thermal diffusion at a temperature of 1,050 degrees Celsius for approximately 10 hours, and constitutes a Mach-Zehnder interference system (or a Mach-Zehnder optical waveguide). Accordingly, at a section of the optical waveguide 3 where an electrical signal and light interact with each other (also called as an interaction section), two pieces of interaction optical waveguides 3a and 3b, more specifically, two arms of Mach-Zehnder optical waveguide are formed.

On an upper surface of the optical waveguide 3, a SiO$_2$ buffer layer 2 is formed and, on an upper surface of the SiO$_2$ buffer layer 2, a traveling-wave electrode 4 is formed. As for the traveling-wave electrode 4, a coplanar waveguide (CPW) having a single piece of center conductor 4a and two pieces of ground conductors 4b and 4c is used. Typically, the traveling-wave electrode 4 is foamed with Au that is a material of expensive noble metal. A reference numeral 5 represents a conductive layer for preventing temperature drift caused by pyroelectric effect which is inherent in the LN optical modulator made with the z-cut LN substrate 1, and is typically formed of a Si conductive layer. A width S of the center conductor 4a is about 7 μm, and a gap W between the center conductor 4a and the ground conductor 4b or 4c is about 15 μm. For the sake of simplicity of description, the Si conductive layer 5 for preventing temperature drift shown in FIG. 52 is omitted in FIG. 53. Likewise, the discussion hereinafter will be given with the Si conductive layer 5 being omitted.

In the first example in related art, the z-cut LN substrate 1 is carved by etching or the like to form recessed sections 9a, 9b and 9c (or ridge sections 8a and 8b). Reference numerals 10a and 10b represent areas or sections of the ground conductors where the strength of electromagnetic field of high-frequency electrical signal is small and are referred to as circumference sections. The ridge sections 8a and 8b are also called as a center conductor ridge section and a ground conductor ridge section, respectively.

This ridge structure yields excellent characteristics in terms of effective refraction index (or effective microwave refraction index), characteristic impedance, modulation bandwidth, driving voltage, and the like for high-frequency electrical signal. It will be appreciated that the depths of the recessed sections 9a, 9b and 9c (or the heights of the ridge sections 8a and 8b) are emphatically depicted in FIG. 53, and their actual values are about 2 to 5 μm and are small comparing to the thicknesses of the center conductor 4a and ground conductors 4b and 4c which are about 20 μm.

Now, although the first example in related art shows high modulation characteristics as an LN optical modulator, it has exhibited some problems in stability. In other words, temperature drift characteristics turned out to be poor despite the use of the Si conductive layer 5. The cause of the problem is assumed to be attributed to the ridge structure which contributes to the high modulation characteristics.

Now, the details of the cause will be described below. As will be noted in FIG. 53, since the ridge section 8a directly below the center conductor 4a is independent from the ground conductors 4b and 4c, there is no tensile force to pull the ridge section 8a in a direction parallel to the surface of the z-cut LN substrate 1.

On the contrary, in the ridge section 8b, the thick ground conductor 4b of about 20 μm as described earlier is formed together with the recessed section 9c and the circumference section 10b. The thermal expansion coefficient of Au forming the ground conductor 4b on the SiO$_2$ buffer layer 2 and that of the z-cut LN substrate 1 greatly differ from each other. In addition, the width of the z-cut LN substrate 1 is as large as several millimeters (e.g. 1 to 5 mm). On the other hand, since the gap between the interaction optical waveguides 3a and 3b is about 15 μm and being narrow, the widths of the ground conductors 4b and 4c are as large as about a half the width of the z-cut LN substrate 1 (in other words, the circumference sections 10a and 10b are wide). More specifically, as the width of the ground conductor 4b shown in FIG. 53 is also large, stresses such as thermal expansion and thermal contraction attributed to environmental changes are accumulated and the ridge section 8b is subjected to a substantially large stress (or a moment attributed to the thickness thereof being large). Furthermore, as the ridge section 8b is protruded, the ridge section 8b is susceptible to the stress (particularly, the stress caused by the moment). In practice, the width of the ground conductor 4c is also large, and thus the ridge section 8b is also susceptible to its influence.

When the z-cut LN substrate 1 is subjected to the stress, the refraction index of the z-cut LN substrate 1 is changed (birefringence) and thus the refraction index of the interaction optical waveguide 3a is changed as a result, thereby changing a DC bias point for the operation of the LN optical modulator. This is a phenomenon of temperature drift inherent to the ridge structure which impairs the stability of the LN optical modulator. Incidentally, when the ambient temperature of the LN optical modulator was changed from room temperature to 80 degrees Celsius, the changes in the DC bias point of the first example in related art were as large as 6 V.

Second Related Art

FIG. 54 is a cross-sectional view of an interaction section of a second example in related art which is disclosed in Japanese Patent Laid-Open Publication No. 2004-157500 in an attempt to solve the problems in the first example in related art. As will be noted in FIG. 54, while the thickness of a ground conductor 4b' formed on a ridge section 8b and that of a ground conductor 4b'' formed on a circumference section 10b are large, the thickness of a ground conductor 4b''' formed on a recessed section 9c is made as small as, for example, about 300 nm or less. The concept behind this is that the temperature stability can be improved by making the thickness of the ground conductor 4b''' in the recessed section 9c small as the stress exerted to the ridge section 8b by the ground conductor 4b'' which has a wide area can be made small.

Now, the discussion will be given in terms of temperature drift and high-frequency electrical signal propagation below. In the second example in related art, the recessed sections 9a, 9b and 9c which form the ridge sections 8a and 8b and the interaction optical waveguides 3a and 3b are structured to be symmetrical with respect to a center line I provided in the center of the interaction optical waveguides 3a and 3b. The side surfaces of the ridge sections 8a and 8b are slanted (therefore, also called as slant surfaces or slant sections). Since these slant surfaces are not of -z surfaces, their conditions of electrical charges caused by the pyroelectric effect differ from those of the upper surface of the z-cut LN substrate 1 and recessed sections 9a, 9b and 9c which are of -z surfaces.

Therefore, in order to realize excellent temperature drift characteristics, it is desirable that the structure of the recessed sections 9a, 9b and 9c be nearly symmetrical with respect to the center line I which is provided in the center of the interaction optical waveguides 3a and 3b (or the structure of the z-cut LN substrate 1 including the interaction optical waveguides 3a and 3b be nearly symmetrical with respect to a center line provided in the center thereof). In other words, the structure of the second example in related art is suitable for preventing temperature drift. In the structure where the interaction optical waveguides 3a and 3b are symmetrical with respect to the center line provided in the center thereof, when the number of the interaction optical waveguides are two (the interaction optical waveguides 3a and 3b) as in the case of Mach-Zehnder optical waveguide, the number of effective recessed sections (9a, 9b and 9c) becomes odd.

However, it will be noted that the second example in related art has problems in terms of low loss and stable propagation of high-frequency electrical signal as described below. As shown in FIG. 52, the high-frequency electrical signal that is a microwave is propagated through a high-frequency electrical signal feed line 6 and a connector not shown and then applied to the traveling-wave electrode 4. The distribution of electromagnetic field in the high-frequency electrical signal feed line 6 and that of the connector not shown are axisymmetric with respect to their respective center conductors. Further, in the connection section between the connector not shown coupled with the high-frequency electrical signal feed line 6 and the traveling-wave electrode 4 (also referred to as an input feed-through section), the electromagnetic field distribution of high-frequency electromagnetic field is bilaterally symmetrical (i.e. symmetrical with respect to a direction of the substrate surface) with respect to the center conductor of the traveling-wave electrode 4 (a section extending to the connection section where the center conductor 4a of the interaction section is coupled with a core line of the connector not shown).

However, in the second example in related art, the structure of the traveling-wave electrode is asymmetrical with respect to a line II drawn in the center of the center conductor 4a shown in FIG. 54. The structure being asymmetrical means that the distribution of electromagnetic field is also asymmetrical and thus the matching performance to the symmetrical distribution of electromagnetic field at the input feed-through section is poor. As a consequence, when the high-frequency electrical signal is propagated through the traveling-wave electrode 4 which is constituted by the center conductor 4a and ground conductors 4b', 4b''', 4b'' and 4c, since it requires to convert the symmetrical electromagnetic field distribution to the asymmetrical electromagnetic field distribution, the problems in that the electromagnetic field distribution is being unstable, a radiation loss (or a propagation loss) occurs, or the like are likely to appear.

Third Related Art

FIG. 55 is a top view of a third example in related art disclosed in Japanese Patent Laid-Open Publication No. 2006-84537. The z-cut LN substrate 1 has a width of several millimeters, and the gap between the interaction optical waveguides 3a and 3b is about 15 μm. The length of the z-cut LN substrate 1 is about 5 to 7 cm.

FIGS. 56 and 57 show respective cross-sectional views taken along the line B-B' and C-C' shown in FIG. 55. Reference numerals 11a, 11b, 11c and 11d represent void sections formed by recessed sections of 9a, 9b, 9c and 9d, and reference numerals $4b^{(4)}$, $4b^{(5)}$, $4b^{(6)}$, $4c^{(4)}$, $4c^{(5)}$ and $4c^{(6)}$ represent ground conductors. Note that the ground conductor $4b^{(5)}$ couples the ground conductors $4b^{(4)}$ and $4b^{(6)}$. A reference numeral 10c represents a circumference section. Reference numerals 8a, 8b and 8c represent ridge sections. The void sections 11a and 11d are the sections where the conductors are missing in the ground conductor (or windows opened in the ground conductor). Reference numerals 13a and 13d represent embedded sections where the void sections 11a and 11d are embedded with the ground conductors $4b^{(5)}$ and $4c^{(5)}$. In FIGS. 56 and 57, a line IV is the center line of the center conductor 4a, and the traveling-wave electrode is formed to be symmetrical with respect to the center line IV.

As will be noted from the drawings, the widths of the ground conductors $4b^{(4)}$ and $4c^{(4)}$ are narrow in similar degrees to the ground conductor 4b' and the center conductor 4a of the second example in related art shown in FIG. 54. The ground conductors $4b^{(6)}$ and $4c^{(6)}$ are as wide as the ground conductor 4b'' of the second example in related art shown in FIG. 54. Further, in the third example in related art, the thickness of the ground conductor $4b^{(5)}$ which couples the ground conductors $4b^{(4)}$ and $4b^{(6)}$ and the thickness of the ground conductor $4c^{(5)}$ which couples the ground conductors $4c^{(4)}$ and $4c^{(6)}$ are made to be larger than the ground conductor 4b''' of the second example in related art shown in FIG. 54.

However, when the third example in related art was actually made, a serious problem was found in that the temperature drift attributed to the ridge structure could not be prevented by this structure. Now, the problem will be described in terms of pyroelectric effect below.

The ridge sections 8a, 8b and 8c (or the recessed sections 9a, 9b, 9c and 9d) are asymmetrically disposed with respect to a center line III in the center of the interaction optical waveguides 3a and 3b. Since the slant surfaces that are the side surfaces of the ridge sections 8a, 8b and 8c are not of -z surfaces, their distributions of electrical charges by the pyroelectric effect in response to the changes in ambient temperature differ from those of the respective recessed sections and the upper surface of the z-cut LN substrate 1. For this reason, as an uneven distribution of electrical charges (i.e. an uneven distribution of electrical field) occurs which constantly fluctuates in response to the changes in ambient temperature, the interaction optical waveguides 3a and 3b need to be applied with an uneven voltage. While a DC bias needs to be applied from an external circuit to negate this uneven distribution of electrical field, as it inconsistently fluctuates in response to the changes in temperature and is difficult to negate it completely, the influence of temperature drift appears as a result.

SUMMARY OF THE INVENTION

Problem to be Solved by the Invention

As described in the foregoing, the first example in related art proposed as a ridge type LN optical modulator has resulted in temperature drift in which the optimum DC bias point is changed by the stress of the ground conductor attributed to the difference in the thermal expansion coefficients of Au which constitutes the electrode on the $SiO_2$ buffer layer and of the z-cut LN substrate (or the stress by the moment) in response to the changes in temperature. In the second example in related art which is proposed in an attempt to improve the temperature characteristics, although the temperature drift is improved, since the traveling-wave electrode is not symmetrical with respect to the center conductor, it has been found disadvantageous in terms of stable and low-loss propagation of high-frequency electrical signal in mode conversion converting from symmetrical mode to asymmetrical mode. Further, in the third example in related art, while it is found advantageous in terms of stable, low-loss propagation of high-frequency electrical signal as the traveling-wave electrode is symmetrical with respect to the center of the center conductor, since the structure of the ridge sections (or recessed sections) is asymmetrical with respect to the two pieces of optical waveguides, there has been a problem in terms of temperature drift due to the influence of pyroelectric effect at the slant surfaces of the ridge sections in particular. In other words, there is a pressing need to develop an optical modulator which can realize stable temperature characteristics without sacrificing high-speed and low driving voltage capabilities as the optical modulator.

In view of the circumstances described above, it is an object of the present invention to provide an optical modulator of superior optical modulation characteristics with improved stability.

Means for Solving the Problem

In order to solve the problems described above, according to the present invention, an optical modulator comprises a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, the third recessed section in a direction of the optical waveguide, and one portion of the ground conductor where the ground conductor is fanned and another portion of the ground conductor where the ground conductor is not formed are alternately provided above the substrate adjacent to the second recessed section on a side where the center conductor ridge section does not lie and at a position symmetrical to the third recessed section with respect to a center line of the center conductor in the direction of the optical waveguide in a similar manner to the third recessed section.

In the optical modulator according to the present invention, the ground conductor may be structured to be symmetrical with respect to the center line of the center conductor.

In the optical modulator according to the present invention, the ground conductor formed above the third recessed section may have nearly the same thickness as that of the center conductor or at least a part of the ground conductor.

In the optical modulator according to the present invention, the ground conductor formed above the third recessed section may have a thickness smaller than that of the center conductor.

According to the present invention, an optical modulator comprises a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, the ground conductor having a thickness smaller than that of the center conductor is formed above the third recessed section on an entire surface thereof, the ground conductor having a thickness smaller than that of the center conductor is fainted above the substrate adjacent to the second recessed section on a side where the center conductor ridge section does not lie and at a position symmetrical to the third recessed section with respect to a center line of the center conductor on an entire surface thereof, and the ground conductor is structured to be symmetrical with respect to the center line of the center conductor.

In the optical modulator according to the present invention, the ground conductor formed above the substrate adjacent to the third recessed section on a side where the ground conductor ridge section does not lie and in an area away from the third recessed section by a predefined distance where a strength of electromagnetic field of the high-frequency electrical signal is small may be structured to have a thickness smaller than that of the ground conductor in areas other than that area.

In the optical modulator according to the present invention, the ground conductor formed above the substrate adjacent to the second recessed section on a side where the center conductor ridge section does not lie and in an area away from the second recessed section by a predefined distance where a strength of electromagnetic field of the high-frequency electrical signal is small may be structured to have a thickness smaller than that of the ground conductor in areas other than that area.

According to the present invention, an optical modulator comprises a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, one portion of the ground conductor formed having a thickness smaller than that of the center conductor and another portion of the ground conductor formed having nearly the same thickness as that of the center conductor or the ground conductor facing the center conductor are alternately provided above the third recessed section in a direction of the optical waveguide, and one portion of the ground conductor formed having a thickness smaller than that of the center conductor and another portion of the ground conductor formed having nearly the same thickness as that of the center conductor or the ground conductor facing the center conductor are alternately provided above the substrate adjacent to the second recessed section on a side where the center conductor ridge section does not lie and at a position symmetrical to the third recessed section with respect to a center line of the center conductor in the direction of the optical waveguide.

In the optical modulator according to the present invention, when one portion of the ground conductor formed above the third recessed section having a thickness smaller than that of the center conductor is defined as a first thin coupling ground conductor, another portion of the ground conductor formed above the third recessed section having nearly the same thickness as that of the center conductor or the ground conductor facing the center conductor is defined as a first thick coupling ground conductor, one portion of the ground conductor formed at a position symmetrical to the third recessed section with respect to the center line of the center conductor having a thickness smaller than that of the center conductor is defined as a second thin coupling ground conductor, and another portion of the ground conductor formed at a position symmetrical to the third recessed section with respect to the center line of the center conductor having nearly the same thickness as that of the center conductor or the ground conductor facing the center conductor is defined as a second thick coupling ground conductor, the first thin coupling ground conductor and the second thin coupling ground conductor may be provided to be symmetrical with respect to the center line of the center conductor.

In the optical modulator according to the present invention, when one portion of the ground conductor formed above the third recessed section having a thickness smaller than that of the center conductor is defined as a first thin coupling ground conductor, another portion of the ground conductor formed above the third recessed section having nearly the same thickness as that of the center conductor or the ground conductor facing the center conductor is defined as a first thick coupling ground conductor, one portion of the ground conductor formed at a position symmetrical to the third recessed section with respect to the center line of the center conductor having a thickness smaller than that of the center conductor is defined as a second thin coupling ground conductor, and another portion of the ground conductor fanned at a position symmetrical to the third recessed section with respect to the center line of the center conductor having nearly the same thickness as that of the center conductor or the ground conductor facing the center conductor is defined as a second thick coupling ground conductor, the first thin coupling ground conductor and the second thin coupling ground conductor may be formed to be different from one another in at least one of position, length and width in the direction of the optical waveguide.

In the optical modulator according to the present invention, the ground conductor formed above the substrate adjacent to the third recessed section on a side where the ground conductor ridge section does not lie and in an area away from the third recessed section by a predefined distance where a strength of electromagnetic field of the high-frequency electrical signal is small may be structured to have a thickness smaller than that of the ground conductor in areas other than that area.

In the optical modulator according to the present invention, the ground conductor formed above the substrate adjacent to the second recessed section on a side where the center conductor ridge section does not lie and in an area away from the second recessed section by a predefined distance where a strength of electromagnetic field of the high-frequency electrical signal is small may be structured to have a thickness smaller than that of the ground conductor in areas other than that area.

According to the present invention, an optical modulator has a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, one portion of the ground conductor where the ground conductor is formed as a first coupling ground conductor and another portion of the ground conductor where the ground conductor is not formed as a first void section are alternately provided above the third recessed section in a direction of the optical waveguide, one portion of the ground conductor where the ground conductor is formed as a second coupling ground conductor and another portion of the ground conductor where the ground conductor is not formed as a second void section are alternately provided above the substrate adjacent to the second recessed section on a side where the center conductor ridge section does not lie and at a position symmetrical to the third recessed section with respect to a center line of the center conductor in the direction of the optical waveguide, and at least a part of the first void section and the second void section of the ground conductor is formed different from one another in at least one of position, length and width in the direction of the optical waveguide.

According to the present invention, an optical modulator has a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, one portion of the ground conductor where the ground conductor is formed as a first coupling ground conductor and another portion of the ground conductor where the ground conductor is not formed as a first void section are alternately provided above the third recessed section in a direction of the optical waveguide, one portion of the ground conductor where the ground conductor is formed as a second coupling ground conductor and another portion of the ground conductor where the ground conductor is not formed as a second void section are alternately provided above the substrate adjacent to the second recessed section on a side where the center conductor ridge section does not lie and at a position symmetrical to the third recessed section with respect to a center line of the center conductor in the direction of the optical waveguide, and at least a part of the first coupling ground conductor and the second coupling ground conductor is formed different from one another in at least one of position, length, width and thickness in the direction of the optical waveguide.

In the optical modulator according to the present invention, the first coupling ground conductor or the second coupling ground conductor may have nearly the same thickness as that of the center conductor or at least a part of the ground conductor.

In the optical modulator according to the present invention, the first coupling ground conductor or the second coupling ground conductor may have a thickness smaller than that of the center conductor.

In the optical modulator according to the present invention, the ground conductor formed above the substrate adjacent to the third recessed section on a side where the ground conductor ridge section does not lie and in an area away from the third recessed section by a predefined distance where a strength of electromagnetic field of the high-frequency electrical signal is small may be structured to have a thickness smaller than that of the ground conductor in areas other than that area.

In the optical modulator according to the present invention, the ground conductor formed above the substrate adjacent to the second recessed section on a side where the center conductor ridge section does not lie and in an area away from the second recessed section by a predefined distance where a strength of electromagnetic field of the high-frequency electrical signal is small may be structured to have a thickness smaller than that of the ground conductor in areas other than that area.

According to the present invention, an optical modulator has a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, one portion of the ground conductor where the ground conductor is formed as a coupling ground conductor and another portion of the ground conductor where the ground conductor is not formed as a void section are alternately provided above either one of the third recessed section or the substrate adjacent to the second recessed section on a side where the center conductor ridge section does not lie and at a position symmetrical to the third recessed section with respect to a center line of the center conductor in a direction of the optical waveguide, and one portion of the ground conductor formed having a thickness smaller than that of the center conductor and another portion of the ground conductor formed having nearly the same thickness as that of the center conductor or the ground conductor facing the center conductor are alternately provided above the other one of the third recessed section or the substrate adjacent to the second recessed section on a side where the center conductor ridge section does not lie and at a position symmetrical to the third recessed section with respect to a center line of the center conductor in the direction of the optical waveguide.

According to the present invention, an optical modulator has a substrate having an electro-optical effect, two pieces of optical waveguides formed in the substrate, a buffer layer formed on the substrate, a traveling-wave electrode composed of a center conductor and a ground conductor disposed above the buffer layer, and a ridge section structured with a recessed section that is formed by carving at least a part of the substrate in an area where a strength of electrical field of high-frequency electrical signal propagating through the traveling-wave electrode is strong, in which the ridge section includes a center conductor ridge section where the center conductor is formed in an upper portion thereof and a ground conductor ridge section where the ground conductor is formed in an upper portion thereof, the center conductor ridge section is provided with one of the two pieces of optical waveguides, the ground conductor ridge section is provided with the other one of the two pieces of optical waveguides, the recessed section includes a first, a second and a third recessed sections, the second recessed section and the third recessed section are formed at symmetrical positions with respect to a center line of the first recessed section, the center conductor ridge section is formed between the first recessed section and the second recessed section, the ground conductor ridge section is formed between the first recessed section and the third recessed section, the ground conductor is not provided above the first recessed section and the second recessed section, one portion of the ground conductor where the ground conductor is formed as a coupling ground conductor and another portion of the ground conductor where the ground conductor is not formed as a void section are alternately provided above either one of the third recessed section or the substrate adjacent to the second recessed section on a side where the center conductor ridge section does not lie and at a position symmetrical to the third recessed section with respect to a center line of the center conductor in a direction of the optical waveguide, and the ground conductor formed having a thickness smaller than that of the center conductor is provided above the other one of the third recessed section or the substrate adjacent to the second recessed section on a side where the center conductor ridge section does not lie and at a position symmetrical to the third recessed section with respect to the center line of the center conductor on an entire surface thereof.

In the optical modulator according to the present invention, the coupling ground conductor may have nearly the same thickness as that of the center conductor or at least a part of the ground conductor.

In the optical modulator according to the present invention, the coupling ground conductor may have a thickness smaller than that of the center conductor.

In the optical modulator according to the present invention, the ground conductor formed above the substrate adjacent to the third recessed section on a side where the ground conductor ridge section does not lie and in an area away from the third recessed section by a predefined distance where a strength of electromagnetic field of the high-frequency electrical signal is small may be structured to have a thickness smaller than that of the ground conductor in areas other than that area.

In the optical modulator according to the present invention, the ground conductor formed above the substrate adjacent to the second recessed section on a side where the center conductor ridge section does not lie and in an area away from the second recessed section by a predefined distance where a strength of electromagnetic field of the high-frequency electrical signal is small may be structured to have a thickness smaller than that of the ground conductor in areas other than that area.

In the optical modulator according to the present invention, the substrate may be comprised of lithium niobate.

In the optical modulator according to the present invention, the substrate may be comprised of semiconductor.

Effect of the Invention

In the optical modulator according to the present invention, the ridge sections and recessed sections constituting the ridge sections are made to be symmetrical with respect to the center line provided between the two pieces of optical waveguides. Accordingly, the temperature drift problem can be resolved since the distribution of electrical charges (i.e. the distribution of electrical field) caused by the pyroelectric effect in response to the changes in ambient temperature is nearly symmetrical with respect to the center line provided in the center of the two pieces of optical waveguides. Further, by making the traveling-wave electrode symmetrical with respect to the center line of the center conductor, the stable and low-loss propagation of high-frequency electrical signal can be achieved. As a consequence, the present invention has superior advantages of providing an LN optical modulator of a small thermal drift without sacrificing high performances in terms of modulating a ridge type optical modulator. Furthermore, the present invention includes the structure of making the thicknesses of the conductor small in the circumference sections which are the areas (or sections) of ground conductors where the distribution of electromagnetic field of high-frequency electrical signal is small. The structure of making the thicknesses of the conductors in the circumference sections small can alleviate the stress of the conductor caused by the wide ground conductor attributed to the difference in thermal expansion coefficients between the conductor on the $SiO_2$ buffer layer and the z-cut LN substrate when ambient temperature is changed, thereby contributing to further improve temperature drift characteristics. This can also achieve cost reduction as an optical modulator since the usage of Au that is an expensive noble metal can be reduced.

REFERENCE NUMERALS

Figure 1:
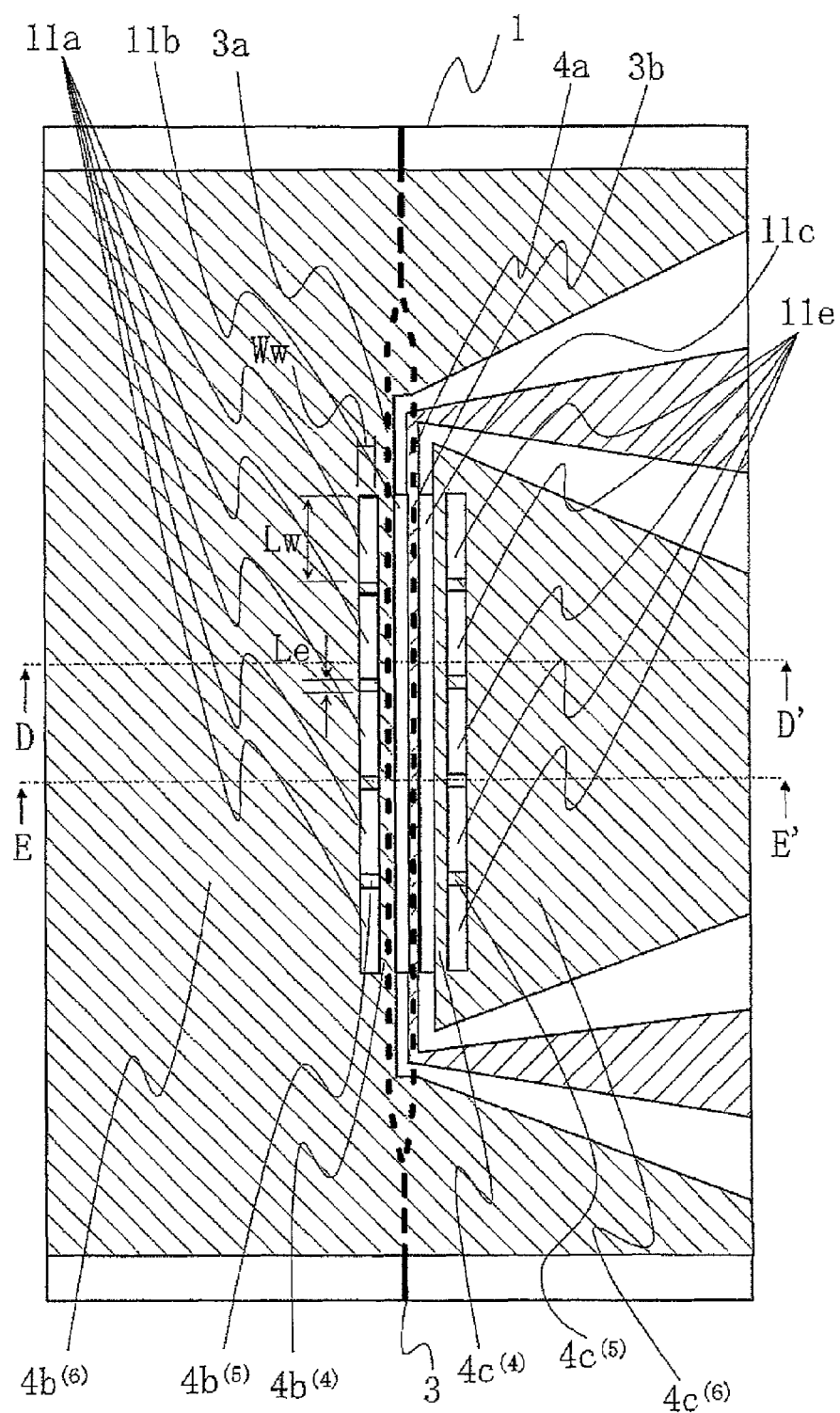
FIG. 1 is a top view schematically illustrating the structure of an optical modulator according to a first embodiment of the present invention.

1: z-cut LN Substrate (LN substrate)
2, 14, 15: $SiO_2$ Buffer Layer (Buffer layer)
3: Mach-Zehnder Optical Waveguide (Optical waveguide)

3a, 3b: Interaction Optical Waveguide constituting Mach-Zehnder optical waveguide
4: Traveling-wave Electrode
4a: Center Conductor
4b, 4b', 4b'', 4b''', 4b$^{(4)}$ to 4b$^{(32)}$, 4b$^{(5)}$', 4b$^{(15)}$', 4c, 4c$^{(4)}$ to 4c$^{(32)}$, 4c$^{(5)}$', 4c$^{(15)}$', 4c$^{(30)}$': Ground Conductor
5: Si Conductive Layer
6: High-frequency (RF) Electrical Signal Feed Line (Microwave input)
7: High-frequency (RF) Electrical Signal Output Line (Microwave output)
8a: Ridge Section (Ridge section for center conductor)
8b, 8c: Ridge Section (Ridge section for ground conductor)
9a, 9b, 9c, 9d: Recessed Section
10a, 10b, 10c, 10d: Circumference Section
11a, 11b, 11e, 11d, 11e, 11f: Void Section (Section where conductor is missing)
13a, 13d: Embedded Section

DESCRIPTION OF THE PREFERRED EMBODIMENTS

Now, embodiments of the present invention will be described hereinafter. Note that the same reference numerals as those of the examples in related art shown in FIGS. 52 through 57 correspond to the same functional sections, and thus their redundant descriptions are omitted here.

First Embodiment

Figure 2:
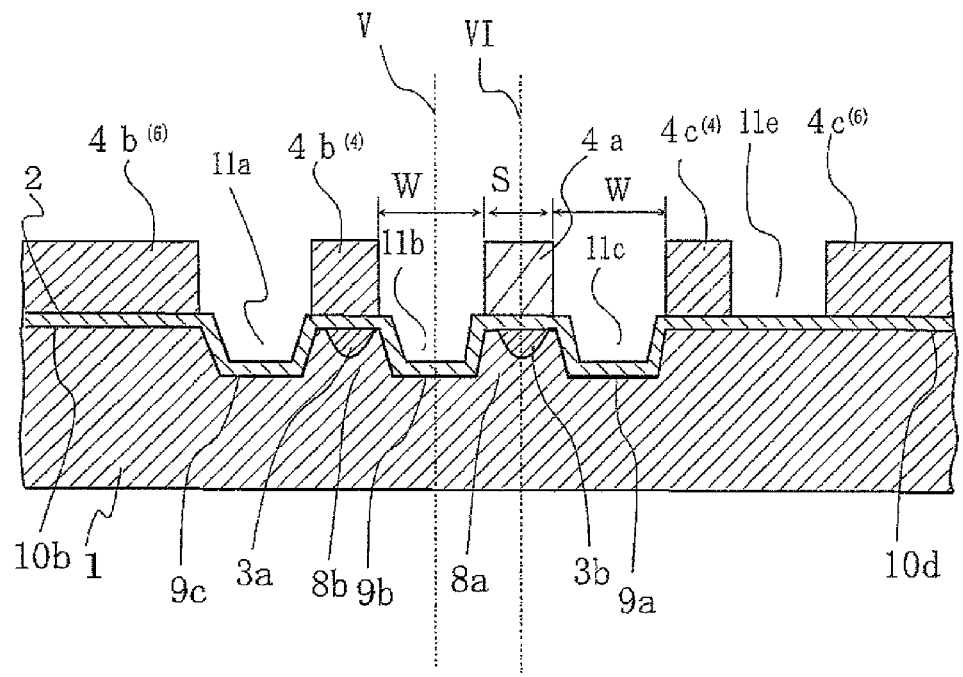
FIG. 2 is a cross-sectional view taken along the line D-D' shown in FIG. 1.
Figure 3:
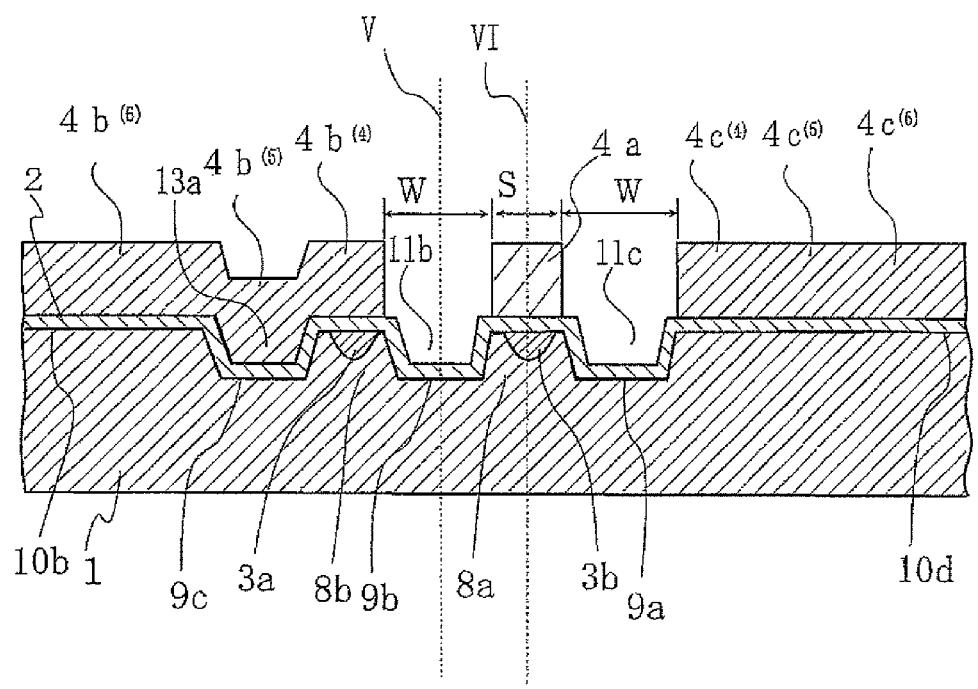
FIG. 3 is a cross-sectional view taken along the line E-E' shown in FIG. 1.

FIG. 1 is a top view illustrating a first embodiment of the present invention. FIGS. 2 and 3 show respective cross-sectional views taken along the lines D-D' and E-E' shown in FIG. 1. Reference numerals 11a, 11b, 11c and 11e represent void sections. Reference numerals 4b$^{(4)}$, 4b$^{(5)}$, 4b$^{(6)}$, 4c$^{(4)}$, 4c$^{(5)}$ and 4c$^{(6)}$ represent ground conductors. The ground conductor 4b$^{(5)}$ couples the ground conductors 4b$^{(4)}$ and 4b$^{(6)}$, and the ground conductor 4c$^{(5)}$ couples the ground conductors 4c$^{(4)}$ and 4c$^{(6)}$ (the ground conductor 4b$^{(5)}$ and the ground conductor 4c$^{(5)}$ are also called as coupling ground conductors).

In the first embodiment, in order to avoid skin effect of high-frequency electrical signal, the thicknesses of the ground conductors 4b$^{(5)}$ and 4c$^{(5)}$ which are the coupling ground conductors are made large. Reference numerals 10b and 10d represent the sections of the ground conductors where the strength of high-frequency electrical signal is small and are referred to as circumference sections. Reference numerals 8a and 8b represent ridge sections. The void sections 11a and 11e are the sections where the conductors are missing in the ground conductor (or windows opened in the ground conductor). A reference numeral 13a represents an embedded section where the void section 11a is embedded with the ground conductor 4b$^{(5)}$.

Underneath the ground conductors 4c$^{(5)}$ and 4c$^{(6)}$ on the side where the optical waveguide is not formed, the recessed section is not formed. In FIG. 2, a line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the optical waveguides. As described in the foregoing, the ridge sections 8a and 8b have slant sections (the side surfaces of the ridge sections 8a and 8b and are also called as slant surfaces as described earlier) where the distribution of electrical charges caused by the pyroelectric effect differs from those of the bottom surfaces of the recessed sections 9a, 9b and 9c and the upper surface of the z-cut LN substrate 1.

What is important in the first embodiment is that, in terms of the interaction optical waveguides 3a and 3b, the recessed sections 9a, 9b and 9c including those slant surfaces are structured to be symmetrical with respect to the center line V which is in the center of the interaction optical waveguides 3a and 3b. Consequently, the distribution of electrical charges, i.e. the distribution of electrical field, by the pyroelectric effect also becomes symmetrical with respect to the center line V, thereby achieving extremely stable characteristics in temperature drift in response to changes in surroundings.

Meanwhile, at lower portions of each of the ground conductors, even when the symmetry of the interaction optical waveguides 3a and 3b is broken by making an additional recessed section in the area where the influence to temperature drift is small, it is still considered referable to the present invention since it is a modification made in the area not influencing the temperature drift. While the number of recessed sections shown in FIGS. 2 and 3 is three, as long as the structure remains symmetrical with respect to the center line provided in the center of the two pieces of optical waveguides, the provision of more pieces of recessed sections is still referable to the present invention. It will be appreciated that the same holds true to all of the embodiments of the present invention.

Figure 4:
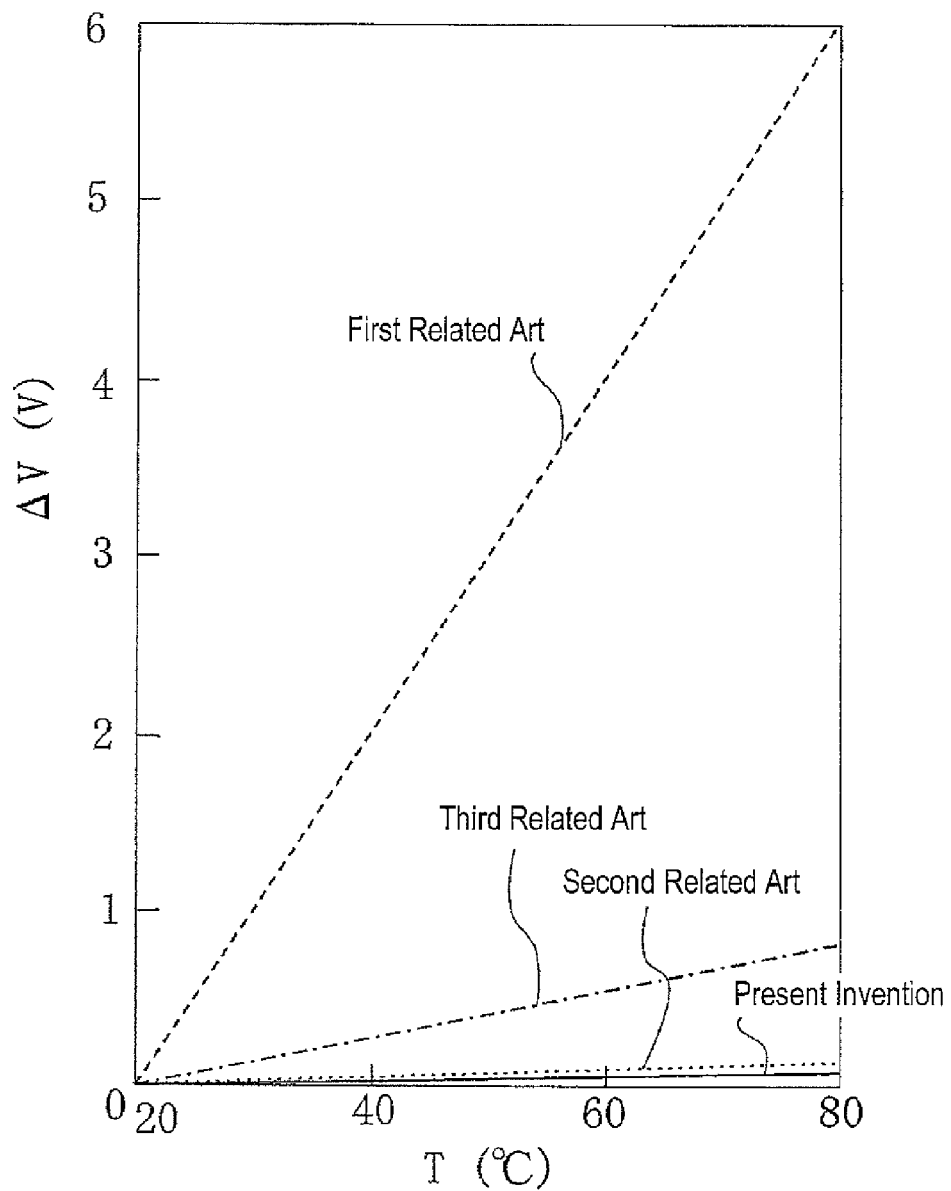
FIG. 4 is a graph illustrating characteristics of the first embodiment.

FIG. 4 shows the experiment results of the first embodiment when ambient temperature T is changed from 20 to 80 degrees Celsius. For the purpose of comparisons, the graph also shows the measurement results of the first, second and third examples in related art. Here, the width S of the center conductor 4a was set as 7 μm, and the gap W between the center conductor 4a and the ground conductor 4b$^{(4)}$ or the ground conductor 4c$^{(4)}$ was set to 15 μm. The widths Ww of the void sections 11a and 11e were set to 15 μm, the lengths Lw thereof were set to 1 mm, and the length Le of the ground conductor 4b$^{(5)}$ was set to 100 μm. As will be noted from the graph, by employing the first embodiment of the present invention, as the traveling-wave electrode is symmetrical with respect to the center line of the center conductor 4a, it was possible to reduce the temperature drift substantially less than the third example in related art which is advantageous in terms of high-frequency optical modulation, thereby verifying the concept of the present invention. While the second example in related art also has excellent characteristics in terms of temperature drift, the second example in related art has a problem in terms of the mode conversion of high-frequency electrical signal as described earlier. Note that, even when the lengths Lw of the void sections 11a and 11e were changed from 30 μm to 3 mm and the length Le of the ground conductor 4b$^{(5)}$ was changed from 5 to 500 μm, the temperature drift was efficiently reduced.

Next, considerations will be given in terms of the distribution of electromagnetic field of high-frequency electrical signal. As will be noted from FIGS. 2 and 3, the center line VI drawn in the center of the center conductor 4a is the axis of symmetry for the traveling-wave electrode composed of the center conductor 4a and the ground conductors 4b$^{(4)}$, 4b$^{(6)}$, 4c$^{(4)}$ and 4c$^{(6)}$. In the first embodiment, this symmetry further holds true even when considered with the ground conductors 4b$^{(5)}$ and 4c$^{(5)}$ included. Accordingly, the traveling-wave electrode of the first embodiment has a structural symmetry with the center line of the center conductor 4a as the axis of symmetry. The structure of the traveling-wave electrode being symmetrical means the distribution of electromagnetic field of high-frequency electrical signal which propagates through the traveling-wave electrode is also symmetrical.

Figure 54:
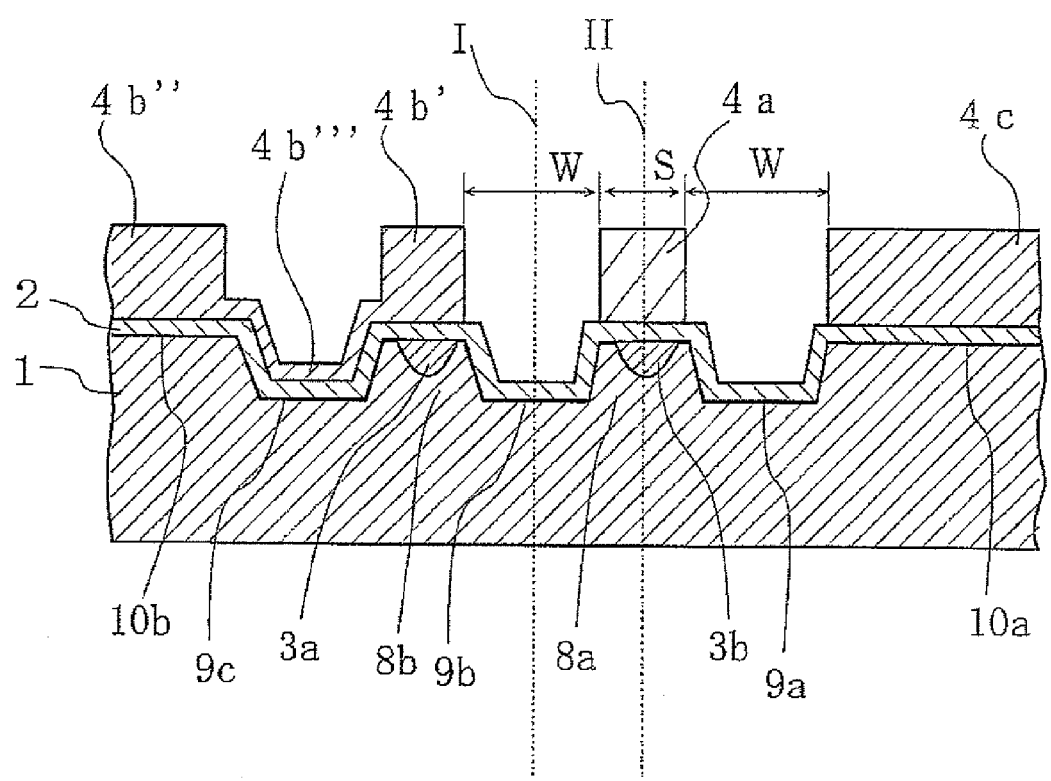
FIG. 54 is a cross-sectional view schematically illustrating the structure of an optical modulator of a second example in related art.
Figure 55:
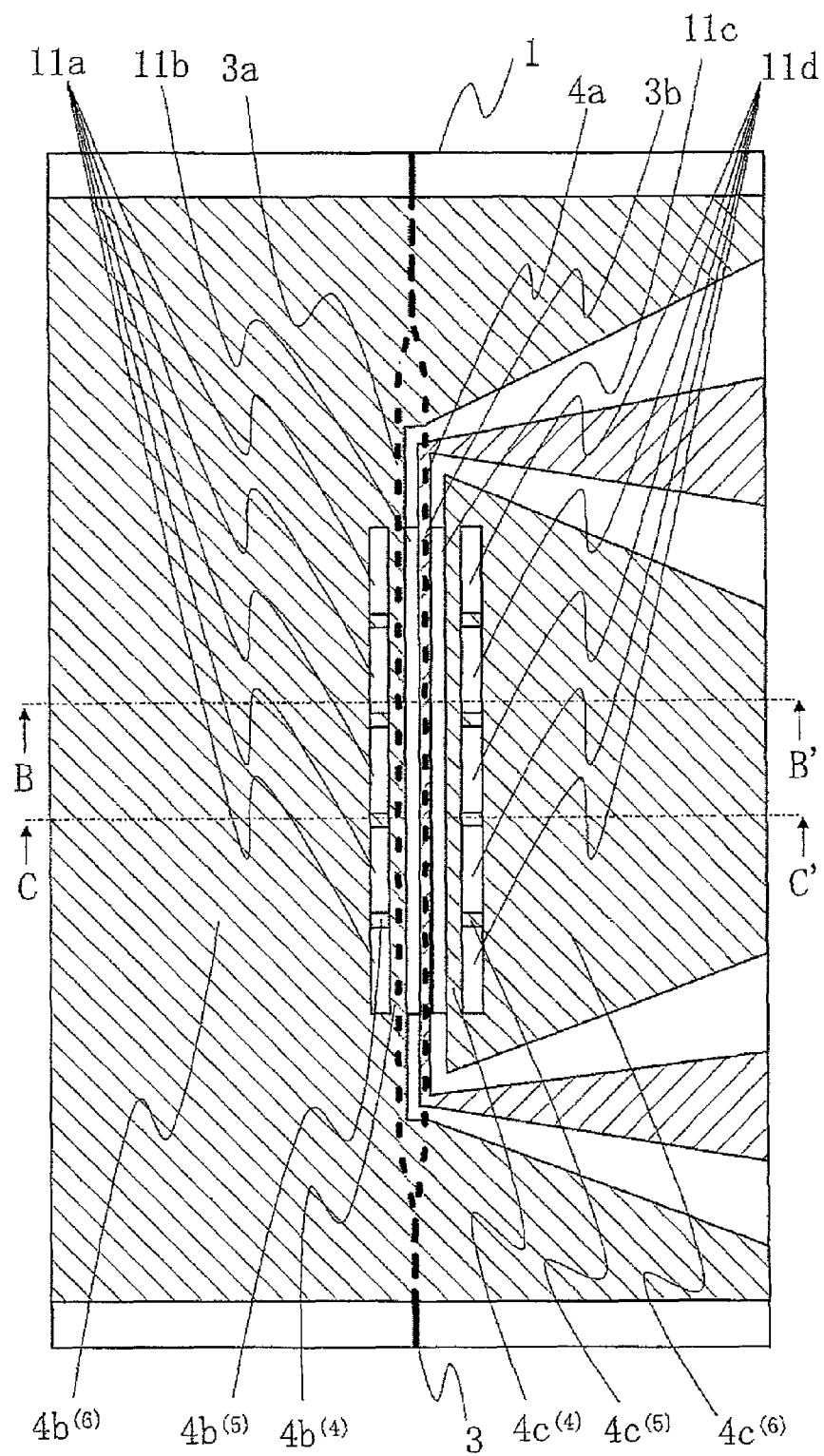
FIG. 55 is a top view schematically illustrating the structure of an optical modulator of a third example in related art.
Figure 56:
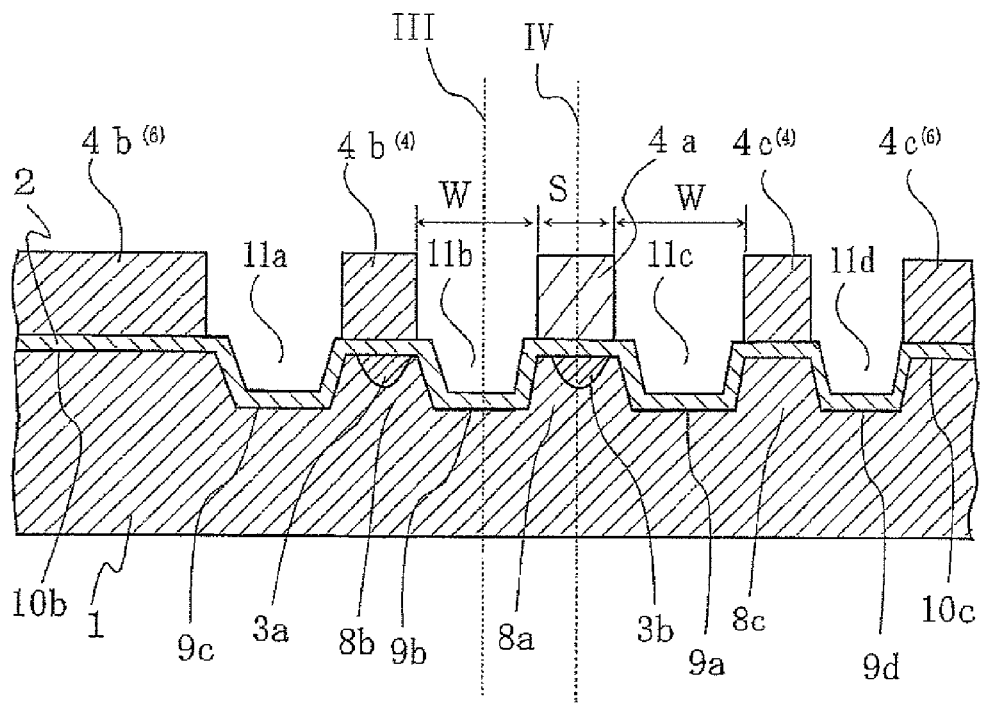
FIG. 56 is a cross-sectional view taken along the line B-B' shown in FIG. 55.
Figure 57:
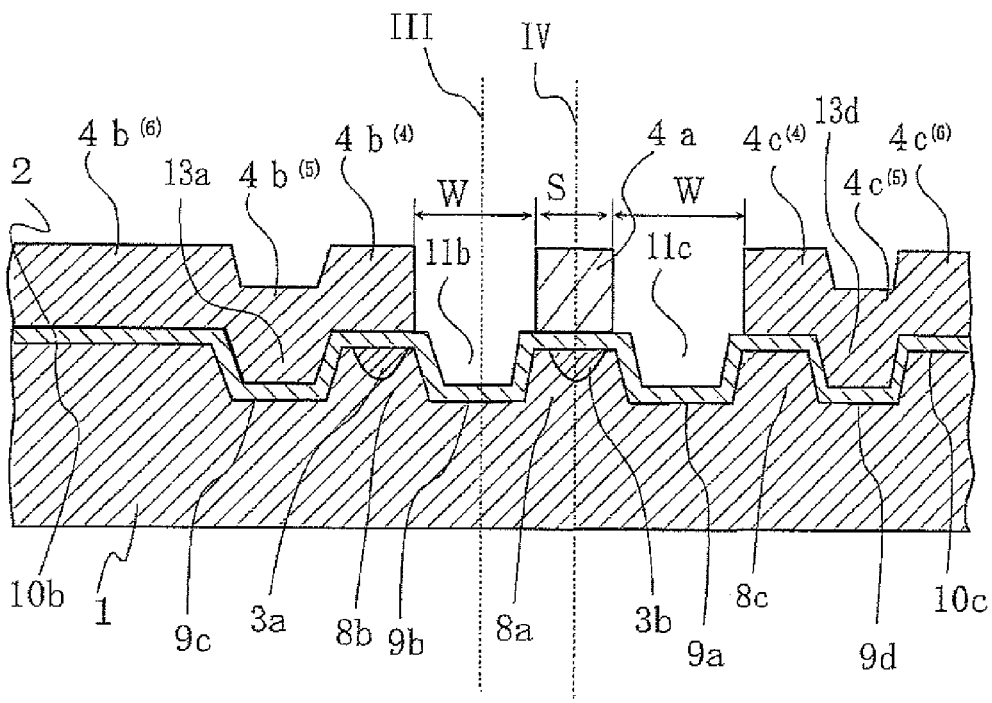
FIG. 57 is a cross-sectional view taken along the line C-C' shown in FIG. 55.

Therefore, it becomes unnecessary to convert modes from the symmetrical mode of symmetrical high-frequency electrical signal at the connector and the input feed through section to the asymmetrical mode at the traveling-wave electrode which is required in the second example in related art shown in FIG. 54, and thus the stable, low-loss propagation of high-frequency electrical signal can be achieved.

The effect of the present invention can be exercised even when the recessed sections are not strictly symmetrical with respect to the center line V provided in the center of the interaction optical waveguides 3a and 3b. The width of the ground conductor $4b^{(4)}$ may differ from that of the center conductor 4a by the amount of a few micrometers. The center conductor and the ground conductors over the interaction optical waveguides 3a and 3b including the above difference are regarded as symmetrical (or substantially symmetrical) with respect to the center line V provided in the center of the interaction optical waveguides 3a and 3b. Likewise, the effect of the present invention can be exercised even when the structure of the traveling-wave electrode is not strictly symmetrical with respect to the center line VI. The same applies to all of the embodiments of the present invention.

As described above, in the first embodiment, by making the structure relating to the optical waveguide symmetrical with respect to the center line V provided in the center of the two pieces of optical waveguides and making the structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

Second Embodiment

Figure 5:
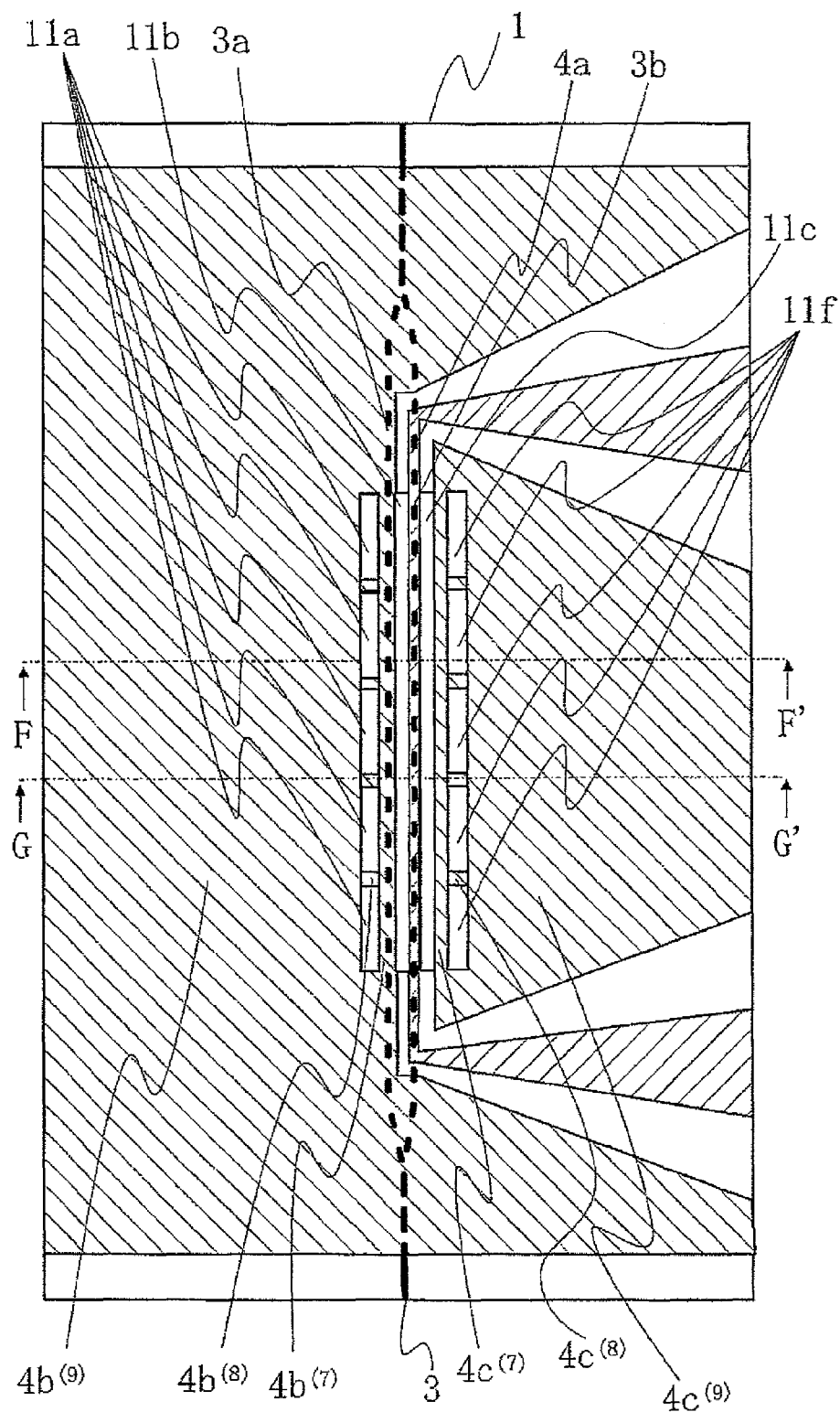
FIG. 5 is a top view schematically illustrating the structure of an optical modulator according to a second embodiment of the present invention.
Figure 6:
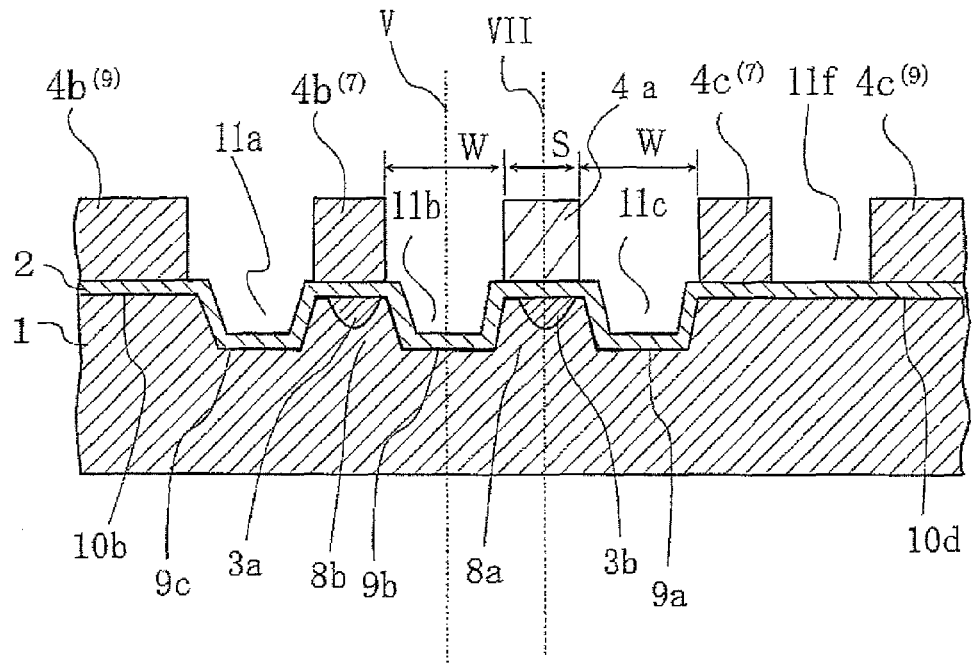
FIG. 6 is a cross-sectional view taken along the line F-F' shown in FIG. 5.
Figure 7:
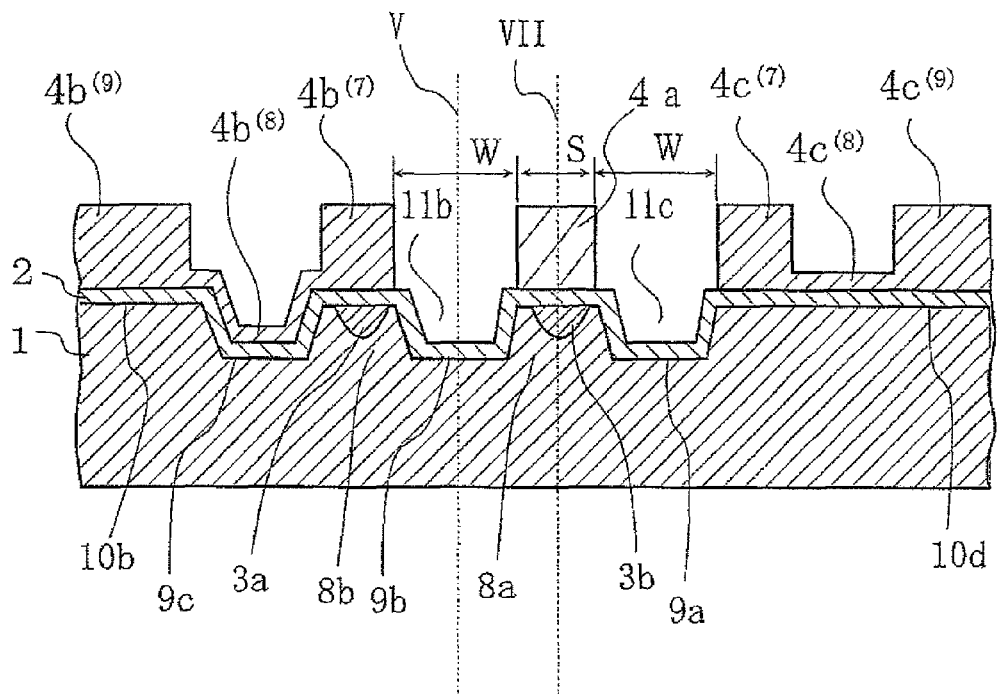
FIG. 7 is a cross-sectional view taken along the line G-G' shown in FIG. 5.

FIG. 5 is a top view illustrating a second embodiment of the present invention. FIGS. 6 and 7 show respective cross-sectional views taken along the lines F-F' and G-G' shown in FIG. 5. Reference numerals 11a, 11b, 11c and 11f represent void sections. Reference numerals $4b^{(7)}$, $4b^{(8)}$, $4b^{(9)}$, $4c^{(7)}$, $4c^{(8)}$ and $4c^{(9)}$ represent ground conductors. The ground conductor $4b^{(8)}$ couples the ground conductors $4b^{(7)}$ and $4b^{(9)}$, and the ground conductor $4c^{(8)}$ couples the ground conductors $4c^{(7)}$ and $4c^{(9)}$ (the ground conductor $4b^{(8)}$ and the ground conductor $4c^{(8)}$ are also called as coupling ground conductors). Reference numerals 10b and 10d represent circumference sections. Reference numerals 8a and 8b represent ridge sections. The void sections 11a and 11f are the sections where the conductors are missing in the ground conductor (or windows opened in the ground conductor).

In FIG. 6, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, as described with reference to FIG. 2 of the first embodiment, the line V is the axis of symmetry for the interaction optical waveguides 3a and 3b. As described earlier, the ridge sections 8a and 8b have slant sections (the side surfaces or slant surfaces of the ridge sections 8a and 8b) where the distribution of electrical charges caused by the pyroelectric effect differs from those of the bottom surfaces of the recessed sections 9a, 9b and 9c and the upper surface of the z-cut LN substrate 1. In the second embodiment, in terms of the interaction optical waveguides 3a and 3b, since the recessed sections 9a, 9b and 9c including such slant sections are structured to be symmetrical with respect to the center line V, the distribution of electrical charges, i.e. the distribution of electrical field, by the pyroelectric effect is also symmetrical with respect to the center line V, and thus the temperature drift in response to the changes in surroundings becomes extremely stable.

Next, in the same manner as the first embodiment, considerations will be given in terms of the distribution of electromagnetic field of high-frequency electrical signal. As will be noted from FIGS. 6 and 7, a center line VII drawn in the center of the center conductor 4a is the axis of symmetry for the traveling-wave electrode composed of the center conductor 4a and the ground conductors $4b^{(7)}$, $4b^{(9)}$, $4c^{(7)}$ and $4c^{(9)}$. In the second embodiment, this symmetry further holds true even when considered with the ground conductors $4b^{(8)}$ and $4c^{(8)}$ included. Accordingly, in the second embodiment, since the traveling-wave electrode has a structural symmetry with respect to the center of the center conductor 4a as the axis of symmetry, comparing to the second example in related art shown in FIG. 54 which does not have a structural symmetry, the symmetrical electromagnetic field at the connector and the input feed through section can be stably propagated with low loss.

As described above, in the second embodiment, by making the structure relating to the optical waveguide symmetrical with respect to the center line V provided in the center of the two pieces of optical waveguides and making the structure relating to the traveling-wave electrode symmetrical with respect to the center line VII of the center conductor, comparing to the cases without having their structural symmetry, the temperature drift in response to the changes in ambient temperature is reduced, the mode of high-frequency electrical signal is stabilized, and the high-frequency electrical signal is propagated with low-loss.

In comparison with the drawings shown in FIGS. 3 and 7, since the thicknesses of the coupling ground conductors $4b^{(8)}$ and $4c^{(8)}$ shown in FIG. 7 are smaller than those of the coupling ground conductors $4b^{(5)}$ and $4c^{(5)}$ shown in FIG. 3, the coupling ground conductors $4b^{(8)}$ and $4c^{(8)}$ are somewhat less advantageous for fast optical modulation in terms of the skin effect. The coupling ground conductors $4b^{(8)}$ and $4c^{(8)}$ shown in FIG. 7 may not need to be patterned (i.e., no provision of missing sections). In this case, however, the temperature drift characteristics are deteriorated to some extent since the thin conductors push the ridge section 8b.

Third Embodiment

Figure 8:
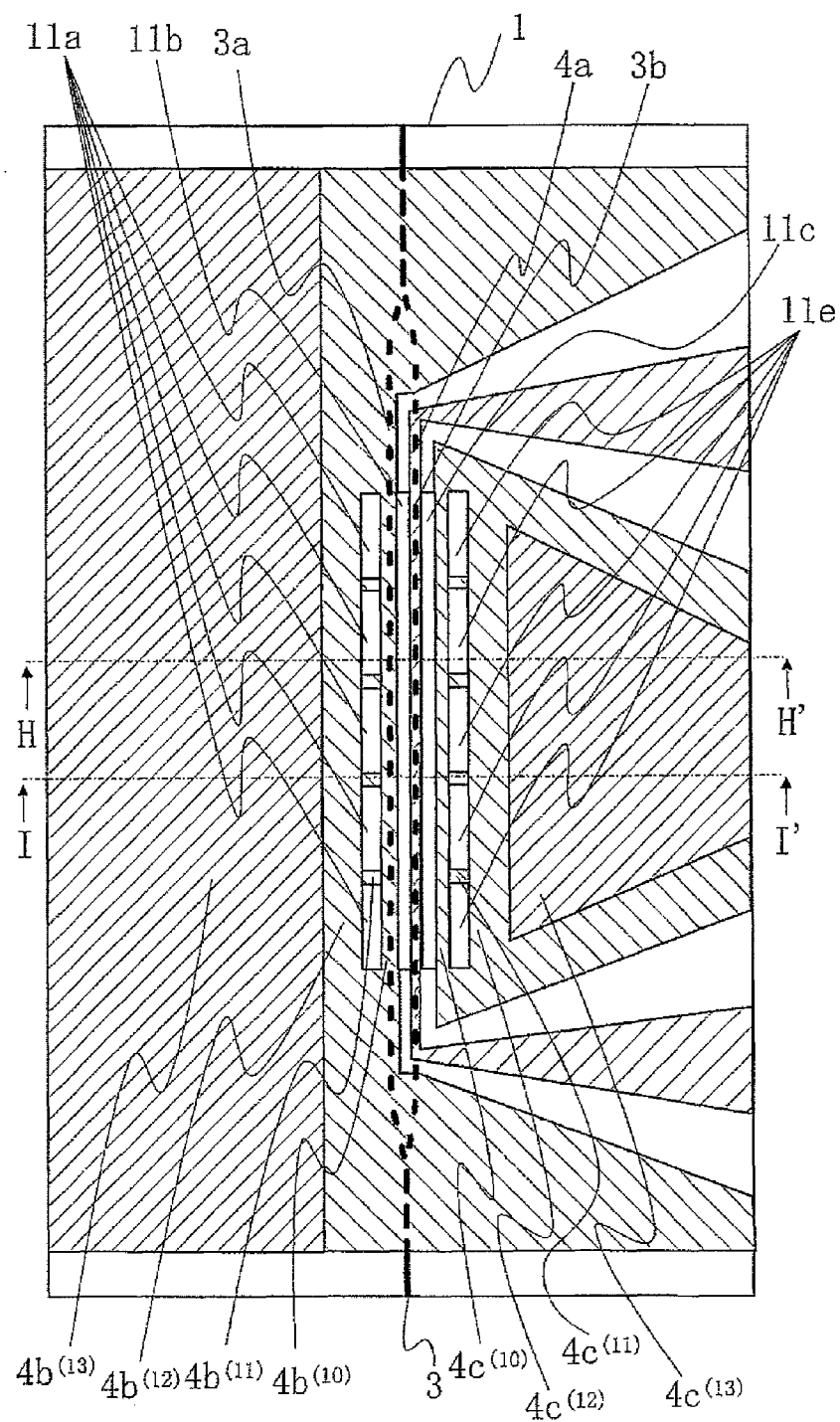
FIG. 8 is a top view schematically illustrating the structure of an optical modulator according to a third embodiment of the present invention.
Figure 9:
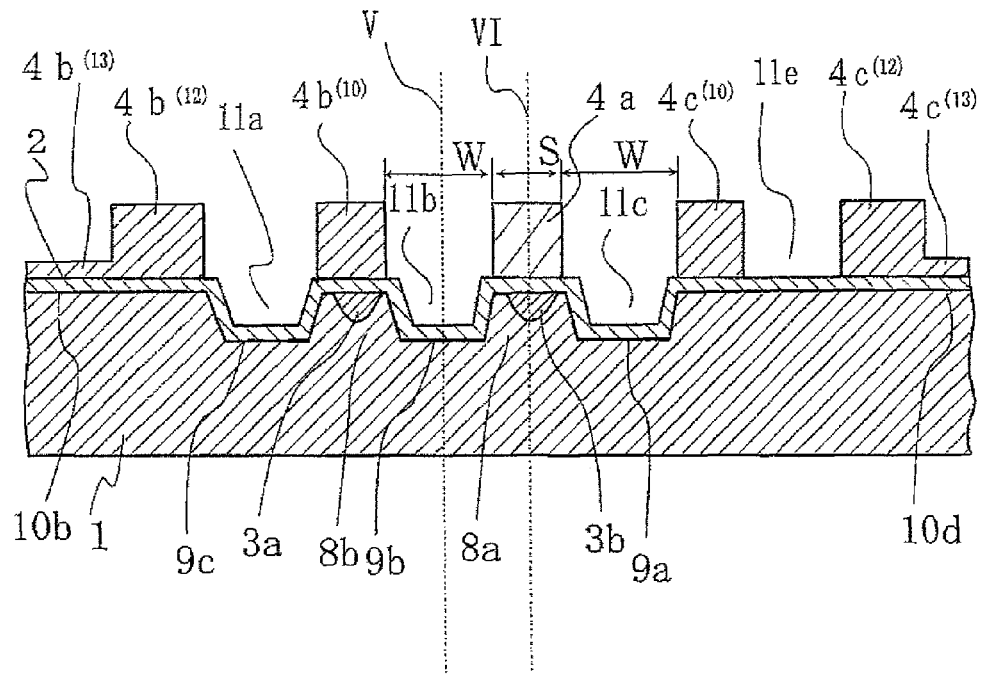
FIG. 9 is a cross-sectional view taken along the line H-H' shown in FIG. 8.
Figure 10:
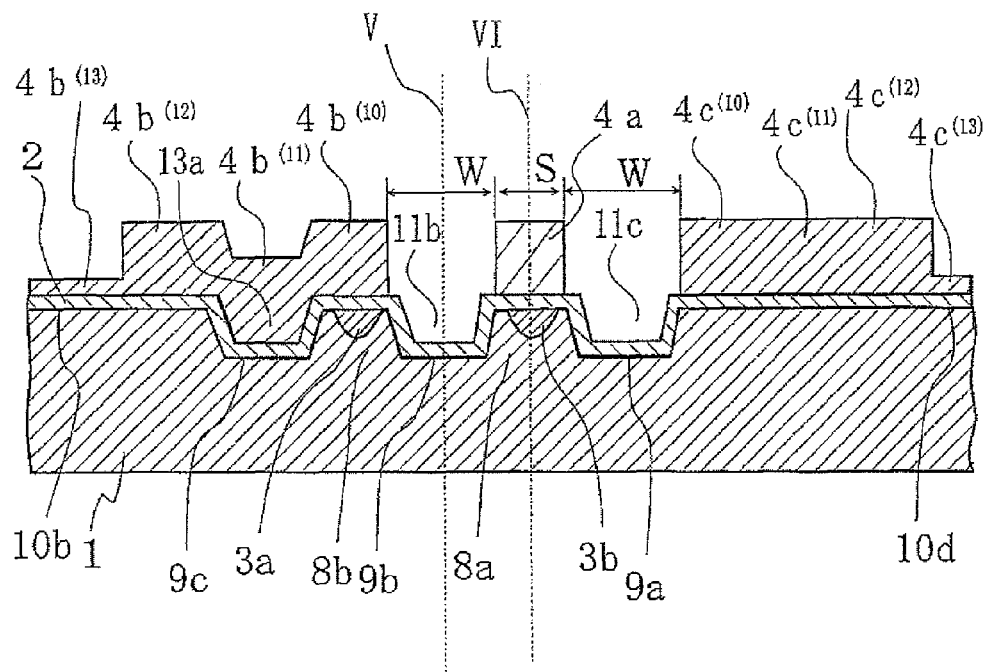
FIG. 10 is a cross-sectional view taken along the line I-I' shown in FIG. 8.

FIG. 8 is a top view illustrating a third embodiment of the present invention. FIGS. 9 and 10 show respective cross-sectional views taken along the lines H-H' and I-I' shown in FIG. 8. Reference numerals 11a, 11b, 11c and 11e represent void sections. Reference numerals $4b^{(10)}$, $4b^{(12)}$, $4b^{(13)}$, $4c^{(10)}$, $4c^{(12)}$ and $4c^{(13)}$ represent ground conductors. The ground conductor $4b^{(11)}$ couples the ground conductors $4b^{(10)}$ and $4b^{(12)}$, and the ground conductor $4c^{(11)}$ couples the ground conductors $4c^{(10)}$ and $4c^{(12)}$ (the ground conductor $4b^{(11)}$ and the ground conductor $4c^{(11)}$ are also called as coupling ground conductors). Reference numerals 10b and 10d represent the sections where the strength of high-frequency electrical signal is small, i.e. circumference sections. Reference numerals 8a and 8b represent ridge sections. The void sections 11a and 11e are the sections where the conductors are missing in the ground conductor (or windows opened in the ground conductor).

In the third embodiment as shown in FIG. 9, the structure relating to the optical waveguides is made such that the recessed sections 9a, 9b and 9c are symmetrically disposed with respect to the center line V which is in the center of two pieces of the interaction optical waveguides 3a and 3b. This is an important element for obtaining excellent temperature drift characteristics. The center line VI drawn in the center of the center conductor 4a is the axis of symmetry for the traveling-wave electrode composed of the center conductor 4a and the ground conductors $4b^{(10)}$, $4b^{(12)}$, $4b^{(13)}$, $4c^{(10)}$, $4c^{(12)}$ and $4c^{(13)}$. Furthermore, this symmetry holds true even when considered with the ground conductors $4b^{(11)}$ and $4c^{(11)}$ included. Accordingly, in the third embodiment, since the traveling-wave electrode has a structural symmetry with respect to the center of the center conductor 4a as the axis of symmetry, the high-frequency electrical signal propagates through the traveling-wave electrode in symmetrical mode. Consequently, it has a good matching with the distribution of electromagnetic field which is symmetrical at the connector and the input feed through section, and thus the high-frequency electrical signal can be propagated in stable mode and with low-loss.

Figure 11:
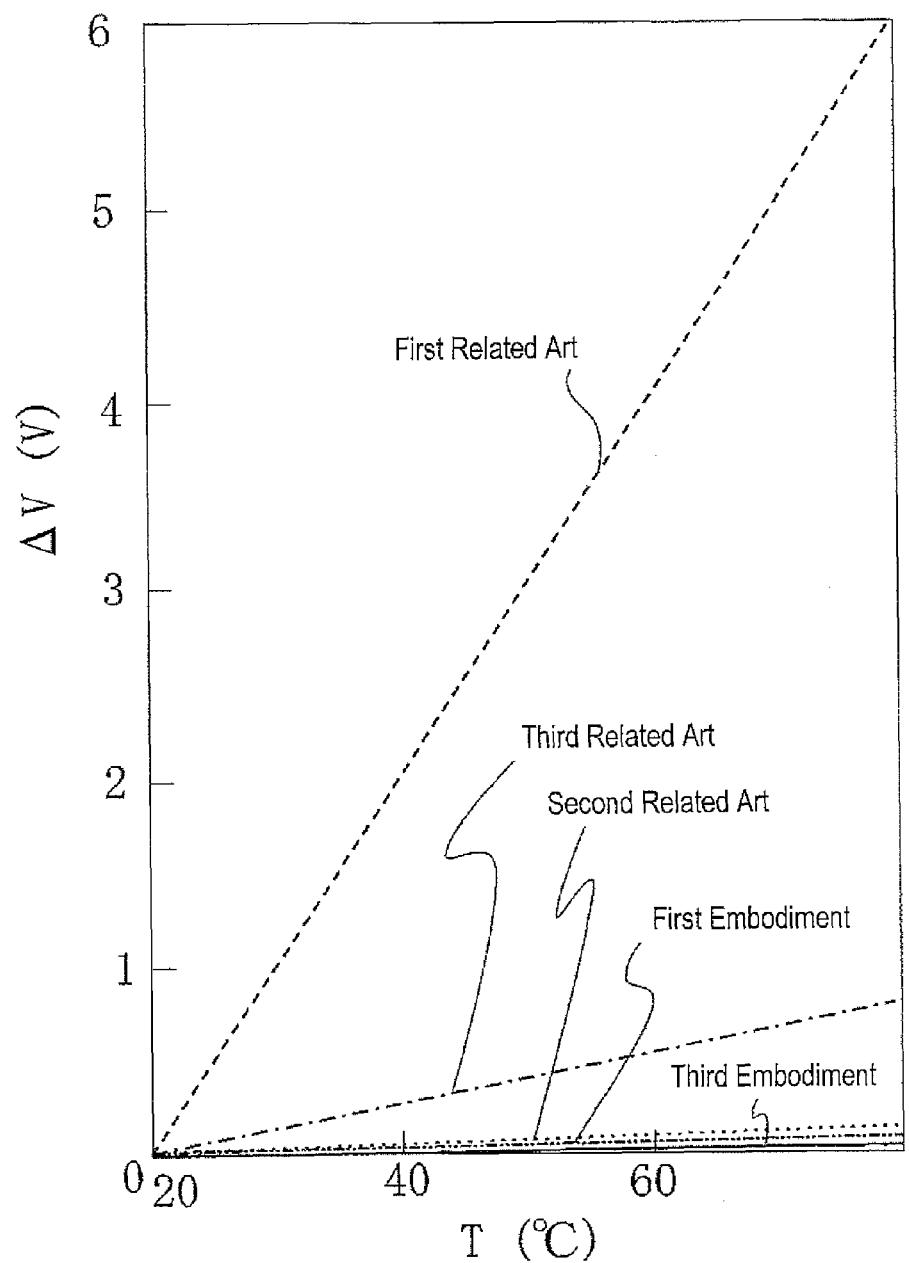
FIG. 11 is a graph illustrating characteristics of the third embodiment.

The matter highlighted in the third embodiment is that the thicknesses of the ground conductors $4b^{(13)}$ and $4c^{(13)}$ are as small as, for example, 300 nm. When the thickness of the ground conductor is large, the stress due to the principle of leverage (or the stress by the moment) exerted to the z-cut LN substrate 1 and eventually to the ridge sections 8a and 8b becomes large. Therefore, in the third embodiment, the thickness of the ground conductor $4b^{(13)}$ in the circumference section 10b is made small to make the stress small. Furthermore, in order to further enhance the effect of the present invention, the thickness of the ground conductor $4c^{(13)}$ formed on the circumference section 10d is also made small. By implementing this measure, as shown in FIG. 11, the temperature drift of the DC bias corresponding to the changes in ambient temperature in the range of 20 to 80 degrees Celsius was further reduced from that of the first embodiment.

As described in the foregoing, considering the gap between the interaction optical waveguides 3a and 3b being about 15 µm, the width of the interaction section where the high-frequency electrical signal and the light passing through the interaction optical waveguides 3a and 3b interact with each other is extremely narrow comparing to the width of the z-cut LN substrate 1 (about 1 to 5 mm). Consequently, by making the thicknesses of the ground conductors $4b^{(13)}$ and $4c^{(13)}$ small, the usage amount of Au that is expensive can be substantially reduced, and thus contributing to cost reduction.

In addition, the ground conductors $4b^{(13)}$ and $4c^{(13)}$ having wide areas, although being small in thickness, make them advantageous for securely establishing an electrical earth in terms of high-frequency electrical signal and in terms of connectivity by wire or ribbon to the chassis that is the electrical earth. The same applies to all of the embodiments of the present invention.

Consequently, it will be appreciated that the concept of improving temperature drift without deteriorating the modulation characteristics by making the thickness of the ground conductor small in the circumference section where the high-frequency electrical signal is small can also be applied to the second embodiment shown in FIGS. 5 to 7. In FIGS. 9 and 10, making the thickness of only either one of the ground conductors $4b^{(13)}$ or $4c^{(13)}$ small is still effective to some degree. Further, since the strength of electromagnetic field of high-frequency electrical signal in the circumference section is small originally, the symmetry being broken in such degree has small influence on the propagation characteristics of high-frequency electrical signal. The same applies to all of the embodiments of the present invention.

First to Third Embodiments

In the first to the third embodiments of the present invention, while the traveling-wave electrode has been described as bilaterally symmetrical with respect to the center line of the center conductor, this applies to the main structure. For example, in FIG. 1, the void sections 11a and 11e and the coupling ground conductors $4b^{(5)}$ and $4c^{(5)}$ are absolutely symmetrical with respect to the center line of the center conductor 4a. While being absolutely symmetrical is most desirable in terms of stable propagation of high-frequency electrical signal, it will be appreciated that, for example, the coupling ground conductors $4b^{(5)}$ and $4c^{(5)}$ may be shifted against one another (up and down directions of the drawing in FIG. 1) and the void sections may be formed to the very edge of the interaction section in its longitudinal direction. In other words, even if the structure is not strictly symmetrical, as long as the main elements are nearly symmetrical, it is still referable to the present invention.

Further, in FIG. 2 for example, the void section 11e between two pieces of the thick ground conductors on the side where the optical waveguide is not formed (e.g. $4c^{(4)}$ and $4c^{(6)}$ shown in FIG. 2) may be eliminated and, in its place, a thin ground conductor may be formed on the entire surface thereof.

Furthermore, as for the coupling ground conductors $4b^{(5)}$ and $4c^{(5)}$ shown in FIG. 3, for example, the conductors having a nearly identical thickness to that of the center conductor 4a may be used as in the first embodiment, or a combination of a thick conductor and a thin conductor may be used for the coupling ground conductors $4b^{(5)}$ and $4c^{(5)}$, respectively.

While the Mach-Zehnder optical waveguide is used as an example of a branching optical waveguide, the present invention can be applied to other optical waveguides of branching and multiplexing types such as a directional coupler. The concept can also be applied to the optical waveguides of three or more pieces and to a phase modulator having a single optical waveguide. When it is applied to the phase modulator, the single piece of optical waveguide and the traveling-wave electrode become symmetrical with respect to the center line of the center conductor. As for the method of forming the optical waveguide, other than the Ti thermal diffusion method, various forming methods of optical waveguides such as a proton-exchange method may be used. As for the buffer layer, various materials other than $SiO_2$ such as $Al_2O_3$ may be used.

While the z-cut LN substrate has been described, LN substrates of other plane directions such as an x-cut and a y-cut may be used, and substrates of different materials such as a lithium tantalate substrate or even a semiconductor substrate may also be used. Further, while the electrode has been described as a traveling-wave electrode, since a lumped parameter electrode may be used in principle, the scope of the traveling-wave electrode in the present invention also includes the lumped parameter electrode.

In addition, while each of the recessed sections is normally formed with nearly the same width, when the recessed section close to the circumference section is etched to be quite wide (as the height of the circumference section comes to nearly the same as the bottom portion of the recessed section), it is still referable to the present invention since the widely etched portion can be regarded as a practical circumference section.

Fourth Embodiment

Figure 12:
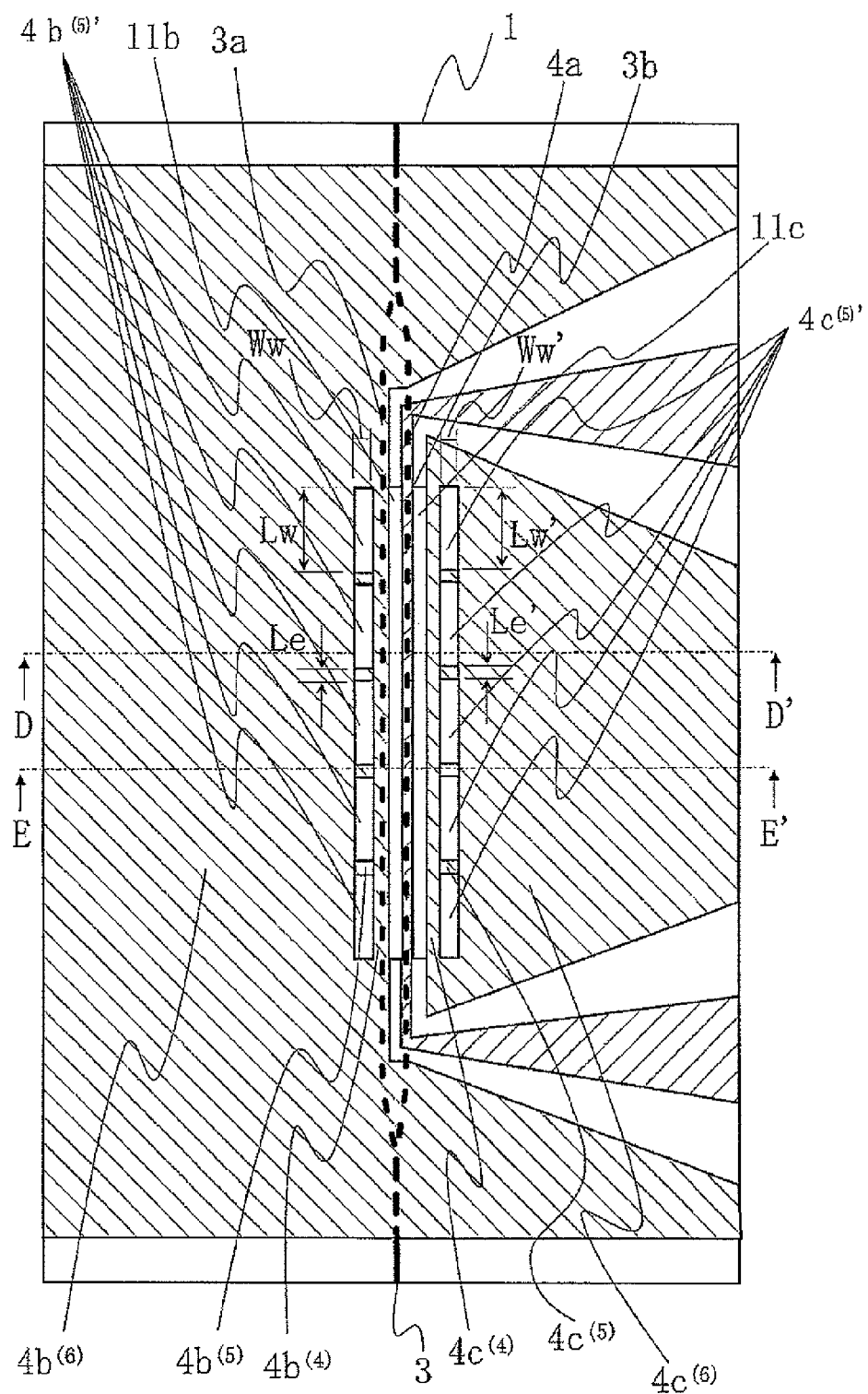
FIG. 12 is a top view schematically illustrating the structure of an optical modulator according to a fourth embodiment of the present invention.
Figure 13:
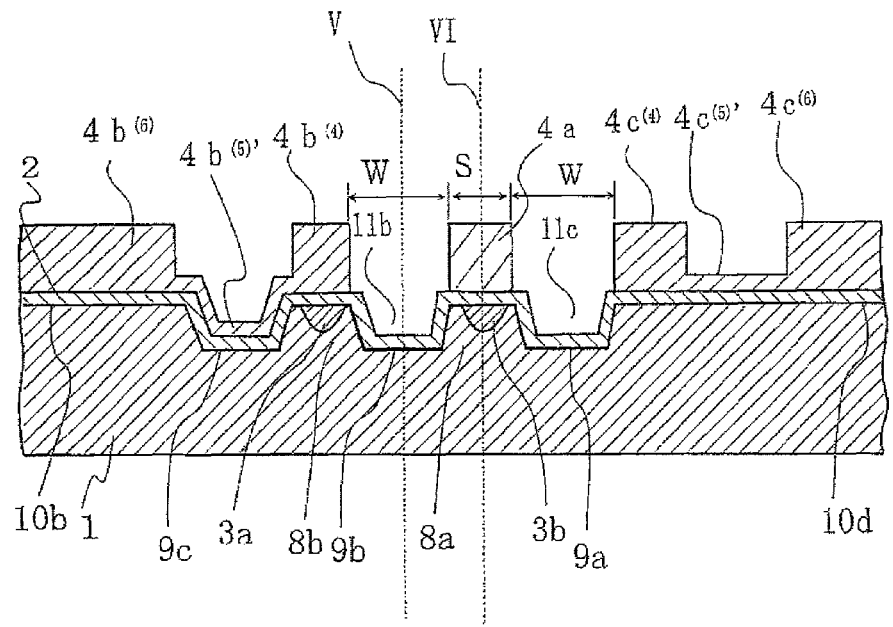
FIG. 13 is a cross-sectional view taken along the line D-D' shown in FIG. 12.
Figure 14:
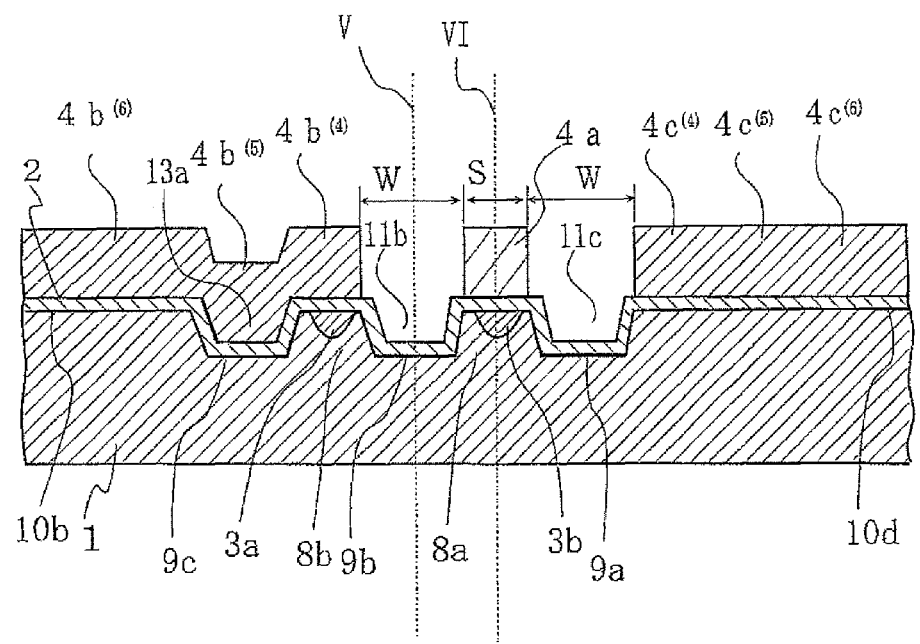
FIG. 14 is a cross-sectional view taken along the line E-E' shown in FIG. 12.

FIG. 12 is a top view illustrating a fourth embodiment of the present invention. FIGS. 13 and 14 show respective cross-sectional views taken along the lines D-D' and E-E' shown in FIG. 12. Reference numerals 11b and 11c represent void sections. Reference numerals $4b^{(4)}$, $4b^{(5)}$, $4b^{(5)"}$, $4b^{(6)}$, $4c^{(4)}$, $4c^{(5)}$, $4c^{(5)"}$, and $4c^{(6)}$ represent ground conductors.

The thicknesses of the ground conductor $4b^{(5)}$ and the ground conductor $4c^{(5)}$ are large, hence they are also called as thick ground conductors, while the thicknesses of the ground conductor $4b^{(5)"}$ and the ground conductor $4c^{(5)"}$ are small, hence they are also called as thin ground conductors. Reference numerals 10b and 10d represent the sections of the ground conductors where the strength of high-frequency electrical signal is small, and are referred to as circumference sections. Reference numerals 8a and 8b represent ridge sections.

The thick ground conductor $4b^{(5)}$ and the thin ground conductor $4b^{(5)"}$ couple the ground conductors $4b^{(4)}$ and $4b^{(6)}$, and the thick ground conductor $4c^{(5)}$ and the thin ground conductor $4c^{(5)"}$ couple the ground conductors $4c^{(4)}$ and $4c^{(6)}$ (the thick ground conductor $4b^{(5)}$ and the thin ground conductor $4b^{(5)"}$ and the thick ground conductor $4c^{(5)}$ and the thin ground conductor $4c^{(5)"}$ are also called as coupling ground conductors).

In the fourth embodiment, the thicknesses of the ground conductors $4b^{(5)}$ and $4c^{(5)}$ that are the coupling ground conductors are made large in order to avoid the influence of the skin effect of high-frequency electrical signal. Further, while the thicknesses of the thin ground conductors $4b^{(5)"}$ and $4c^{(5)"}$ are set to be small, e.g. 50 to 500 nm, so that the temperature drift becomes substantially small, the thin ground conductors $4b^{(5)"}$ and $4c^{(5)"}$ are structured with Au that is a low electrical resistance material. Consequently, comparing to the case where Au is missing in those sections, the loss in the propagation of high-frequency electrical signal becomes smaller. The above values of thickness for the thin ground conductors $4b^{(5)"}$ and $4c^{(5)"}$ are merely examples and not limited as such.

Note that, under the thick ground conductor $4c^{(5)}$ and the thin ground conductor $4c^{(5)"}$ on the side where the optical waveguide is not formed, the recessed section is not formed. In FIG. 13, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the optical waveguides. As described earlier, the ridge sections 8a and 8b have slant sections (the side surfaces of the ridge sections 8a and 8b and are also called as slant surfaces as described earlier) where the distribution of electrical charges caused by the pyroelectric effect differs from those of the bottom surfaces of the recessed sections 9a, 9b and 9c and the upper surface of the z-cut LN substrate 1.

What is important here in the fourth embodiment is that, in terms of the interaction optical waveguides 3a and 3b, the recessed sections 9a, 9b and 9c including those slant surfaces are structured to be symmetrical with respect to the center line V. Consequently, the distribution of electrical charges, i.e. the distribution of electrical field, caused by the pyroelectric effect also becomes symmetrical with respect to the center line V, thereby achieving extremely stable characteristics in temperature drift in response to the changes in surroundings.

Meanwhile, at a lower portion of each of the ground conductors, even when the symmetry of the interaction optical waveguides 3a and 3b is broken by making an additional recessed section in the area where the influence to temperature drift is small, it is still considered referable to the present invention as it is a modification made in the area not influencing the temperature drift. While the number of recessed sections shown in FIGS. 13 and 14 is three, as long as the structure remains to be symmetrical with respect to the center line provided in the center of the two pieces of optical waveguides, the provision of more pieces of recessed sections is still referable to the present invention. It will be appreciated that the same holds true to all of the embodiments of the present invention.

Figure 15:
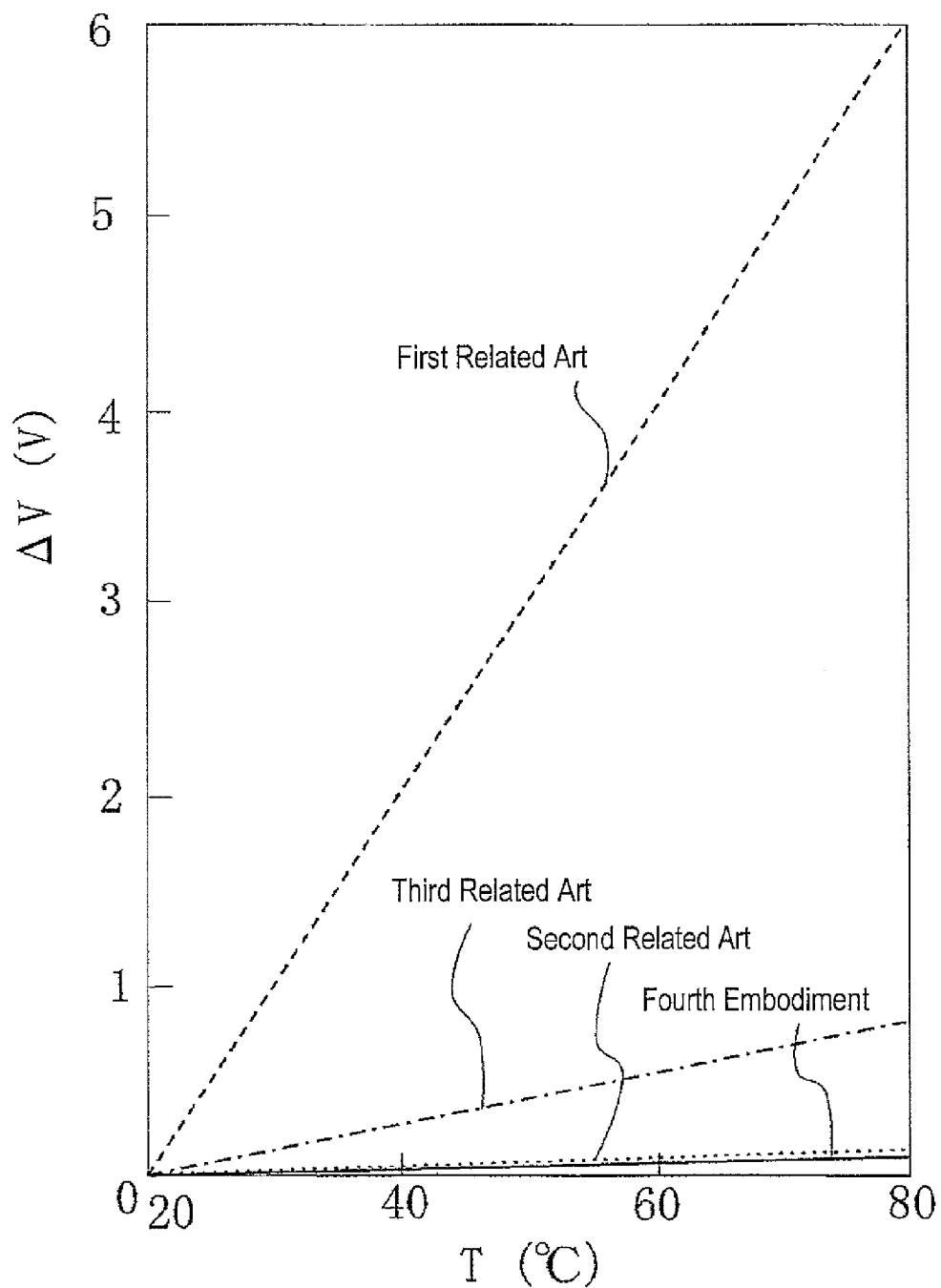
FIG. 15 is a graph illustrating characteristics of the fourth embodiment.

FIG. 15 shows the results of experiment of the fourth embodiment when the ambient temperature T is changed from 20 to 80 degrees Celsius. For the purpose of comparisons, the graph also shows the measurement results of the first, second and third examples in related art. Here, the width S of the center conductor 4a was set as 7 μm, and the gap W between the center conductor 4a and the ground conductor $4b^{(4)}$ or the ground conductor $4c^{(4)}$ was set to 15 μm. The width Ww of the thin ground conductor $4b^{(5)"}$ was set to 15 μm, the length Lw thereof was set to 1 mm, and the length Le of the thick ground conductor $4b^{(5)}$ was set to 100 μm. As will be understood from the graph, by employing the fourth embodiment of the present invention, as the traveling-wave electrode is symmetrical with respect to the center line of the center conductor 4a, it was possible to reduce the temperature drift substantially less than the third example in related art which has the recessed sections 11a, 11b, 11c and 11d asymmetrically disposed with respect to the interaction optical waveguides 3a and 3b and is advantageous in terms of high-frequency optical modulation. Accordingly, the concept of the present invention was verified. While the second example in related art also has excellent characteristics in terms of temperature drift, the second example in related art has a problem in terms of the mode conversion of high-frequency electrical signal as described earlier. Note that, even when the length Lw of the thin ground conductor $4b^{(5)"}$ was changed from 30 μm to 3 mm and the length Le of the thick ground conductor $4b^{(5)}$ was changed from 5 to 500 μm, the temperature drift was efficiently reduced.

In the above description, for the sake of simplifying the description of the principle of the present invention, it is assumed that the width Ww and the length Lw of the thin ground conductor $4b^{(5)"}$ and the width Ww' and the length Lw' of the thin ground conductor $4c^{(5)"}$ are the same, respectively, and the length Le of the thick ground conductor $4b^{(5)}$ and the length Le' of the thick ground conductor $4c^{(5)}$ are the same. However, the present invention is not limited as such. Further, the number of the thin ground conductor $4b^{(5)"}$ and thick ground conductor $4b^{(5)}$ and the number of the thin ground conductor $4c^{(5)"}$ and thick ground conductor $4c^{(5)}$ may be different from one another. This applies to all of the embodiments of the present invention. The lengths and widths of the ground conductors (the coupling ground conductors) described above are with respect to the longitudinal direction of the interaction optical waveguides 3a and 3b.

Next, considerations will be given in terms of the distribution of electromagnetic field and the propagation loss of high-frequency electrical signal. As will be noted from FIGS. 13 and 14, the center line VI drawn in the center of the center conductor 4a is the axis of symmetry for the traveling-wave electrode composed of the center conductor 4a and the ground conductors $4b^{(4)}$, $4b^{(5)"}$, $4b^{(6)}$, $4c^{(4)}$, $4c^{(5)"}$ and $4c^{(6)}$. In the fourth embodiment, this symmetry further holds true even when considered with the ground conductors $4b^{(5)}$ and $4c^{(5)}$ included. Accordingly, the traveling-wave electrode of the fourth embodiment has a structural symmetry with respect to the center line of the center conductor 4a as the axis of symmetry.

The structure of the traveling-wave electrode being symmetrical means the distribution of electromagnetic field of high-frequency electrical signal which propagates through the traveling-wave electrode is also symmetrical. Therefore, it becomes unnecessary to convert modes from the symmetrical mode of symmetrical high-frequency electrical signal at the connector and the input feed through section to the asymmetrical mode at the traveling-wave electrode which is required in the second example in related art shown in FIG. 54, and thus the stable and low-loss propagation of high-frequency electrical signal can be achieved.

In the fourth embodiment, the thicknesses of the ground conductors $4b^{(5)}$ and $4c^{(5)}$ that are the coupling ground conductors are made large in order to avoid the influence of the skin effect of high-frequency electrical signal. Further, while the thicknesses of the ground conductors $4b^{(5)"}$ and $4c^{(5)"}$ that are the coupling ground conductors of another kind are set to be small so as to substantially reduce the temperature drift, the ground conductors $4b^{(5)"}$ and $4c^{(5)"}$ are made of Au which is a low electric resistance material. Consequently, comparing to the case where Au is missing in those sections, the loss in the propagation of high-frequency electrical signal becomes smaller.

The effect of the present invention can be exercised even when the recessed sections are not strictly symmetrical with respect to the center line V provided in the center of the interaction optical waveguides 3a and 3b. The width of the ground conductor $4b^{(4)}$ may differ from that of the center conductor 4a by the amount of a few micrometers. The center conductor and the ground conductors over the interaction optical waveguides 3a and 3b including the above difference are regarded as symmetrical (or substantially symmetrical) with respect to the center line V provided in the center of the interaction optical waveguides 3a and 3b. Likewise, the effect of the present invention can be exercised even when the structure of the traveling-wave electrode is not strictly symmetrical with respect to the center line VI. The same applies to all of the embodiments of the present invention.

As described above, in the fourth embodiment, by making the structure relating to the optical waveguide symmetrical with respect to the center line V provided in the center of the two pieces of optical waveguides and making the structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

Fifth Embodiment

Figure 16:
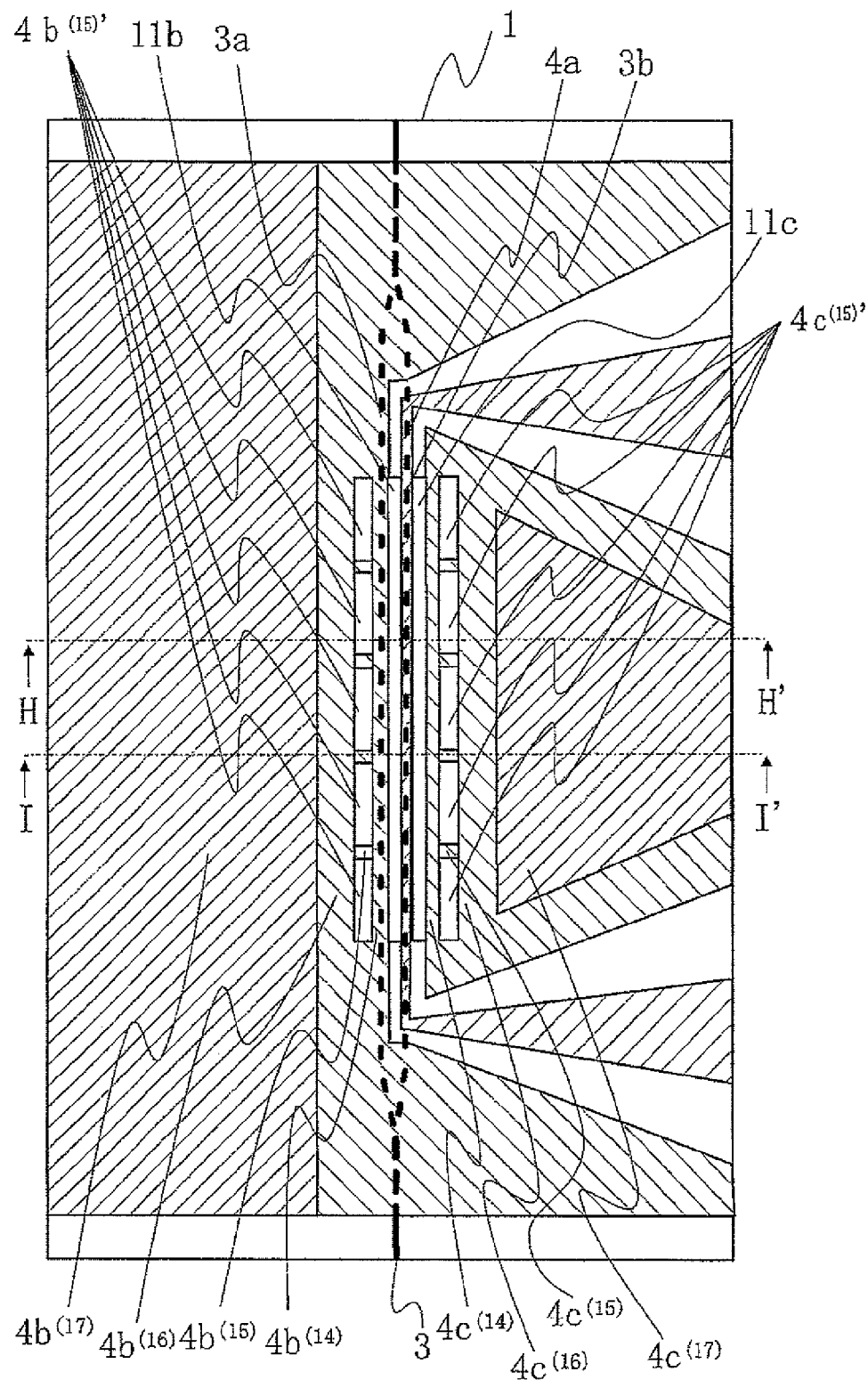
FIG. 16 is a top view schematically illustrating the structure according to an optical modulator of a fifth embodiment of the present invention.
Figure 17:
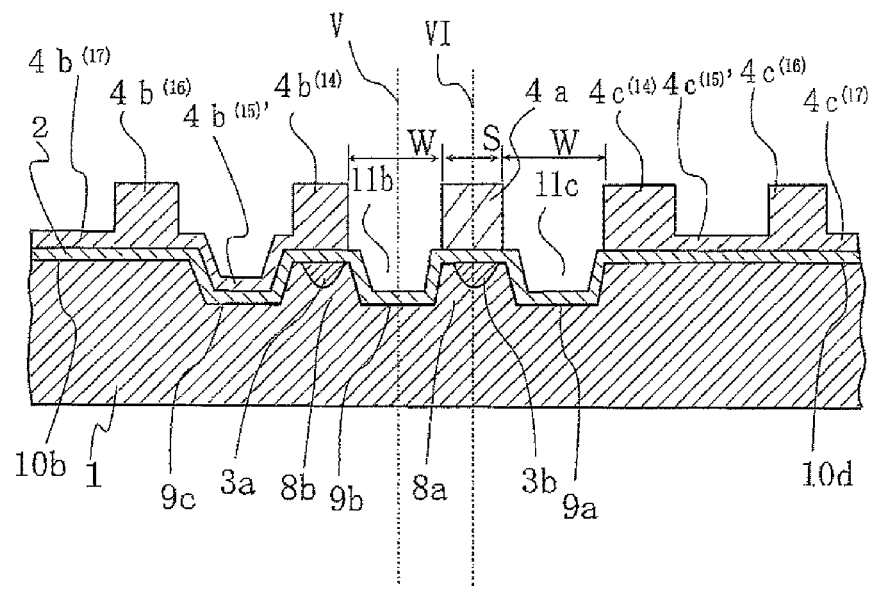
FIG. 17 is a cross-sectional view taken along the line H-H' shown in FIG. 16.
Figure 18:
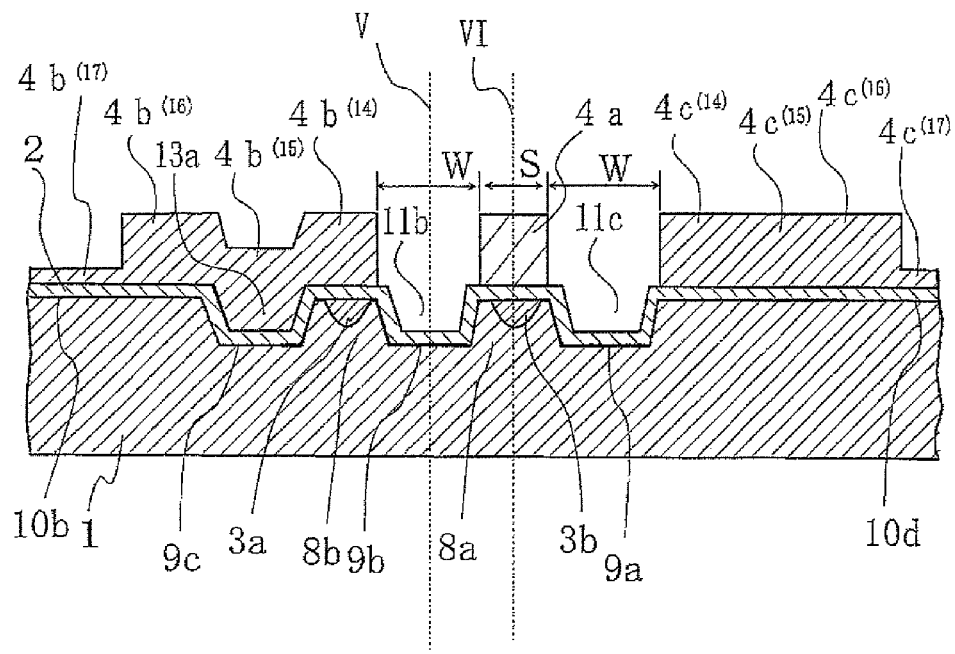
FIG. 18 is a cross-sectional view taken along the line I-I' shown in FIG. 16.

FIG. 16 is a top view illustrating a fifth embodiment of the present invention. FIGS. 17 and 18 show respective cross-sectional views taken along the lines H-H' and I-I' shown in FIG. 16. Reference numerals 11b and 11e represent void sections. Reference numerals $4b^{(14)}$, $4b^{(15)}$, $4b^{(15)"}$, $4b^{(16)}$, $4b^{(17)}$, $4c^{(14)}$, $4c^{(15)}$, $4c^{(15)"}$, $4c^{(16)}$ and $4c^{(17)}$ represent ground conductors.

The thicknesses of the ground conductor $4b^{(15)}$ and the ground conductor $4c^{(15)}$ are large, hence they are also called as thick ground conductors. The thicknesses of the ground conductor $4b^{(15)"}$ and the ground conductor $4c^{(15)"}$ are small, hence they are also called as thin ground conductors. Reference numerals 10b and 10d represent the sections of the ground conductors where the strength of high-frequency electrical signal is small and are referred to as circumference sections. Reference numerals 8a and 8b represent ridge sections.

The thick ground conductor $4b^{(15)}$ and the thin ground conductor $4b^{(15)"}$ couple the ground conductors $4b^{(14)}$ and $4b^{(16)}$, and the thick ground conductor $4c^{(15)}$ and the thin ground conductor $4c^{(15)"}$ couple the ground conductors $4c^{(14)}$ and $4c^{(16)}$ (the thick ground conductor $4b^{(15)}$ and the thin ground conductor $4b^{(15)"}$ and the thick ground conductor $4c^{(15)}$ and the thin ground conductor $4c^{(15)"}$ are also called as coupling ground conductors).

In the fifth embodiment as shown in FIG. 17, the structure relating to the optical waveguides is made such that the recessed sections 9a, 9b and 9c are symmetrically disposed with respect to the center line V which is in the center of two pieces of the interaction optical waveguides 3a and 3b. This is an important element for obtaining excellent temperature drift characteristics. The center line VI drawn in the center of the center conductor 4a is the axis of symmetry for the traveling-wave electrode composed of the center conductor 4a and the ground conductors $4b^{(14)}$, $4b^{(15)"}$, $4b^{(16)}$, $4b^{(17)}$, $4c^{(14)}$, $4c^{(15)"}$, $4c^{(16)}$ and $4c^{(17)}$. This symmetry further holds true even when considered with the ground conductors $4b^{(15)}$ and $4c^{(15)}$ included. Accordingly, in the fifth embodiment, as the traveling-wave electrode has a structural symmetry with respect to the center of the center conductor 4a as the axis of symmetry, the high-frequency electrical signal propagates through the traveling-wave electrode in symmetrical mode. Consequently, it has a good matching with the distribution of electromagnetic field which is symmetrical at the connector and the input feed through section, and thus the high-frequency electrical signal can be propagated in stable mode and with low-loss.

Figure 19:
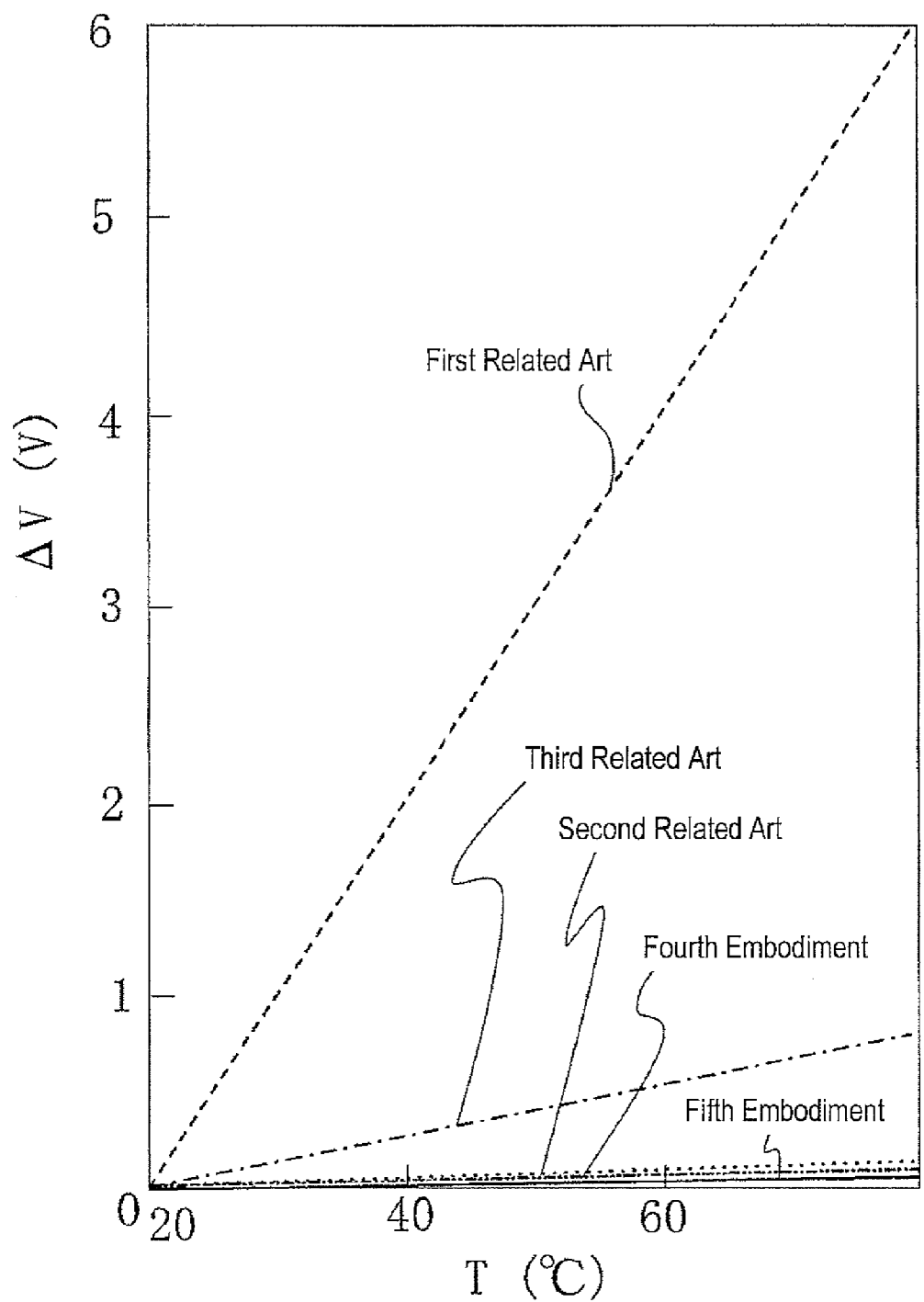
FIG. 19 is a graph illustrating characteristics of the fifth embodiment.

The matter highlighted in the fifth embodiment is that the thicknesses of the ground conductors $4b^{(17)}$ and $4c^{(17)}$ are as small as, for example, 300 nm. When the thickness of the ground conductor is large, the stress due to the principle of leverage (or the stress by the moment) exerted to the z-cut LN substrate 1 and eventually to the ridge sections 8a and 8b becomes large. Therefore, in the fifth embodiment, the thickness of the ground conductor $4b^{(17)}$ in the circumference section 10b is made small to make the stress small. Furthermore, in order to further enhance the effect of the present invention, the thickness of the ground conductor $4c^{(17)}$ formed on the circumference section 10d is also made small. By implementing this measure, as shown in FIG. 19, the temperature drift of the DC bias corresponding to the changes in ambient temperature in the range of 20 to 80 degrees Celsius was further reduced from that of the fourth embodiment.

As described in the foregoing, considering the gap between the interaction optical waveguides 3a and 3b being about 15 μm, the width of the interaction section where the high-frequency electrical signal and the light passing through the interaction optical waveguides 3a and 3b interact with each other is extremely narrow comparing to the width of the z-cut LN substrate 1 (about 1 to 5 mm). Consequently, by making the thicknesses of the ground conductors $4b^{(17)}$ and $4c^{(17)}$ small, the usage amount of Au that is expensive can be substantially reduced, thereby contributing to cost reduction.

In addition, the ground conductors $4b^{(17)}$ and $4c^{(17)}$ having wide areas, although being small in thickness, make them advantageous for securely establishing an electrical earth in terms of high-frequency electrical signal and in terms of connectivity by wire or ribbon to the chassis that is the electrical earth. The same applies to all of the embodiments of the present invention.

Consequently, it will be appreciated that the concept of improving temperature drift without deteriorating the modulation characteristics by making the thickness of the ground conductor small in the circumference section where the high-frequency electrical signal is small can also be applied not only to the fourth embodiment but also to other embodiments in which the thicknesses of the ground conductors in the circumference sections are large. In FIGS. 17 and 18, making the thickness of only either one of the ground conductors $4b^{(17)}$ or $4c^{(17)}$ small is still effective to some degree. Further, since the strength of electromagnetic field of high-frequency electrical signal in the circumference section is small originally, the symmetry being broken in such degree has small influence on the propagation characteristics of high-frequency electrical signal. The same applies to all of the embodiments of the present invention.

Fourth and Fifth Embodiments

In the fourth and the fifth embodiments, while the traveling-wave electrode has been described as bilaterally symmetrical with respect to the center line of the center conductor, this applies to the main structure. For example, in FIG. 12, the thin ground conductors $4b^{(15)'}$ and $4c^{(15)'}$ and the thick ground conductors $4b^{(15)}$ and $4c^{(15)}$ are nearly symmetrical with respect to the center line of the center conductor 4a. While being absolutely symmetrical is most desirable in terms of stable propagation of high-frequency electrical signal, it will be appreciated that, for example, the thick ground conductors $4b^{(15)}$ and $4c^{(15)}$ may be shifted against one another (up and down directions of the drawing in FIG. 12) and the void sections 11b and 11c may be formed to the very edge of the interaction section in its longitudinal direction. In other words, even if the structure is not strictly symmetrical, as long as the main elements are nearly symmetrical, it is still referable to the present invention.

While the Mach-Zehnder optical waveguide is used as an example of a branching optical waveguide, the present invention can be applied to other optical waveguides of branching and multiplexing types such as a directional coupler. The concept can also be applied to the optical waveguides of three or more pieces and a phase modulator having a single optical waveguide. When applied to the phase modulator, the single piece of optical waveguide and the traveling-wave electrode become symmetrical with respect to the center line of the center conductor. As for the method of forming the optical waveguide, other than the Ti thermal diffusion method, various forming methods of optical waveguides such as a proton-exchange method may be used and, as for the buffer layer, various materials other than the $SiO_2$ such as $Al_2O_3$ may be used.

While the z-cut LN substrate has been described, LN substrates of other plane directions such as an x-cut and a y-cut may be used, and substrates of different materials such as a lithium tantalate substrate or even a semiconductor substrate may also be used. Further, while the electrode has been described as a traveling-wave electrode, since a lumped parameter electrode may be used in principle, the scope of the traveling-wave electrode in the present invention also includes the lumped parameter electrode.

In addition, while each of the recessed sections is normally formed with nearly the same width, when the recessed section close to the circumference section is etched to be quite wide (as the height of the circumference section comes to nearly the same as the bottom portion of the recessed section), it is still referable to the present invention since the widely etched portion can be regarded as a practical circumference section.

Sixth Embodiment

Figure 20:
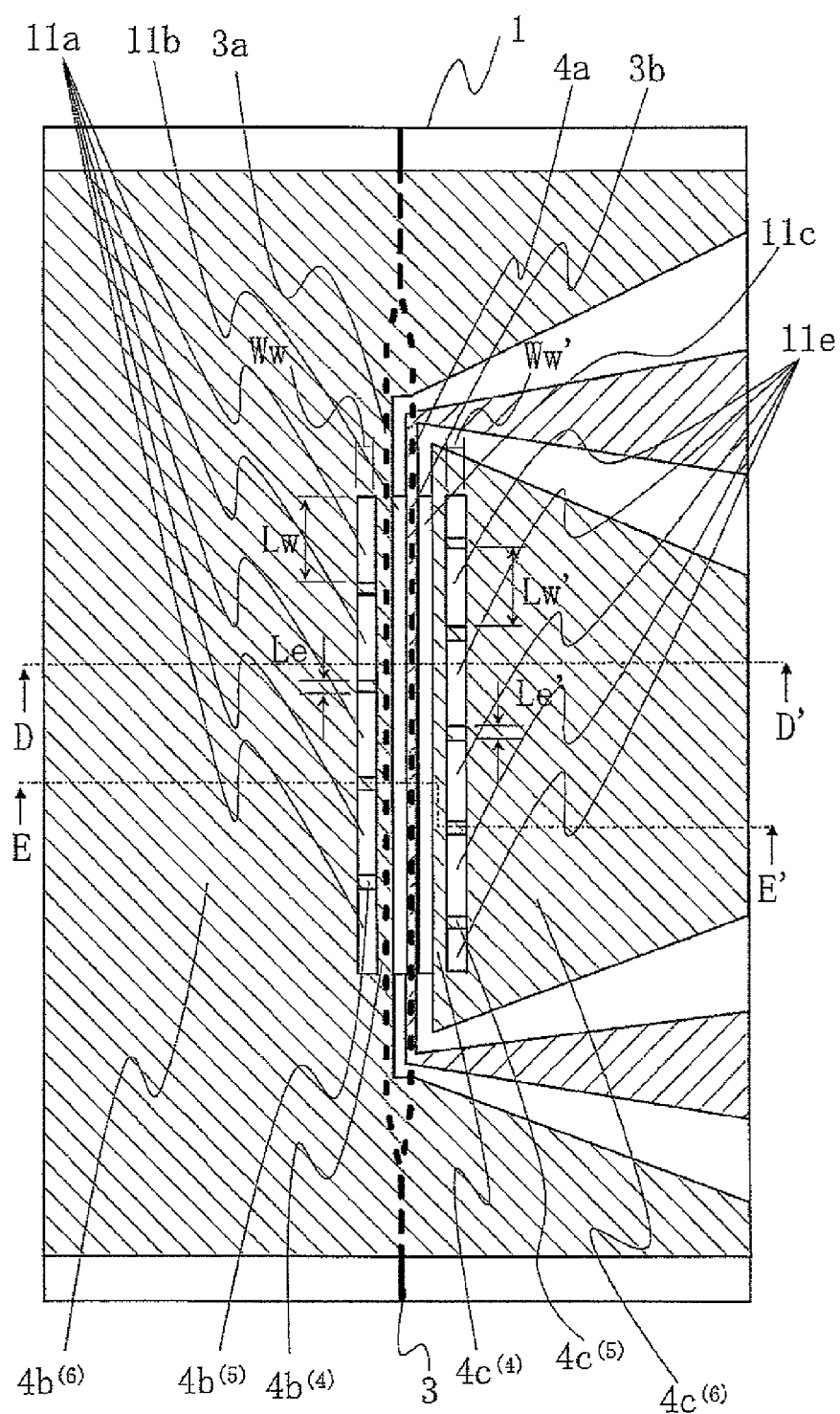
FIG. 20 is a top view schematically illustrating the structure of an optical modulator according to a sixth embodiment of the present invention.
Figure 21:
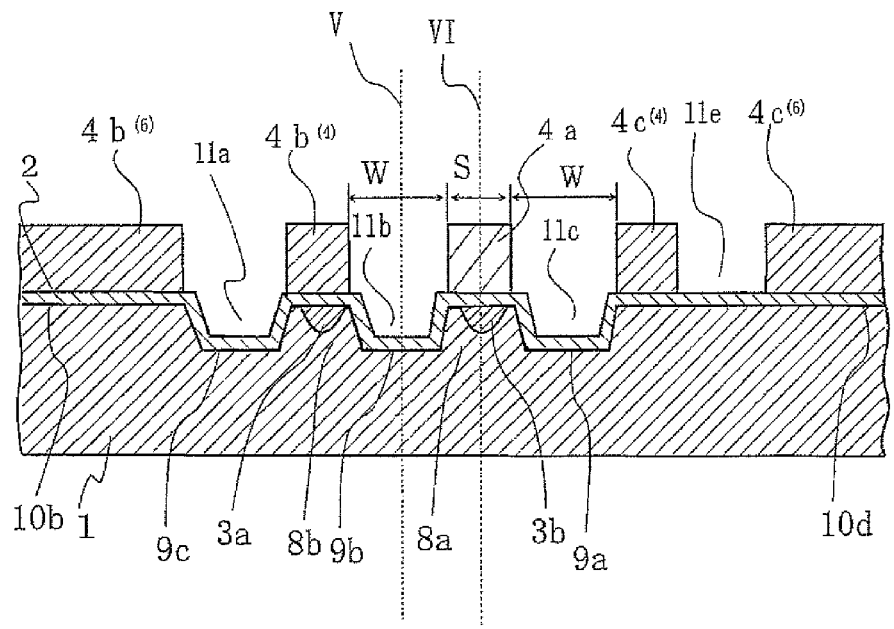
FIG. 21 is a cross-sectional view taken along the line D-D' shown in FIG. 20.
Figure 22:
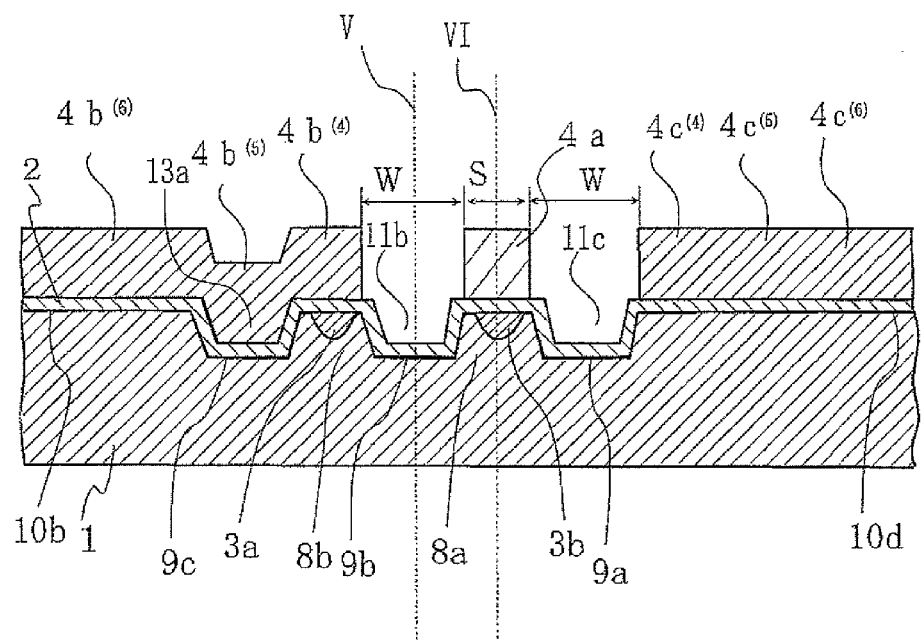
FIG. 22 is a cross-sectional view taken along the line E-E' shown in FIG. 20.

FIG. 20 is a top view illustrating a sixth embodiment of the present invention. FIGS. 21 and 22 show respective cross-sectional views taken along the lines D-D' and E-E' shown in FIG. 20. Reference numerals 11a, 11b, 11c and 11e represent void sections. Reference numerals $4b^{(4)}$, $4b^{(5)}$, $4b^{(6)}$, $4c^{(4)}$, $4c^{(5)}$ and $4c^{(6)}$ represent ground conductors. The ground conductor $4b^{(5)}$ couples the ground conductors $4b^{(4)}$ and $4b^{(6)}$, and the ground conductor $4c^{(5)}$ couples the ground conductors $4c^{(4)}$ and $4c^{(6)}$ (the ground conductor $4b^{(5)}$ and the ground conductor $4c^{(5)}$ are also called as coupling ground conductors).

In the sixth embodiment, in order to avoid the influence of the skin effect of high-frequency electrical signal, the thicknesses of the ground conductors $4b^{(5)}$ and $4c^{(5)}$ that are the coupling ground conductors are made to be large. Reference numerals 10b and 10d represent the sections of the ground conductors where the strength of high-frequency electrical signal is small, and are referred to as circumference sections. Reference numerals 8a and 8b represent ridge sections. The void sections 11a and 11e are the sections where the conductors are missing in the ground conductor (or windows opened in the ground conductor). A reference numeral 13a represents an embedded section where the void section 11a is embedded with the ground conductor $4b^{(5)}$.

Underneath the ground conductors $4c^{(5)}$ and $4c^{(6)}$ on the side where the optical waveguide is not formed, the recessed section is not formed. In FIG. 21, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the optical waveguides. As described earlier, the ridge sections 8a and 8b have slant sections (the side surfaces of the ridge sections 8a and 8b and are also called as slant surfaces as described earlier) where the distribution of electrical charges caused by the pyroelectric effect differs from those of the bottom surfaces of the recessed sections 9a, 9b and 9c and the upper surface of the z-cut LN substrate 1.

The important matter in the sixth embodiment is that, in terms of the interaction optical waveguides 3a and 3b, the recessed sections 9a, 9b and 9c including those slant surfaces are structured to be symmetrical with respect to the center line V. Consequently, the distribution of electrical charges, i.e. the distribution of electrical field, by the pyroelectric effect also becomes symmetrical with respect to the center line V, thereby achieving extremely stable characteristics in temperature drift in response to the changes in surroundings.

Meanwhile, at a lower portion of each of the ground conductors, even when the symmetry of the interaction optical waveguides 3a and 3b is broken by making an additional recessed section in the area where the influence to temperature drift is small, it is still considered referable to the present invention since it is a modification made in the area not influencing the temperature drift. While the number of recessed sections shown in FIGS. 21 and 22 is three, as long as the structure remains to be symmetrical with respect to the center line provided in the center of the two pieces of optical waveguides, the provision of more pieces of recessed sections is still referable to the present invention. It will be appreciated that the same holds true to all of the embodiments of the present invention.

Figure 23:
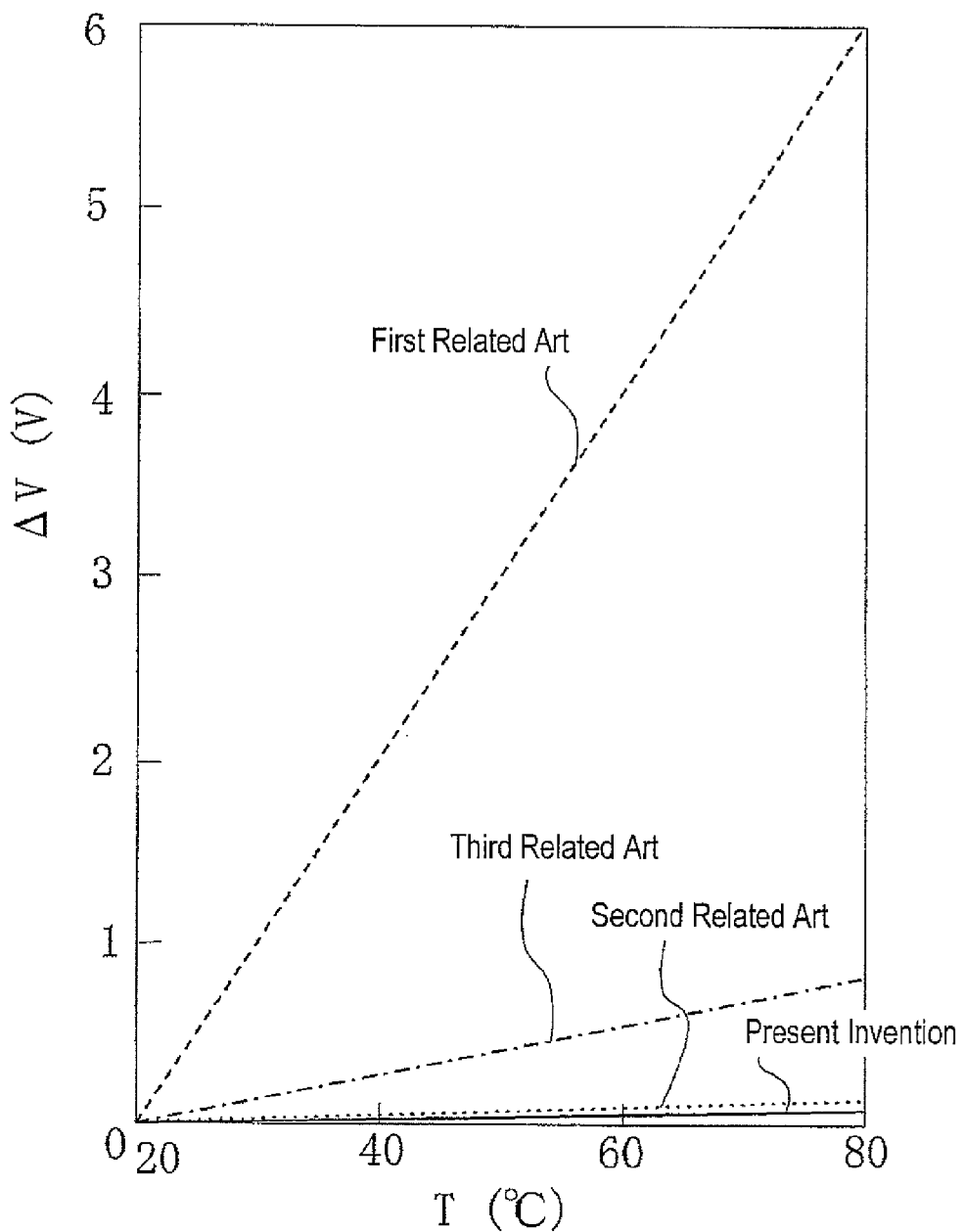
FIG. 23 is a graph illustrating characteristics of the sixth embodiment.

FIG. 23 shows the results of experiment of the sixth embodiment when the ambient temperature T is changed from 20 to 80 degrees Celsius. For the purpose of comparisons, the graph also shows the measurement results of the first, second and third examples in related art. Here, the width S of the center conductor 4a was set to 7 μm, and the gap W between the center conductor 4a and the ground conductor $4b^{(4)}$ or the ground conductor $4c^{(4)}$ was set to 15 μm. The width Ww of the void section 11a was set to 15 μm, the length Lw thereof was set to 1 mm, and the length Le of the ground conductor $4b^{(5)}$ was set to 100 μm. As will be noted from the graph, by employing the sixth embodiment of the present invention, as the traveling-wave electrode is symmetrical with respect to the center line of the center conductor 4a, it was possible to reduce the temperature drift substantially less than the third example in related art which has the recessed sections 11a, 11b, 11c and 11d asymmetrically disposed with respect to the interaction optical waveguides 3a and 3b and is advantageous in terms of high-frequency optical modulation. Accordingly, the concept of the present invention was verified. While the second example in related art also has excellent characteristics in regard to the temperature drift, the second example in related art has the problem in terms of the mode conversion of high-frequency electrical signal as described earlier. Note that, even when the length Lw of the void section 11a was changed from 30 μm to 3 mm and the length Le of the ground conductor $4b^{(5)}$ was changed from 5 to 500 μm, the temperature drift was efficiently reduced. It will be appreciated that the present invention is not limited to such values.

In the above description, for the sake of simplifying the description of the principle of the present invention, it is assumed that the width Ww and the length Lw of the void section 11a and the width Ww' and the length Lw' of the void section 11e are respectively the same, and the length Le of the ground conductor $4b^{(5)}$ and the length Le' of the ground conductor $4c^{(5)}$ are the same. However, the present invention is not limited as such. Further, the number of the void section 11a and the ground conductor $4b^{(5)}$ and the number of the void section 11e and the ground conductor $4c^{(5)}$ may be different from one another. This applies to all of the embodiments of the present invention. The lengths and widths of the ground conductors (the coupling ground conductors) and the void sections described above are with respect to the longitudinal direction of the interaction optical waveguides 3a and 3b.

Next, considerations will be given in terms of the distribution of electromagnetic field of high-frequency electrical signal. As the same as all the other embodiments of the present invention, the basic constituent elements of the traveling-wave electrode shown in FIGS. 20 to 22 are the center conductor 4a and the ground conductors $4b^{(4)}$, $4b^{(6)}$, $4c^{(4)}$ and $4c^{(6)}$. As will be noted from FIGS. 21 and 22, the center line VI drawn in the center of the center conductor 4a is the axis of symmetry for the traveling-wave electrode composed of the center conductor 4a and the ground conductors $4b^{(4)}$, $4b^{(6)}$, $4c^{(4)}$ and $4c^{(6)}$. Accordingly, the basic structure of the traveling-wave electrode of the sixth embodiment has a structural symmetry with respect to the center line of the center conductor 4a as the axis of symmetry. The structure of the traveling-wave electrode being symmetrical means the distribution of electromagnetic field of high-frequency electrical signal which propagates through the traveling-wave electrode is also symmetrical. Therefore, it becomes unnecessary to convert modes from the symmetrical mode of high-frequency electrical signal which is symmetrical at the connector and the input feed through section to the asymmetrical mode at the traveling-wave electrode which is required in the second example in related art shown in FIG. 54, thus the high-frequency electrical signal can be stably propagated with low-loss.

The effect of the present invention is exercised even when the recessed sections are not strictly symmetrical with respect to the center line V provided in the center of the interaction optical waveguides 3a and 3b. The width of the ground conductor $4b^{(4)}$ may differ from that of the center conductor 4a by the amount of a few micrometers. Thus the center conductor and the ground conductors over the interaction optical waveguides 3a and 3b including the difference described above are regarded as symmetrical (or substantially symmetrical) with respect to the center line V provided in the center of the interaction optical waveguides 3a and 3b. Likewise, the effect of the present invention can be exercised even when the structure of the traveling-wave electrode is not strictly symmetrical with respect to the center line VI. The same applies to all of the embodiments of the present invention.

As described above, in the sixth embodiment, by making the structure relating to the optical waveguides symmetrical with respect to the center line V provided in the center of the two pieces of optical waveguides and making the basic structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

Seventh Embodiment

Figure 24:
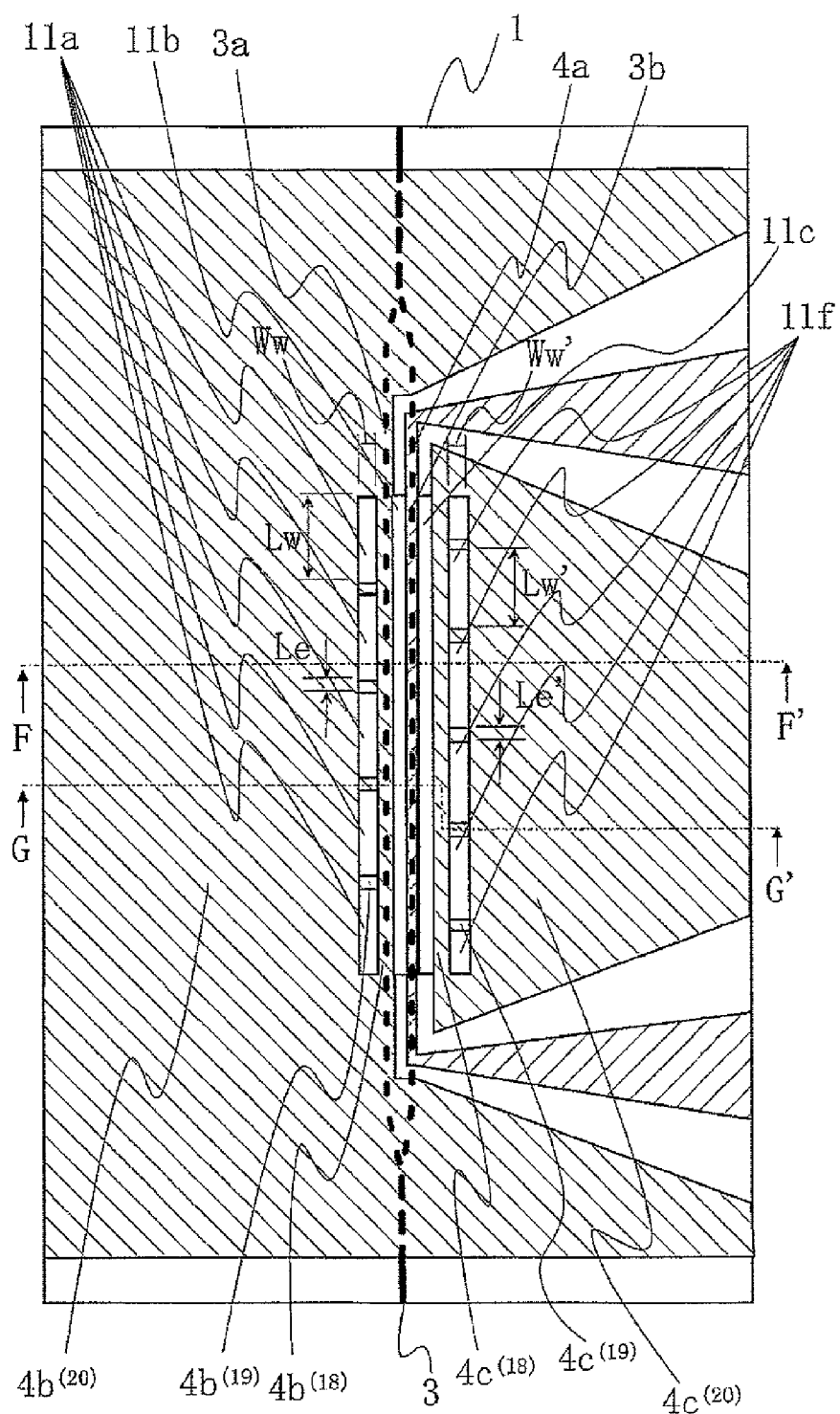
FIG. 24 is a top view schematically illustrating the structure of an optical modulator according to a seventh embodiment of the present invention.
Figure 25:
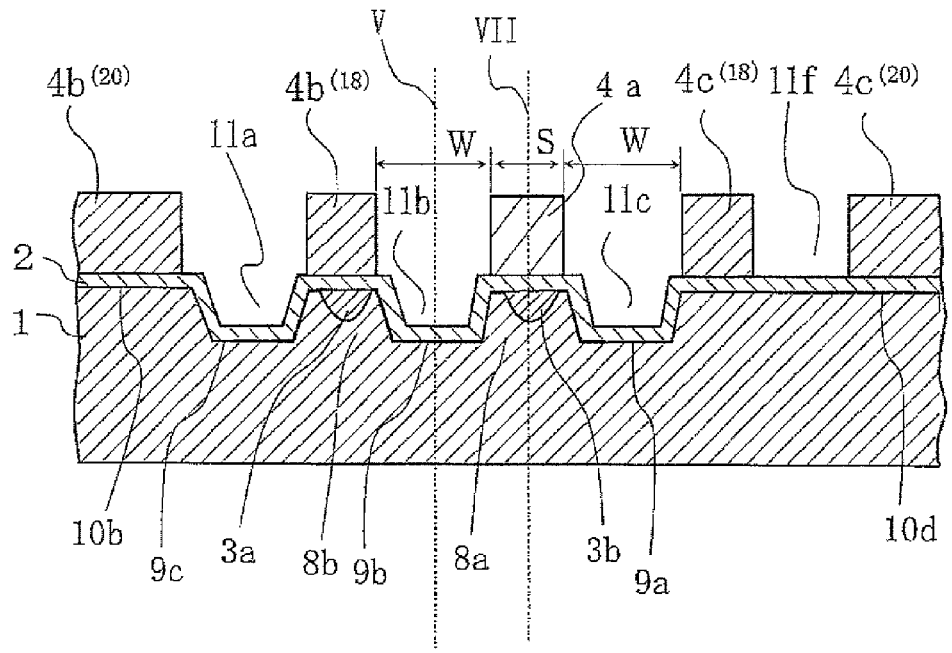
FIG. 25 is a cross-sectional view taken along the line F-F' shown in FIG. 24.
Figure 26:
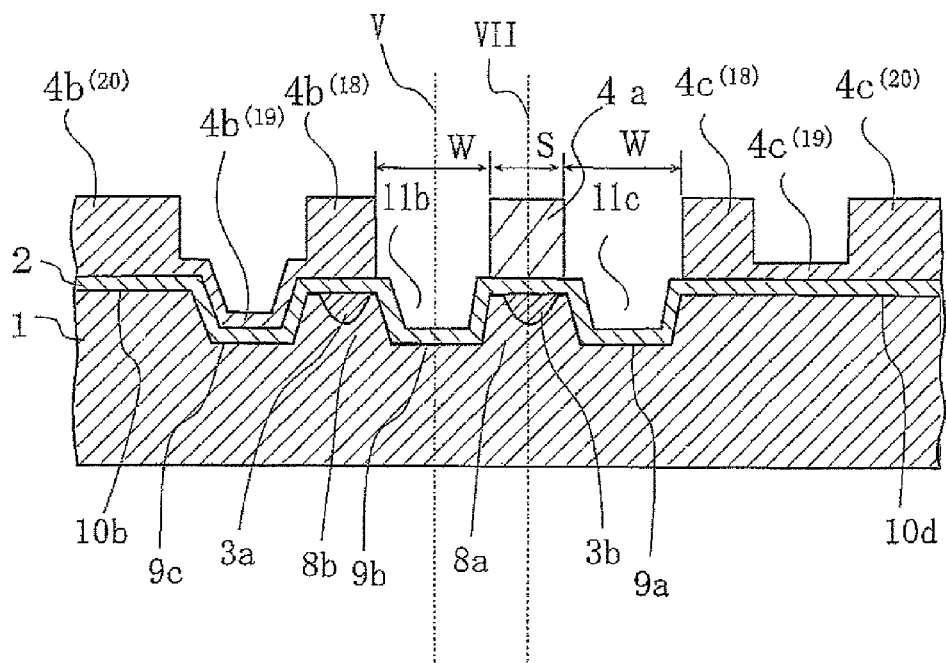
FIG. 26 is a cross-sectional view taken along the line G-G' shown in FIG. 24.

FIG. 24 is a top view illustrating a seventh embodiment of the present invention. FIGS. 25 and 26 show respective cross-sectional views taken along the lines F-F' and G-G' shown in FIG. 24. Reference numerals 11a, 11b, 11c and 11f represent void sections. Reference numerals $4b^{(18)}$, $4b^{(19)}$, $4b^{(20)}$, $4c^{(18)}$, $4c^{(19)}$ and $4c^{(20)}$ represent ground conductors. The ground conductor $4b^{(19)}$ couples the ground conductors $4b^{(18)}$ and $4b^{(20)}$, and the ground conductor $4c^{(19)}$ couples the ground conductors $4c^{(18)}$ and $4c^{(20)}$ (the ground conductor $4b^{(19)}$ and the ground conductor $4c^{(19)}$ are also called as coupling ground conductors). Reference numerals 10b and 10d represent circumference sections. Reference numerals 8a and 8b represent ridge sections. The void sections 11a and 11f are the sections where the conductors are missing in the ground conductor (or windows opened in the ground conductor).

In FIG. 25, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, as described with reference to FIG. 21 of the sixth embodiment, the line V is the axis of symmetry for the interaction optical waveguides 3a and 3b. As described earlier, the ridge sections 8a and 8b have slant sections (the side surfaces or slant surfaces of the ridge sections 8a and 8b) where the distribution of electrical charges caused by the pyroelectric effect differs from those of the bottom surfaces of the recessed sections 9a, 9b and 9c and the upper surface of the z-cut LN substrate 1. In the seventh embodiment, in terms of the interaction optical waveguides 3a and 3b, since the recessed sections 9a, 9b and 9c including such slant sections are structured to be symmetrical with respect to the center line V, the distribution of electrical charges by the pyroelectric effect, i.e. the distribution of electrical field, is also symmetrical with respect to the center line V, thus the temperature drift in response to the changes in surroundings becomes extremely stable.

Next, in the same manner as the sixth embodiment, considerations will be given in terms of the distribution of electromagnetic field of high-frequency electrical signal. As the same as all the other embodiments of the present invention, the basic constituent elements of the traveling-wave electrode shown in FIGS. 24 to 26 are the center conductor 4a and the ground conductors $4b^{(18)}$, $4b^{(20)}$, $4c^{(18)}$ and $4c^{(20)}$. As will be noted from FIGS. 25 and 26, the center line VII drawn in the center of the center conductor 4a is the axis of symmetry for the traveling-wave electrode composed of the center conductor 4a and the ground conductors $4b^{(18)}$, $4b^{(20)}$, $4c^{(18)}$ and $4c^{(20)}$. Accordingly, since the basic structure of the traveling-wave electrode of the seventh embodiment has a structural symmetry with respect to the center line of the center conductor 4a as the axis of symmetry, comparing to the second example in related art shown in FIG. 54 which does not have a structural symmetry, the symmetrical electromagnetic fields at the connector and the input feed through section can be stably propagated with low loss.

As described above, in the seventh embodiment, by making the structure relating to the optical waveguides symmetrical with respect to the center line V provided between the two pieces of optical waveguides and making the basic structure relating to the traveling-wave electrode symmetrical with respect to the center line VII of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

However, in comparison with the drawings shown in FIGS. 22 and 26, the thicknesses of the coupling ground conductors $4b^{(19)}$ and $4c^{(19)}$ shown in FIG. 26 are smaller than those of the coupling ground conductors $4b^{(5)}$ and $4c^{(5)}$ shown in FIG. 22, thus it is somewhat less advantageous for fast optical modulation in terms of the skin effect.

Eighth Embodiment

Figure 27:
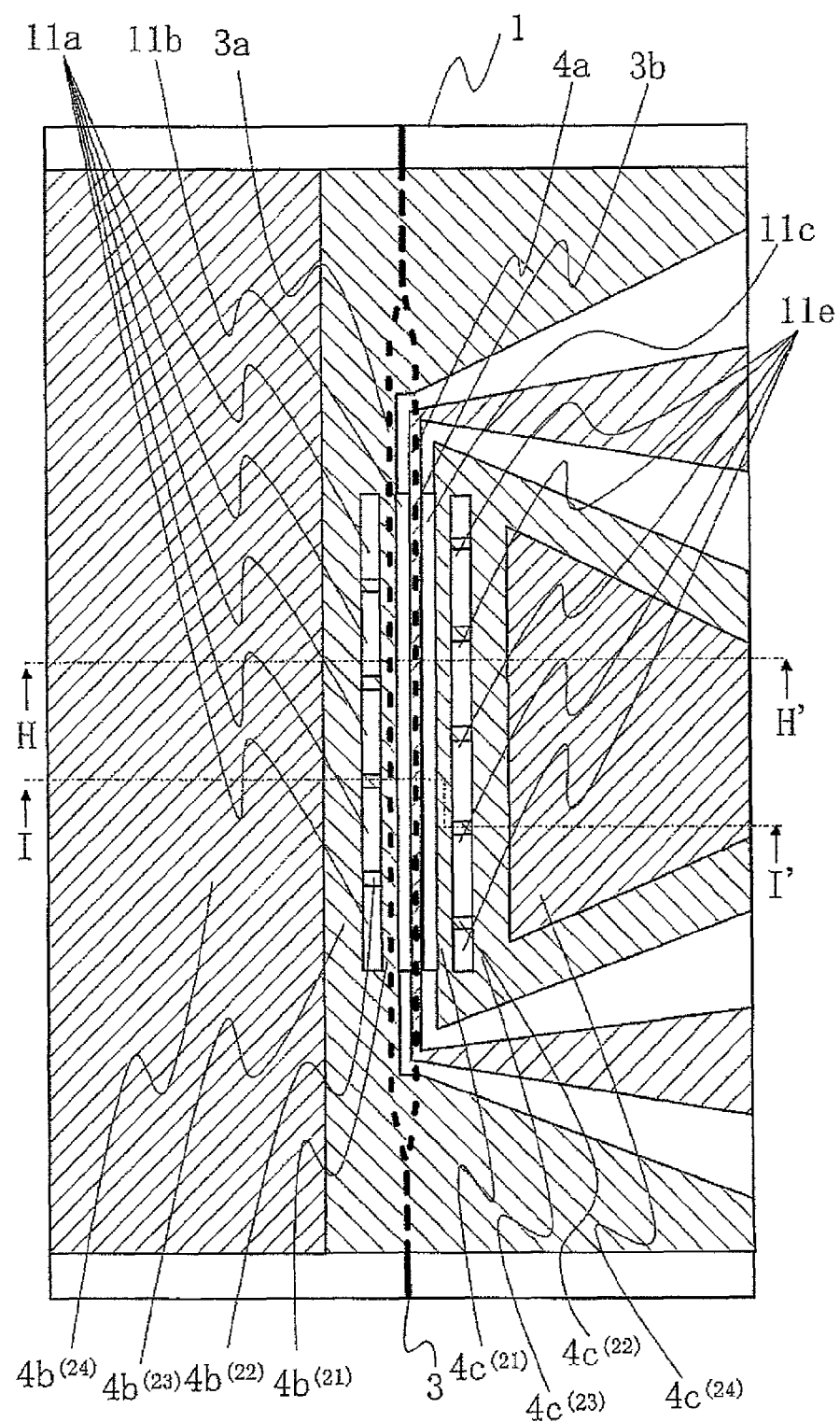
FIG. 27 is a top view schematically illustrating the structure of an optical modulator according to an eighth embodiment of the present invention.
Figure 28:
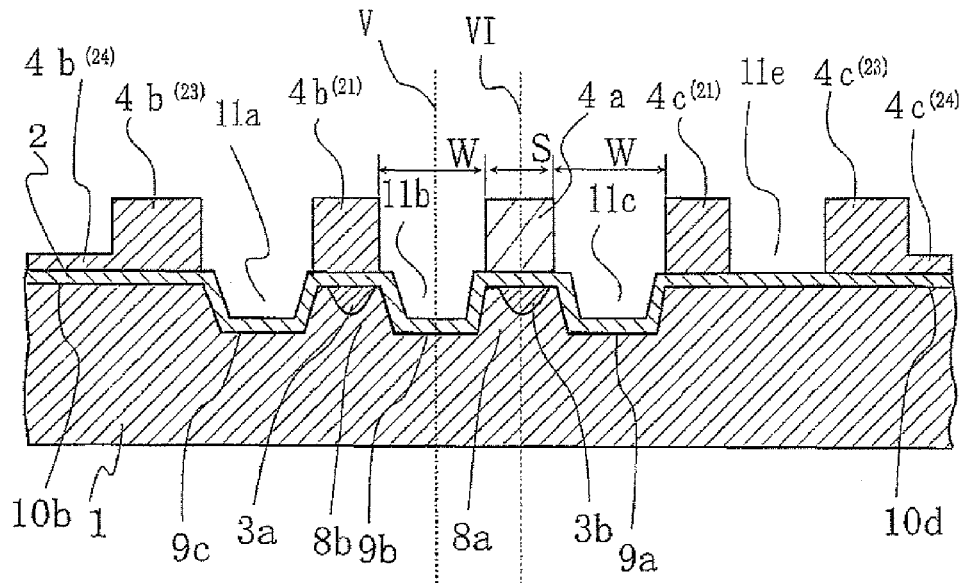
FIG. 28 is a cross-sectional view taken along the line H-H' shown in FIG. 27.
Figure 29:
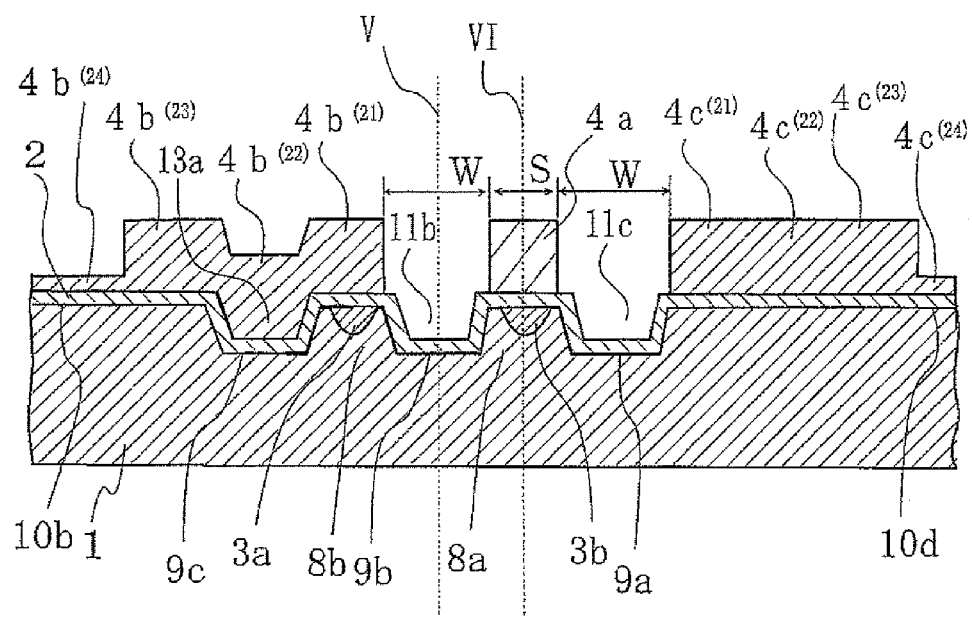
FIG. 29 is a cross-sectional view taken along the line I-I' shown in FIG. 27.

FIG. 27 is a top view illustrating an eighth embodiment of the present invention. FIGS. 28 and 29 show respective cross-sectional views taken along the lines H-H' and I-I' shown in FIG. 27. Reference numerals 11a, 11b, 11c and 11e represent void sections. Reference numerals $4b^{(21)}$, $4b^{(23)}$, $4b^{(24)}$, $4c^{(21)}$, $4c^{(23)}$ and $4c^{(24)}$ represent ground conductors. The ground conductor $4b^{(22)}$ couples the ground conductors $4b^{(21)}$ and $4b^{(23)}$, and the ground conductor $4c^{(22)}$ couples the ground conductors $4c^{(21)}$ and $4c^{(23)}$ (the ground conductor $4b^{(22)}$ and the ground conductor $4c^{(22)}$ are also called as coupling ground conductors). Reference numerals 10b and 10d represent the sections where the strength of high-frequency electrical signal is small, i.e. circumference sections. Reference numerals 8a and 8b represent ridge sections. The void sections 11a and 11e are the sections where the conductors are missing in the ground conductor (or windows opened in the ground conductor).

In the eighth embodiment as shown in FIG. 28, the structure relating to the optical waveguides is made such that the recessed sections 9a, 9b and 9c are symmetrically disposed with respect to the center line V which is in the center of two pieces of the interaction optical waveguides 3a and 3b. This is an important element for obtaining excellent temperature drift characteristics. The center line VI drawn in the center of the center conductor 4a is the axis of symmetry for the traveling-wave electrode composed of the center conductor 4a and the ground conductors $4b^{(21)}$, $4b^{(23)}$, $4b^{(24)}$, $4c^{(21)}$, $4c^{(23)}$ and $4c^{(24)}$. Accordingly, in the eighth embodiment, since the basic structure of the traveling-wave electrode has a structural symmetry with respect to the center of the center conductor 4a as the axis of symmetry, the high-frequency electrical signal propagates through the traveling-wave electrode in symmetrical mode. Consequently, it has a good matching with the distribution of electromagnetic field which is symmetrical at the connector and the input feed through section, thus the high-frequency electrical signal can be propagated in stable mode and with low-loss.

Figure 30:
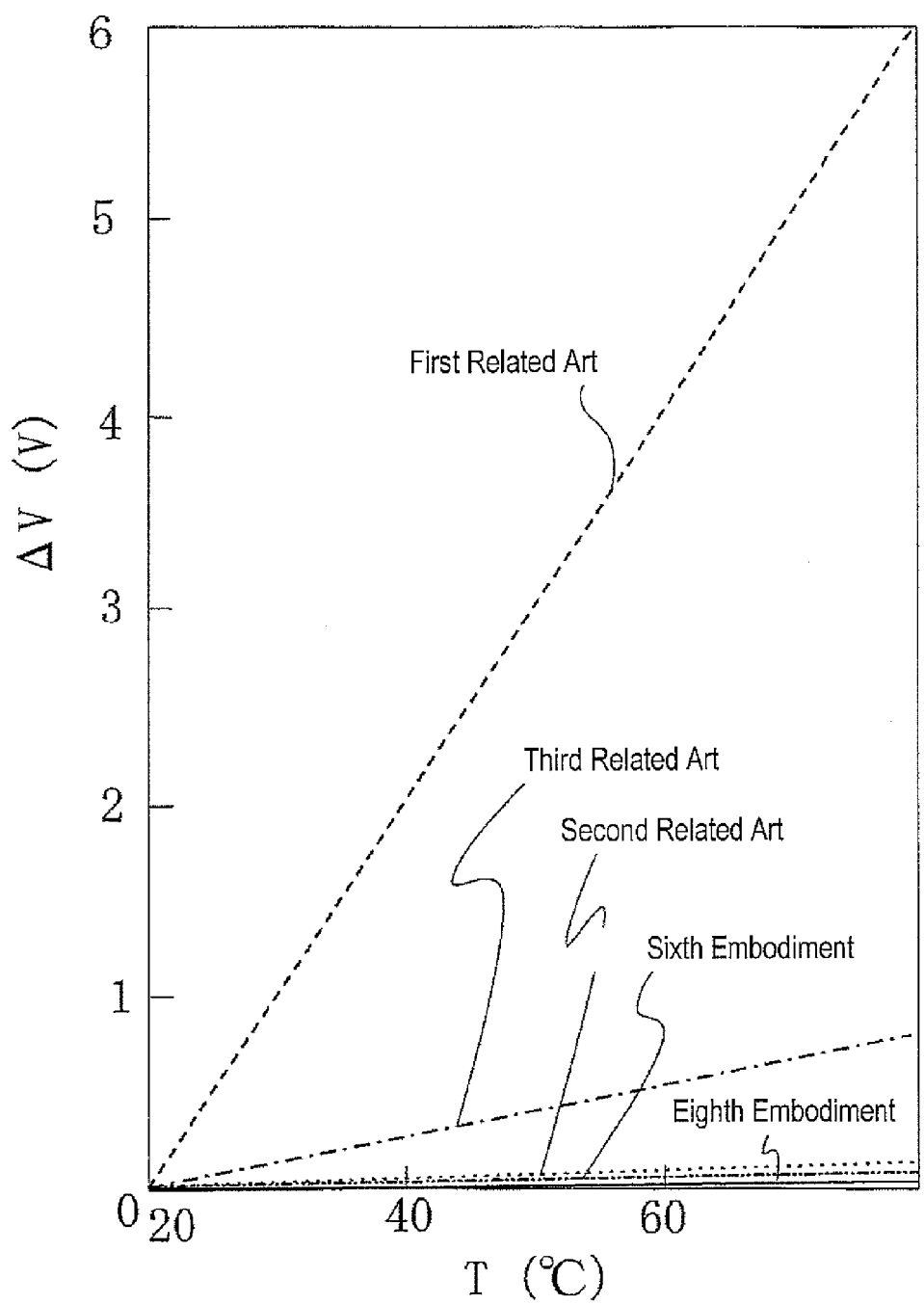
FIG. 30 is a graph illustrating characteristics of the eighth embodiment.

The matter highlighted in the eighth embodiment is that the thicknesses of the ground conductors $4b^{(24)}$ and $4c^{(24)}$ are as small as, for example, 300 nm. When the thickness of the ground conductor is large, the stress exerted to the z-cut LN substrate 1 and eventually to the ridge sections 8a and 8b due to the principle of leverage (or the stress by the moment) becomes large. Therefore, in the eighth embodiment, by making the thickness of the ground conductor $4b^{(24)}$ in the circumference section 10b small, the stress is made small. Further, in order to further enhance the effect of the embodiment, the thickness of the ground conductor $4c^{(24)}$ formed on the circumference section 10d is also made small. By implementing this measure, as shown in FIG. 30, the temperature drift of the DC bias corresponding to the changes in ambient temperature in the range of 20 to 80 degrees Celsius was further reduced than that of the sixth embodiment.

As described in the foregoing, considering the gap between the interaction optical waveguides 3a and 3b being about 15 μm, the width of the interaction section where the high-frequency electrical signal and the light passing through the interaction optical waveguides 3a and 3b interact with each other is extremely narrow comparing to the width of the z-cut LN substrate 1 (about 1 to 5 mm). Consequently, by making the thicknesses of the ground conductors $4b^{(24)}$ and $4c^{(24)}$ small, the usage amount of Au that is expensive can be substantially reduced, thereby contributing to cost reduction.

In addition, the ground conductors $4b^{(24)}$ and $4c^{(24)}$ having wide areas, although being small in thickness, make them advantageous for securely establishing an electrical earth in terms of high-frequency electrical signal and in terms of connectivity by wire or ribbon to the chassis that is the electrical earth. The same applies to all of the embodiments of the present invention.

Consequently, it will be appreciated that the concept of improving temperature drift without deteriorating the modulation characteristics by making the thickness of the ground conductor small in the circumference section where the high-frequency electrical signal is small can also be applied to the seventh embodiment shown in FIGS. 24 to 26. In FIGS. 28 and 29, making the thickness of only either one of the ground conductors $4b^{(24)}$ or $4c^{(24)}$ small is still effective to some degree. Further, since the strength of electromagnetic field of high-frequency electrical signal in the circumference section is small originally, the symmetry being broken in such degree has small influence on the propagation characteristics of high-frequency electrical signal. The same applies to all of the embodiments of the present invention.

Ninth Embodiment

Figure 31:
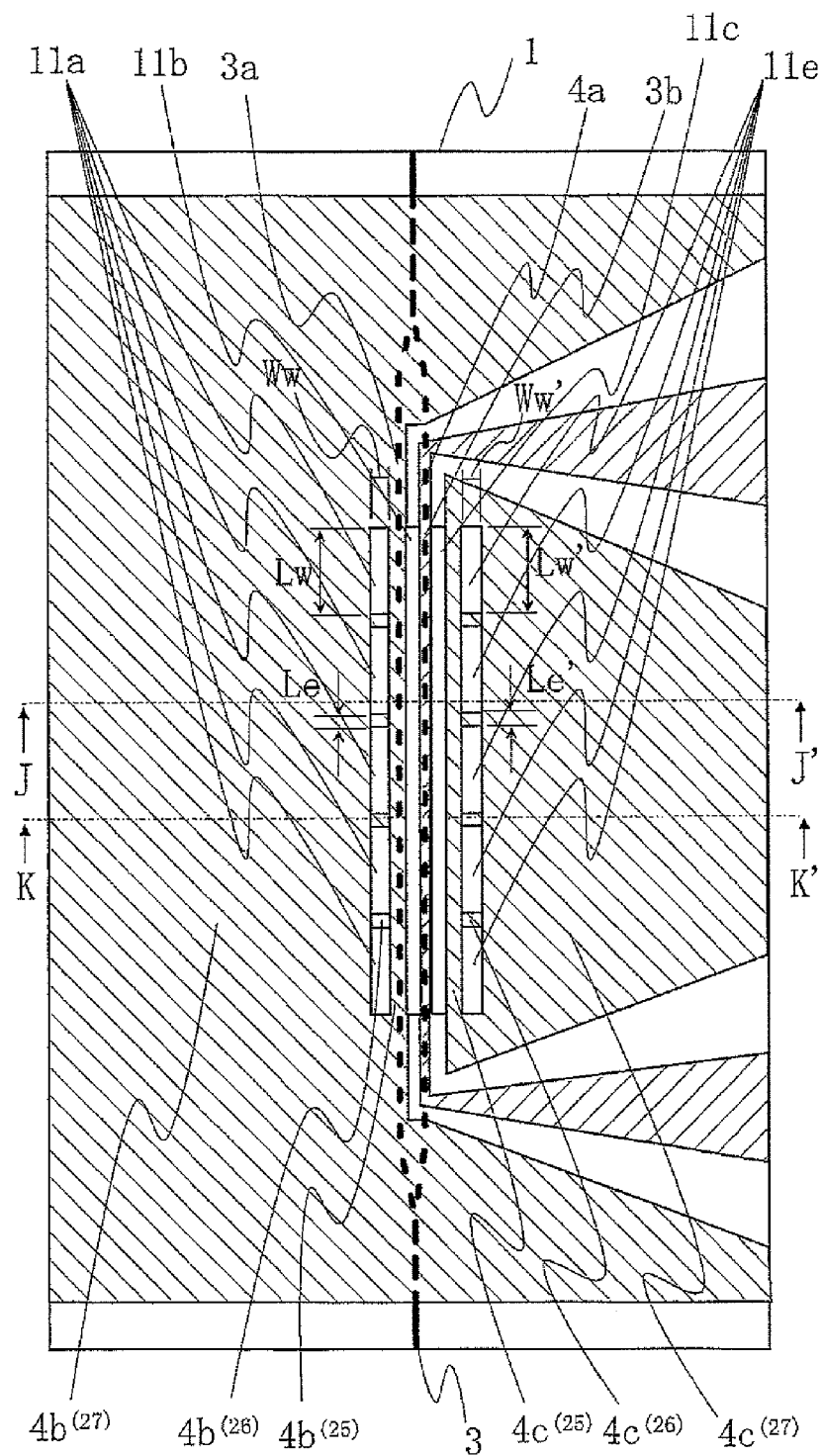
FIG. 31 is a top view schematically illustrating the structure of an optical modulator according to a ninth embodiment of the present invention.
Figure 32:
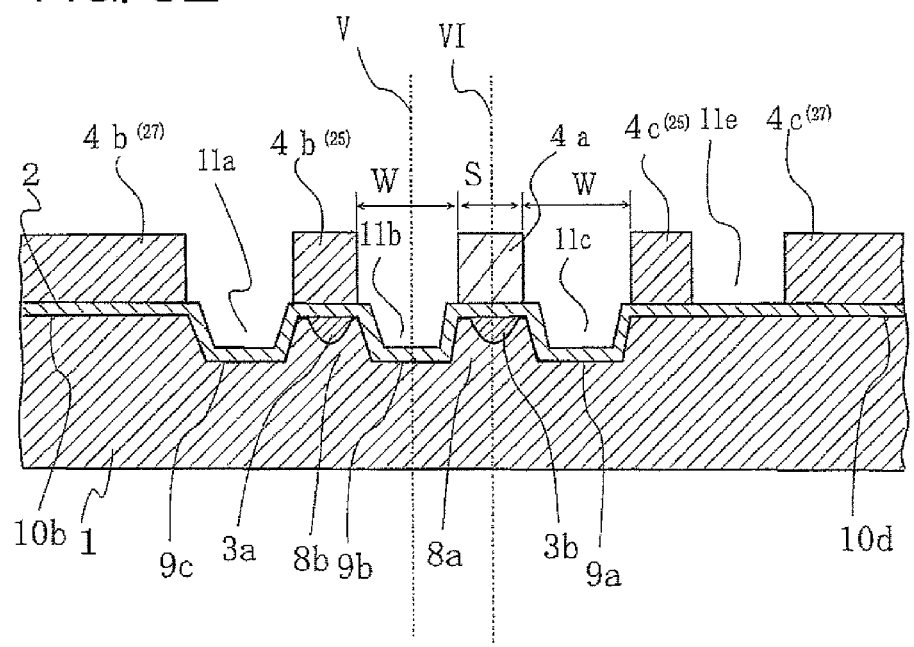
FIG. 32 is a cross-sectional view taken along the line J-J' shown in FIG. 31.
Figure 33:
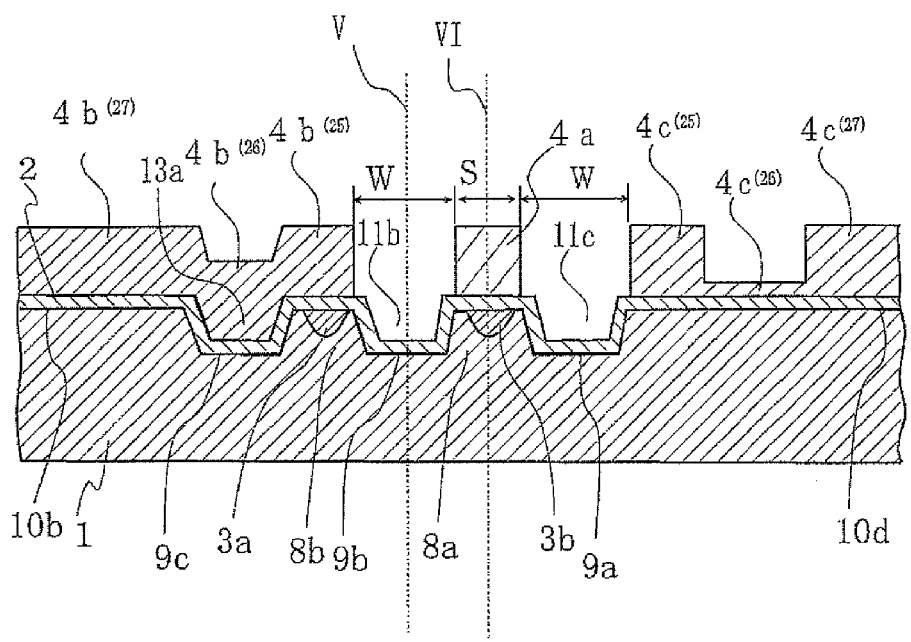
FIG. 33 is a cross-sectional view taken along the line K-K' shown in FIG. 31.

FIG. 31 is a top view illustrating a ninth embodiment of the present invention. FIGS. 32 and 33 show respective cross-sectional views taken along the lines J-J' and K-K' shown in FIG. 31. Reference numerals 11a, 11b, 11c and 11e represent void sections. Reference numerals $4b^{(25)}$, $4b^{(26)}$, $4b^{(27)}$, $4c^{(25)}$, $4c^{(26)}$ and $4c^{(27)}$ represent ground conductors. The ground conductor $4b^{(26)}$ is a coupling ground conductor coupling the ground conductors $4b^{(25)}$ and $4b^{(27)}$, and the ground conductor $4c^{(26)}$ is a coupling ground conductor coupling the ground conductors $4c^{(25)}$ and $4c^{(27)}$. Reference numerals 10b and 10d represent the sections of the ground conductors where the strength of high-frequency electrical signal is small and are referred to as circumference sections. Reference numerals 8a and 8b represent ridge sections. The void sections 11a and 11e are the sections where the conductors are missing in the ground conductor (or windows opened in the ground conductor). A reference numeral 13a represents an embedded section where the void section 11a is embedded with the ground conductor $4b^{(26)}$.

What is distinctive in the ninth embodiment is that the thicknesses of the ground conductor $4b^{(26)}$ and the ground conductor $4c^{(26)}$ that are the coupling ground conductors are different from one another. More specifically, the thickness of the ground conductor $4b^{(26)}$ is made larger than that of the ground conductor $4c^{(26)}$. Consequently, compared with the case where both the ground conductor $4b^{(26)}$ and the ground conductor $4c^{(26)}$ are made to be small, it has an advantage of being less susceptible to the skin effect of high-frequency electrical signal. In the ninth embodiment, while the thickness of the ground conductor $4b^{(26)}$ is made larger than that of the ground conductor $4c^{(26)}$, the thickness of the ground conductor $4c^{(26)}$ may conversely be made larger than that of the ground conductor $4b^{(26)}$.

In the drawings, while the width Ww and the length Lw of the void section 11a are respectively depicted as the same as the width Ww' and the length Lw' of the void section 11e, and the length Le of the ground conductor $4b^{(26)}$ is depicted as the same as the length Le' of the ground conductor $4c^{(26)}$, the present invention is not limited as such. Further, the number of the void section 11a and the ground conductor $4b^{(26)}$ and the number of the void section 11e and the ground conductor $4c^{(26)}$ may be different from one another. This applies to all of the embodiments of the present invention. The lengths and widths of the ground conductors (the coupling ground conductors) and void sections described above are with respect to the longitudinal direction of the interaction optical waveguides 3a and 3b. The width Ww of the void section 11a and the width Ww' of the void section 11e are also referred to as the widths of the coupling ground conductor $4b^{(26)}$ and the coupling ground conductor $4c^{(26)}$, respectively.

In addition, similar to the sixth and the seventh embodiments shown in FIGS. 20 and 24, the ground conductor $4b^{(26)}$ and the ground conductor $4c^{(26)}$ that are the coupling ground conductors may be shifted in the longitudinal direction of the interaction optical waveguides 3a and 3b. Furthermore, as the same as the eighth embodiment shown in FIG. 27, the thicknesses of the ground conductors in the circumference sections may be made small.

As described above, in the ninth embodiment, by making the structure relating to the optical waveguide symmetrical with respect to the center line V provided in the center of the two pieces of optical waveguides and making the basic structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

Sixth to Ninth Embodiments

While it has been described that it is desirable that the traveling-wave electrode be bilaterally symmetrical with respect to the center line of the center conductor in terms of the propagation of high-frequency electrical signal, this applies to the main structure. More specifically, in FIGS. 20, 24 and 27, although the coupling ground conductors $4b^{(5)}$ and $4c^{(5)}$, $4b^{(19)}$ and $4c^{(19)}$, and $4b^{(22)}$ and $4c^{(22)}$ are shifted against one another in the longitudinal direction of the optical waveguides (the up and down directions in the drawings in FIGS. 20, 24 and 27), the ground conductors continuing in the longitudinal direction of the center conductor 4a and the optical waveguides that are the basic structure of the traveling-wave electrode ($4b^{(4)}$, $4c^{(4)}$, $4b^{(6)}$ and $4c^{(6)}$; $4b^{(18)}$, $4c^{(18)}$, $4b^{(20)}$ and $4c^{(20)}$; and $4b^{(21)}$, $4c^{(21)}$, $4b^{(23)}$ and $4c^{(23)}$) are symmetrical with respect to the center axis of the center conductor 4a, and thus serve as a nearly symmetrical electrode structure for high-frequency electrical signal. It will be appreciated that the void sections 11b and 11c may be formed to the very edge of the interaction section in the longitudinal direction. In other words, even though the structure is not strictly symmetrical, as long as the main elements are nearly symmetrical, it is still referable to the present invention.

In addition, as shown in FIG. 31 of the ninth embodiment, in the structure where the coupling ground conductors are disposed at symmetrical positions with respect to the center line VI, the coupling ground conductors $4b^{(26)}$ and $4c^{(26)}$ may be shifted in the longitudinal direction of the interaction optical waveguides 3a and 3b.

While the Mach-Zehnder optical waveguide is used as an example of a branching optical waveguide, the present invention can be applied to other optical waveguides of branching and multiplexing types such as a directional coupler. The concept can also be applied to the optical waveguides of three or more pieces and a phase modulator having a single optical waveguide. When applied to the phase modulator, the single piece of optical waveguide and the traveling-wave electrode become symmetrical with respect to the center line of the center conductor. As for the method of forming the optical waveguides, other than the Ti thermal diffusion method, various forming methods of optical waveguides such as a proton-exchange method may be used. As for the buffer layer, various materials other than $SiO_2$ such as $Al_2O_3$ may be used.

While the z-cut LN substrate has been descried, LN substrates of other plane directions such as an x-cut and a y-cut may be used, and substrates of different materials such as a lithium tantalate substrate or even a semiconductor substrate may also be used. Further, while the electrode has been described as a traveling-wave electrode, since a lumped parameter electrode may be used in principle, the scope of the traveling-wave electrode in the present invention also includes the lumped parameter electrode.

In addition, while each of the recessed sections is normally formed with nearly the same width, when the recessed section close to the circumference section is etched to be quite wide (as the height of the circumference section comes to nearly the same as the bottom portion of the recessed section), it is still referable to the present invention since the widely etched portion can be regarded as a practical circumference section.

Tenth Embodiment

Figure 34:
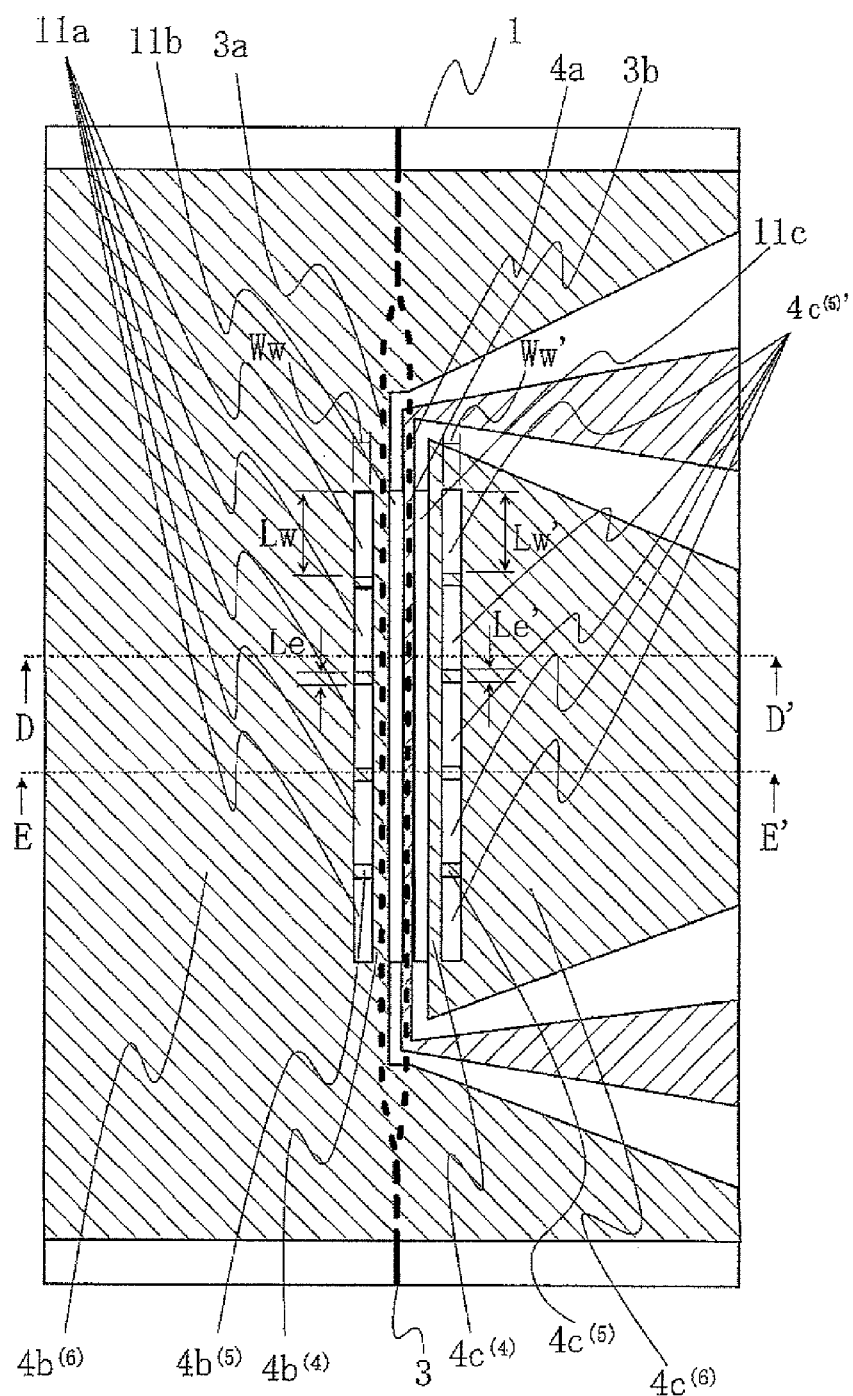
FIG. 34 is a top view schematically illustrating the structure of an optical modulator according to a tenth embodiment of the present invention.
Figure 35:
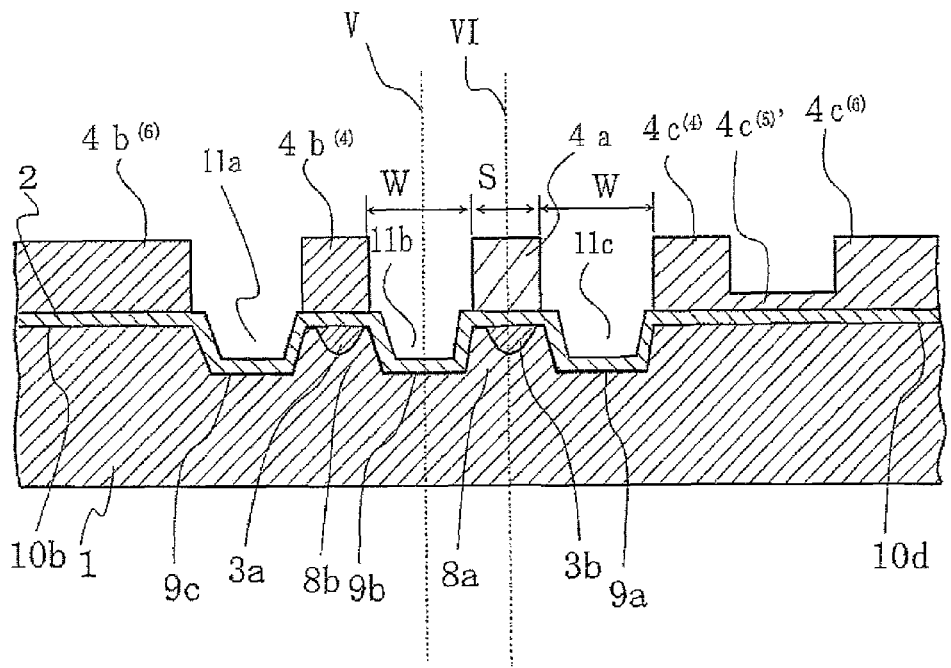
FIG. 35 is a cross-sectional view taken along the line D-D' shown in FIG. 34.
Figure 36:
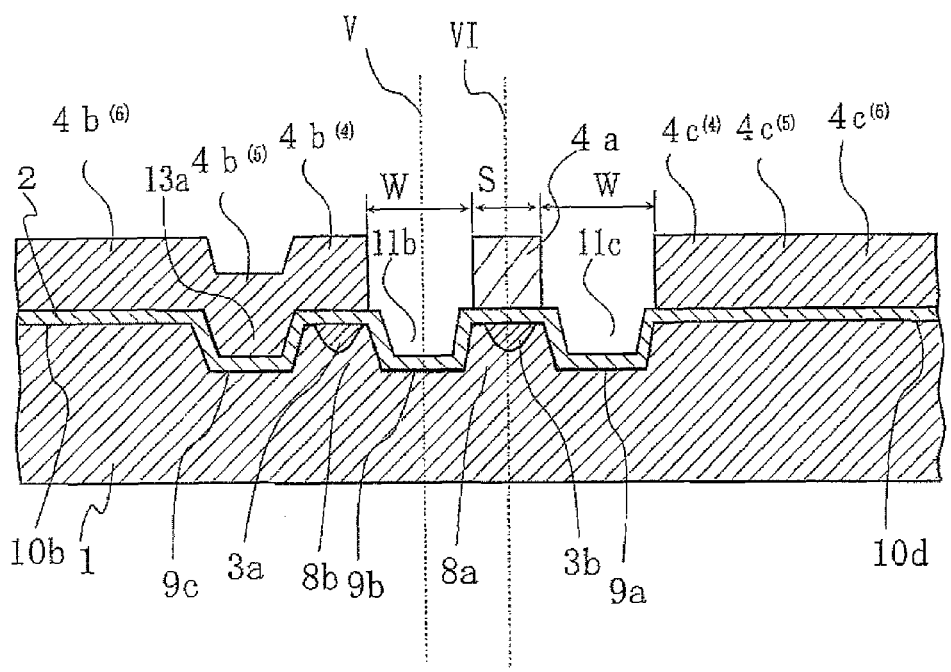
FIG. 36 is a cross-sectional view taken along the line E-E' shown in FIG. 34.

FIG. 34 is a top view illustrating a tenth embodiment of the present invention. FIGS. 35 and 36 show respective cross-sectional views taken along the lines D-D' and E-E' shown in FIG. 34. Reference numerals 11a, 11b and 11c represent void sections. Reference numerals $4b^{(4)}$, $4b^{(5)}$, $4b^{(6)}$, $4c^{(4)}$, $4c^{(5)}$, $4c^{(5)}$, and $4c^{(6)}$ represent ground conductors.

The thicknesses of the ground conductor $4b^{(5)}$ and the ground conductor $4c^{(5)}$ are large, hence they are also called as thick ground conductors, while the thickness of the ground conductor $4c(5)'$ is small, hence it is also called as a thin ground conductor. Reference numerals 10b and 10d represent the sections of the ground conductors where the strength of high-frequency electrical signal is small and are referred to as circumference sections. Reference numerals 8a and 8b represent ridge sections.

The thick ground conductor $4b^{(5)}$ couples the ground conductors $4b^{(4)}$ and $4b^{(6)}$, and the thick ground conductor $4c^{(5)}$ and the thin ground conductor $4c^{(5)"}$ couple the ground conductors $4c^{(4)}$ and $4c^{(6)}$ (the ground conductor $4b^{(5)}$ and the ground conductor $4c^{(5)}$ of large thicknesses are also called as thick coupling ground conductors and the ground conductor $4c^{(5)"}$ of a small thickness is also called as a thin coupling ground conductor).

In the tenth embodiment, in order to prevent the influence of the skin effect of high-frequency electrical signal, the thicknesses of the ground conductors $4b^{(5)}$ and $4c^{(5)}$ that are the coupling ground conductors are made to be large. Further, while the thickness of the thin ground conductor $4c^{(5)"}$ is set to be small, e.g. 50 to 500 nm, so that the temperature drift becomes substantially small, the thin ground conductor $4c^{(5)"}$ is structured with Au that is a low electrical resistance material. Consequently, comparing to the case where Au is missing in those sections, the propagation loss of high-frequency electrical signal becomes smaller. It will be appreciated that above values of the thickness of the thin ground conductor $4c^{(5)"}$ are examples and are not limited to such.

The reference numerals 10b and 10d represent the sections of the ground conductors where the strength of high-frequency electrical signal is small and are referred to as circumference sections. The reference numerals 8a and 8b represent ridge sections. The void section 11a is the section where the conductor is missing in the ground conductor (or a window opened in the ground conductor). A reference numeral 13a represents an embedded section where the void section 11a is embedded with the ground conductor $4b^{(5)}$.

Underneath the ground conductors $4c^{(5)}$ and $4c^{(6)}$ on the side where the interaction optical waveguide is not formed, the recessed section is not formed. In FIG. 35, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the optical waveguides (or the ridge sections). As described earlier, the ridge sections 8a and 8b have slant sections (the side surfaces of the ridge sections 8a and 8b are also called as slant surfaces as described earlier) where the distribution of electrical charges caused by the pyroelectric effect differs from those of the bottom surfaces of the recessed sections 9a, 9b and 9c and the upper surface of the z-cut LN substrate 1.

The important matter in the tenth embodiment is that, in terms of the interaction optical waveguides 3a and 3b, the recessed sections 9a, 9b and 9c including those slant surfaces are structured to be symmetrical with respect to the center line V. Consequently, the distribution of electrical charges, i.e. the distribution of electrical field, caused by the pyroelectric effect also becomes symmetrical with respect to the center line V, thereby achieving extremely stable characteristics in temperature drift in response to the changes in surroundings.

Meanwhile, at a lower portion of each of the ground conductors, even when the symmetry of the interaction optical waveguides 3a and 3b is broken by making an additional recessed section in the area where the influence to temperature drift is small, it is still considered referable to the present invention since it is a modification made in the area not influencing the temperature drift. While the number of recessed sections shown in FIGS. 35 and 36 is three, as long as the structure remains to be symmetrical with respect to the center line provided in the center of the two pieces of interaction optical waveguides, the provision of more pieces of recessed sections is still referable to the present invention. It will be appreciated that the same holds true to all of the embodiments of the present invention.

Figure 37:
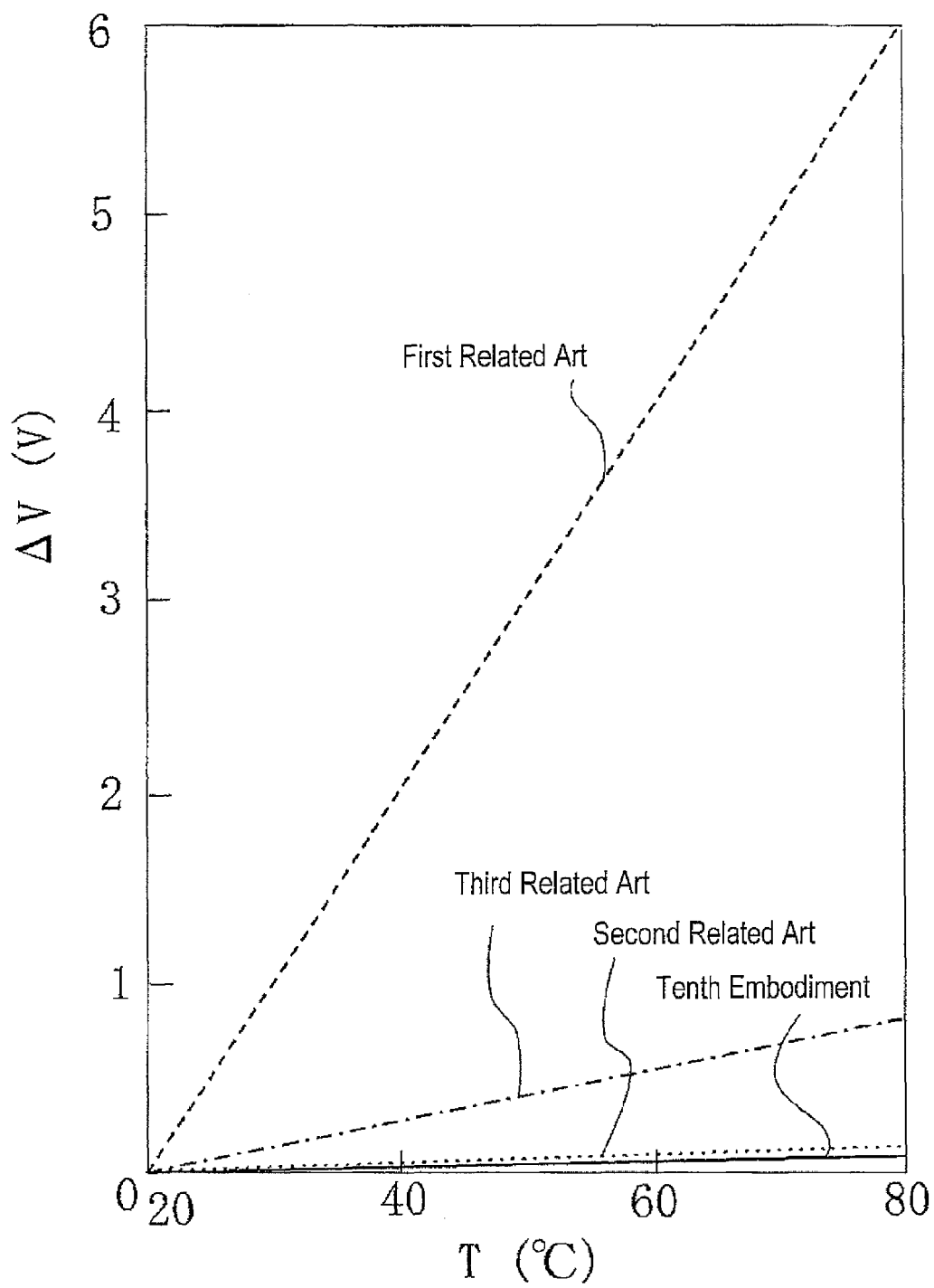
FIG. 37 is a graph illustrating characteristics of the tenth embodiment.

FIG. 37 shows the results of experiment of the tenth embodiment when the ambient temperature T is changed from 20 to 80 degrees Celsius. For the purpose of comparisons, the graph also shows the measurement results of the first, second and third examples in related art. Here, the width S of the center conductor 4a was set to 7 μm, and the gap W between the center conductor 4a and the ground conductor $4b^{(4)}$ or the ground conductor $4c^{(4)}$ was set to 15 μm. The width Ww of the void section 11a was set to 15 μm, the length Lw thereof was set to 1 mm, and the length Le of the ground conductor $4b^{(5)}$ was set to 100 μm. As will be noted from the graph, as the traveling-wave electrode is symmetrical with respect to the center line of the center conductor 4a, it was possible to reduce the temperature drift substantially less than the third example in related art which has the recessed sections 9a, 9b, 9c and 9d disposed asymmetrical with respect to the interaction optical waveguides 3a and 3b and is advantageous in terms of high-frequency optical modulation. Accordingly, the concept of the present invention was verified. While the second example in related art also has excellent characteristics in terms of temperature drift, the second example in related art has a problem in terms of the mode conversion of high-frequency electrical signal as described earlier. Note that, even when the length Lw of the void section 11a was changed from 30 μm to 3 mm and the length Le of the ground conductor $4b^{(5)}$ was changed from 5 to 500 μm, the temperature drift was efficiently reduced. It will be appreciated that the present invention is not limited to such values.

In the above description, for the sake of simplifying the description of the principle of the present invention, it is assumed that the width Ww and the length Lw of the void section 11a and the width Ww' and the length Lw' of the thin ground conductor $4c^{(5)"}$ are respectively the same, and the length Le of the ground conductor $4b^{(5)}$ and the length Le' of the ground conductor $4c^{(5)}$ are the same. However, the present invention is not limited as such. Further, the number of the void section 11a and the ground conductor $4b^{(5)}$ and the number of the thin ground conductor $4c^{(5)"}$ and the ground conductor $4c^{(5)}$ may be different from one another. This applies to all of the embodiments of the present invention. The lengths and widths of the ground conductors (the coupling ground conductors) and the void sections described above are with respect to the longitudinal direction of the interaction optical waveguides 3a and 3b.

Next, considerations will be given in terms of the distribution of electromagnetic field of high-frequency electrical signal. As the same as all the other embodiments of the present invention, the basic constituent elements of the traveling-wave electrode shown in FIGS. 34 to 36 are the center conductor 4a and the ground conductors $4b^{(4)}$, $4b^{(6)}$, $4c^{(4)}$ and $4c^{(6)}$. As will be noted from FIGS. 35 and 36, the center line VI drawn in the center of the center conductor 4a is the axis of symmetry for the traveling-wave electrode composed of the center conductor 4a and the ground conductors $4b^{(4)}$, $4b^{(6)}$, $4c^{(4)}$ and $4c^{(6)}$. Accordingly, the basic structure of the traveling-wave electrode of the tenth embodiment has a structural symmetry with respect to the center line of the center conductor 4a as the axis of symmetry. The structure of the traveling-wave electrode being symmetrical means the distribution of electromagnetic field of high-frequency electrical signal which propagates therethrough is also symmetrical. Therefore, it becomes unnecessary to convert the mode from the symmetrical mode of high-frequency electrical signal which is symmetrical at the connector and the input feed through section to the asymmetrical mode at the traveling-wave electrode which is required in the second example in related art shown in FIG. 54, thus the high-frequency electrical signal can be stably propagated with low-loss.

The effect of the present invention is exercised even when the recessed sections are not strictly symmetrical with respect to the center line V provided in the center of the interaction optical waveguides 3a and 3b. The widths of the ground conductors $4b^{(4)}$ and $4c^{(4)}$ may differ from that of the center conductor 4a by the amount of a few micrometers. Thus the recessed sections including the above difference are regarded as symmetrical (or substantially symmetrical) with respect to the center line V provided in the center of the interaction optical waveguides 3a and 3b. Further, the effect of the present invention can be exercised even when the structure of the traveling-wave electrode is not strictly symmetrical with respect to the center line VI. The same applies to all of the embodiments of the present invention.

As described above, in the tenth embodiment, by making the structure relating to the interaction optical waveguides symmetrical with respect to the center line V provided in the center of the two pieces of interaction optical waveguides and making the basic structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

As described in the foregoing, the center line VI drawn in the center of the center conductor 4a is the axis of symmetry with respect to the center conductor 4a and the ground conductors $4b(4)$, $4b(6)$, $4c(4)$ and $4c(6)$ that are the basic structure of the traveling-wave electrode. In terms of the symmetry of basic structure of traveling-wave electrode being important, for example, in FIG. 35, a thin coupling ground conductor that couples the ground conductor $4b(4)$ and the ground conductor $4b(6)$ may be provided in place of the void section 11a, and a void section may be provided in place of the thin ground conductor $4c(5)'$. More specifically, in FIG. 35, with the center line of the center conductor 4a as the axis of symmetry, the structure may have the void section 11a and the thin ground conductor $4c(5)'$ switched around. The concept in that the placement of the thin coupling ground conductor and the void section may be switched around (in other words, the left and right structures of the traveling-wave electrode with respect to the center line VI drawn in the center of the center conductor 4a may be switched around) applies to all of the embodiments of the present invention.

Eleventh Embodiment

Figure 38:
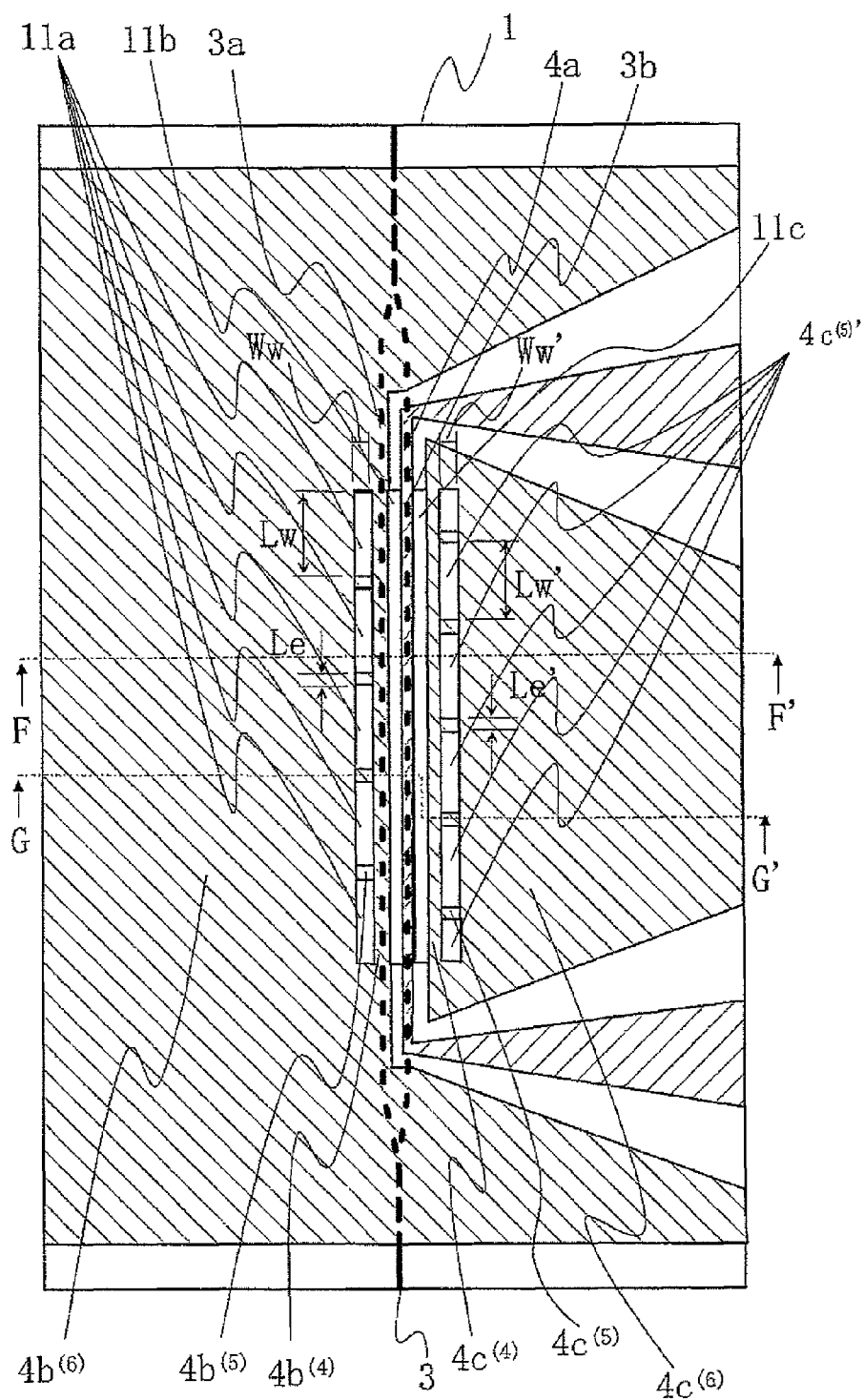
FIG. 38 is a top view schematically illustrating the structure of an optical modulator according to an eleventh embodiment of the present invention.

FIG. 38 is a top view illustrating an eleventh embodiment of the present invention. As will be noted in comparison with the tenth embodiment as shown in FIG. 34, in the eleventh embodiment, a void section 11a and a thin coupling ground conductor $4c^{(5)"}$ or thick coupling ground conductors $4b^{(5)}$ and $4c^{(5)}$ are shifted against one another in a direction of the interaction optical waveguides, thus the respective cross-sectional views taken along the lines F-F' and G-G' are the same as those shown in FIGS. 35 and 36.

As shown in the eleventh embodiment, the concept in that the constituent elements of an electrode such as the void sections and the coupling ground conductors of the traveling-wave electrode may be shifted in the longitudinal direction of the interaction optical waveguides 3a and 3b with respect to the center line VI of the center conductor 4a applies to all of the embodiments of the present invention. The constituent elements of the electrode that may be shifted in the longitudinal direction of the interaction optical waveguides 3a and 3b mean, in the eleventh embodiment for example, the void section 11a and the thin coupling ground conductor $4c^{(5)"}$ or the thick coupling ground conductors $4b^{(5)}$ and $4c^{(5)}$. However, the present invention is not limited to those in the eleventh embodiment, and includes void sections, thick coupling ground conductors, thin coupling ground conductors, or the like.

In the eleventh embodiment, as the same as the other embodiments of the present invention, the placement of the void section 11a and the thin coupling ground conductor $4c^{(5)"}$ shown in FIG. 38 may be switched around. More specifically, as described in the tenth embodiment, the structure may have the thin coupling ground conductor $4c^{(5)"}$ and the void section 11a switched around with respect to the center line VI of the center conductor 4a.

Twelfth Embodiment

Figure 39:
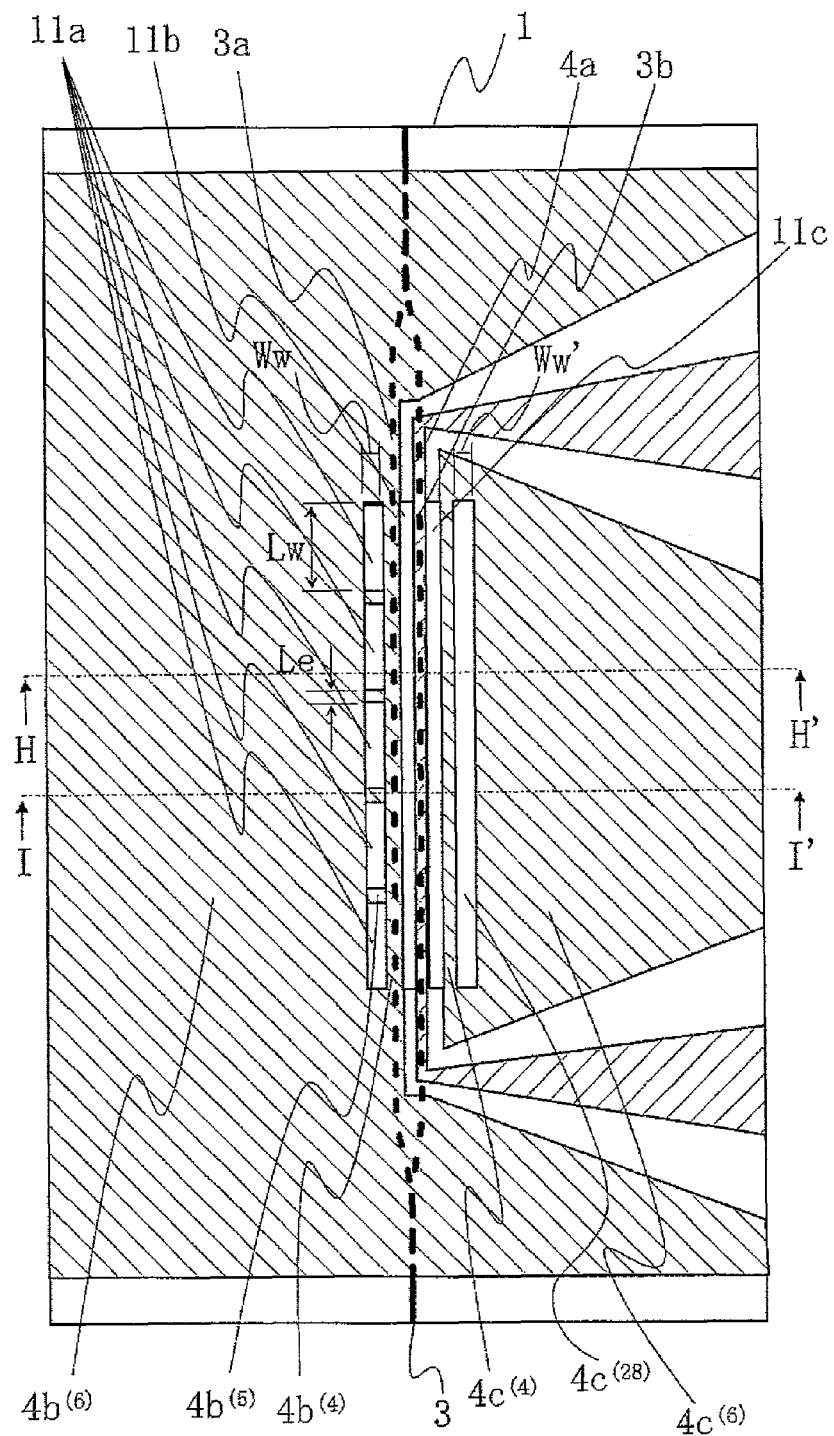
FIG. 39 is a top view schematically illustrating the structure of an optical modulator according to a twelfth embodiment of the present invention.
Figure 40:
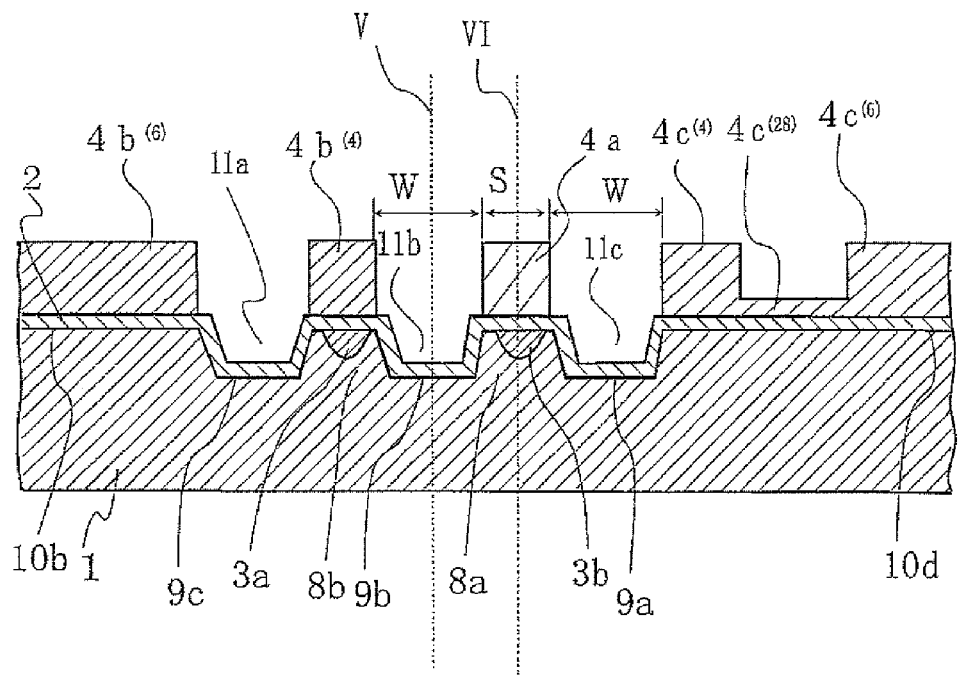
FIG. 40 is a cross-sectional view taken along the line H-H' shown in FIG. 39.
Figure 41:
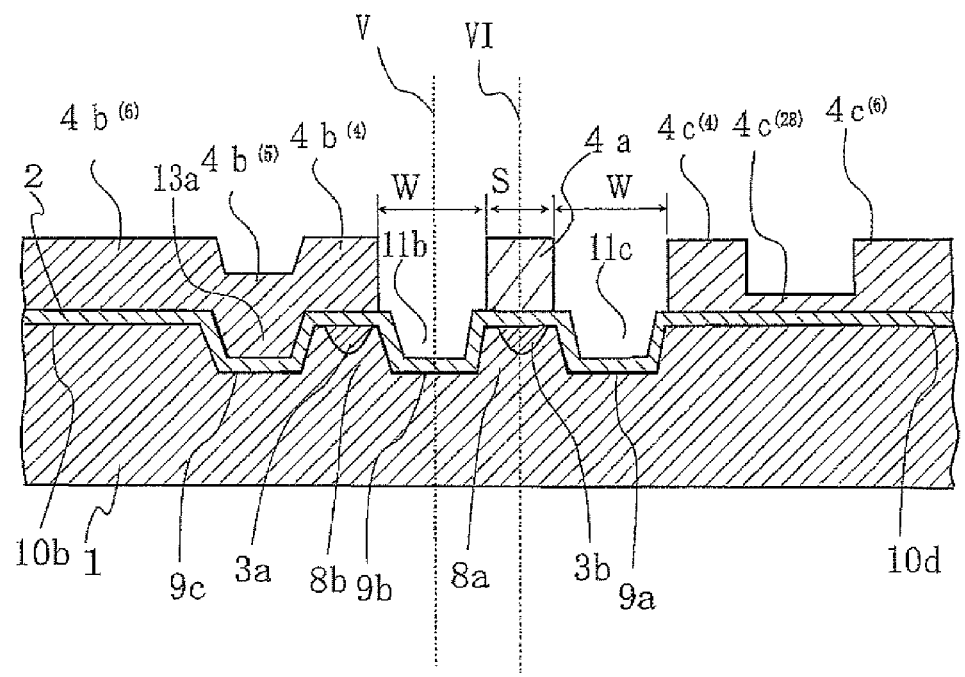
FIG. 41 is a cross-sectional view taken along the line I-I' shown in FIG. 39.

FIG. 39 is a top view illustrating a twelfth embodiment of the present invention. FIGS. 40 and 41 show respective cross-sectional views taken along the lines H-H' and I-I' shown in FIG. 39. Reference numeral 11a represents a void section as the same as that of the tenth embodiment. Reference numerals $4b^{(4)}$, $4b^{(5)}$, $4b^{(6)}$, $4c^{(4)}$, $4c^{(6)}$ and $4c^{(28)}$ represent ground conductors. The ground conductor $4b^{(5)}$ couples the ground conductors $4b^{(4)}$ and $4b^{(6)}$, and the ground conductor $4c^{(28)}$ couples the ground conductors $4c^{(4)}$ and $4c^{(6)}$ (the ground conductor $4b^{(5)}$ and the ground conductor $4c^{(28)}$ are also called as coupling ground conductors). Reference numerals 10b and 10d represent circumference sections. Reference numerals 8a and 8b represent ridge sections. The void section 11a is the section where the conductor is missing in the ground conductor (or a window opened in the ground conductor).

In FIGS. 40 and 41, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the interaction optical waveguides 3a and 3b. As described earlier, the ridge sections 8a and 8b have slant sections (the side surfaces or slant surfaces of the ridge sections 8a and 8b) where the distribution of electrical charges caused by the pyroelectric effect differs from those of the bottom surfaces of the recessed sections 9a, 9b and 9c and the upper surface of the z-cut LN substrate 1. In the twelfth embodiment, in terms of the interaction optical waveguides 3a and 3b, since the recessed sections 9a, 9b and 9c including such slant sections are structured to be symmetrical with respect to the center line V, the distribution of electrical charges by the pyroelectric effect, i.e. the distribution of electrical field, is also symmetrical with respect to the center line V, thus the temperature drift in response to the changes in surroundings becomes extremely stable.

Next, similar to the tenth embodiment, considerations will be given in terms of the distribution of electromagnetic field of high-frequency electrical signal. As the same as all the other embodiments of the present invention, the basic constituent elements of the traveling-wave electrode shown in FIGS. 39 to 41 are the center conductor 4a and the ground conductors $4b^{(4)}$, $4b^{(6)}$, $4c^{(4)}$ and $4c^{(6)}$. As will be noted from FIGS. 40 and 41, the center line VI drawn in the center of the center conductor 4a is the axis of symmetry for the traveling-wave electrode composed of the center conductor 4a and the ground conductors $4b^{(4)}$, $4b^{(6)}$, $4c^{(4)}$ and $4c^{(6)}$. Accordingly, since the basic structure of traveling-wave electrode of the twelfth embodiment has a structural symmetry with respect to the center line of the center conductor 4a as the axis of symmetry, comparing to the second example in related art shown in FIG. 54 which does not have a structural symmetry, the symmetrical electromagnetic field at the connector and the input feed through section can be stably propagated with low loss.

As described above, in the twelfth embodiment, by making the structure relating to the interaction optical waveguides and the ridge sections symmetrical with respect to the center line V provided in the center of the two pieces of interaction optical waveguides and making the basic structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

However, as will be noted in comparison with the drawings shown in FIGS. 36 and 41, the thickness of the coupling ground conductor $4c^{(28)}$ shown in FIG. 41 is smaller than that of the coupling ground conductor $4c^{(5)}$ shown in FIG. 36, thus it is somewhat less advantageous for fast optical modulation in terms of the skin effect.

As described in the tenth embodiment, the center line VI drawn in the center of the center conductor 4a is the axis of symmetry with respect to the center conductor 4a and the ground conductors $4b^{(4)}$, $4b^{(6)}$, $4c^{(4)}$ and $4c^{(6)}$ that are the basic structure of the traveling-wave electrode. In terms of the symmetry of basic structure of traveling-wave electrode being important, for example, in FIG. 40, a thin coupling ground conductor that couples the ground conductors $4b^{(4)}$ and $4b^{(6)}$ may be provided in place of the void section 11a, and a void section may be provided in place of the thin ground conductor $4c^{(28)}$, and in FIG. 41, the placement of the thick coupling ground conductor $4b^{(5)}$ and the thin coupling ground conductor $4c^{(28)}$ may be switched around. In other words, in FIGS. 40 and 41, the left and right constituent elements of the electrode may be switched around with respect to the center line VI (note that, in FIG. 41, even when the left and right constituent elements of the traveling-wave electrode are switched around, the structure is the same as the original one).

Thirteenth Embodiment

Figure 42:
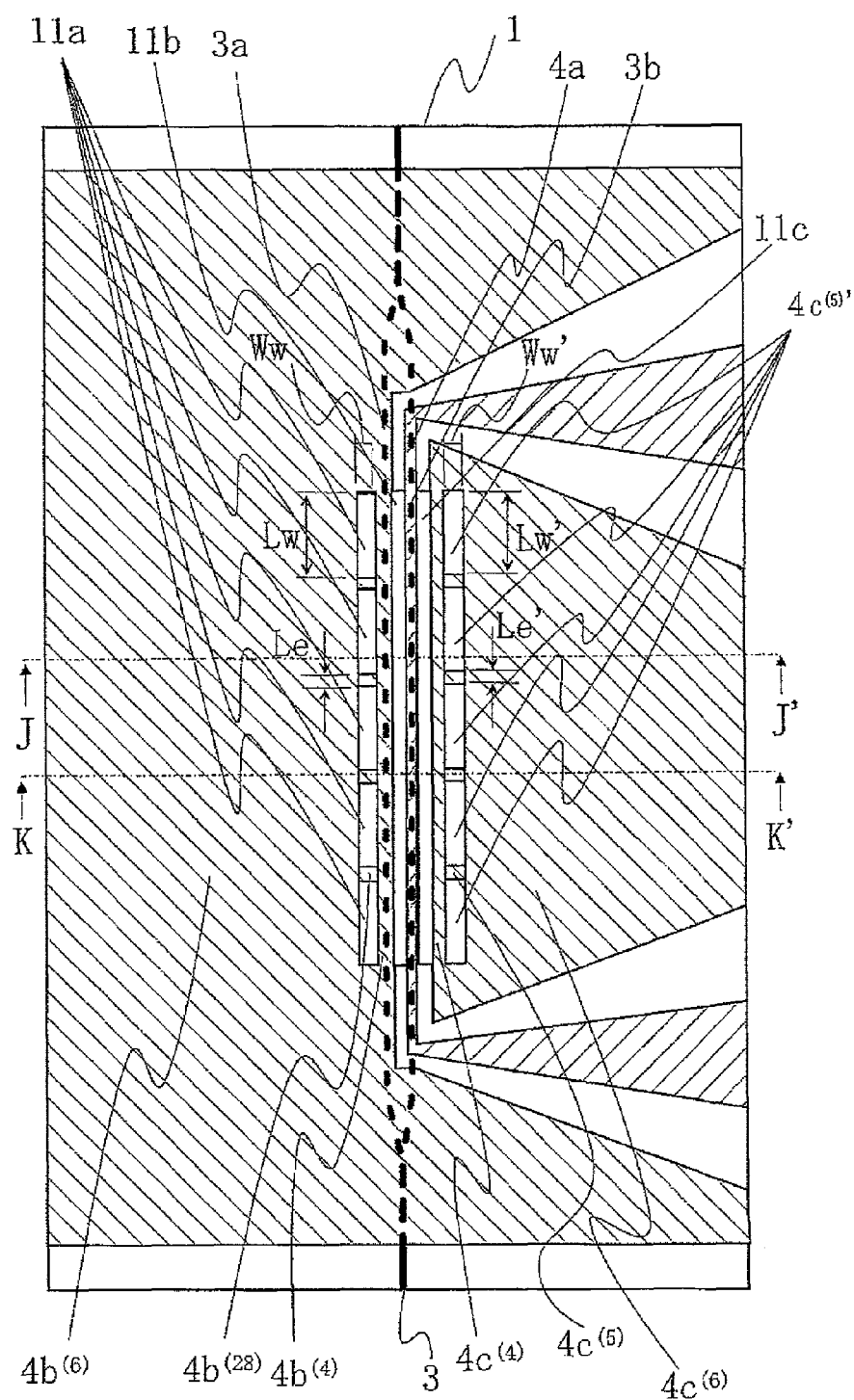
FIG. 42 is a top view schematically illustrating the structure of an optical modulator according to a thirteenth embodiment of the present invention.
Figure 43:
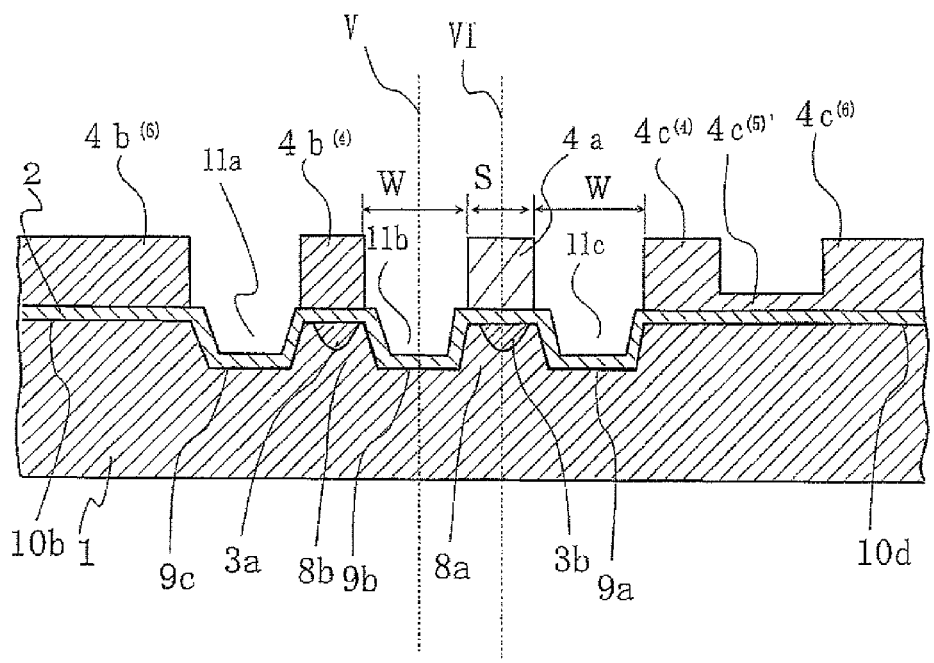
FIG. 43 is a cross-sectional view taken along the line J-J' shown in FIG. 42.
Figure 44:
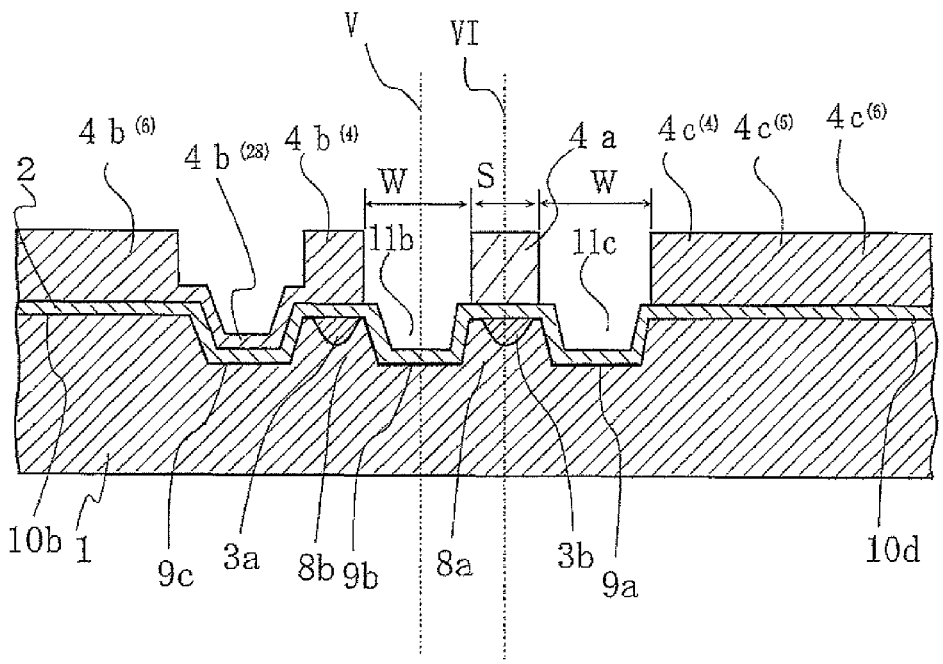
FIG. 44 is a cross-sectional view taken along the line K-K' shown in FIG. 42.

FIG. 42 is a top view illustrating a thirteenth embodiment of the present invention. FIGS. 43 and 44 show respective cross-sectional views taken along the lines J-J' and K-K' shown in FIG. 42. A reference numeral 11a represents a void section as the same as that of the tenth embodiment. Reference numerals $4b^{(4)}$, $4b^{(6)}$, $4b^{(28)}$, $4c^{(4)}$, $4c^{(5)}$, $4c^{(5)}$' and $4c^{(6)}$ represent ground conductors. The thin ground conductor $4b^{(28)}$ couples the ground conductors $4b^{(4)}$ and $4b^{(6)}$, and the thick ground conductor $4c^{(5)}$ and the thin ground conductor $4b^{(5)}$' couple the ground conductors $4c^{(4)}$ and $4c^{(6)}$ (the thin ground conductor $4b^{(28)}$, and the thick ground conductor $4c^{(5)}$ and the ground conductor $4c^{(5)}$' are also called as coupling ground conductors). Reference numerals 10b and 10d represent circumference sections. Reference numerals 8a and 8b represent ridge sections. The void section 11a is the section where the conductor is missing in the ground conductor (or a window opened in the ground conductor).

In FIGS. 43 and 44, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the interaction optical waveguides 3a and 3b. As described earlier, the ridge sections 8a and 8b have slant sections (the side surfaces or slant surfaces of the ridge sections 8a and 8b) where the distribution of electrical charges caused by the pyroelectric effect differs from those of the bottom surfaces of the recessed sections 9a, 9b and 9c and the upper surface of the z-cut LN substrate 1. In the thirteenth embodiment, in terms of the interaction optical waveguides 3a and 3b, since the recessed sections 9a, 9b and 9c including such slant sections are structured to be symmetrical with respect to the center line V, the distribution of electrical charges by the pyroelectric effect, i.e. the distribution of electrical field, is also symmetrical with respect to the center line V, thus the temperature drift in response to the changes in surroundings becomes extremely stable.

Next, in the same manner as the tenth embodiment, considerations will be given in terms of the distribution of electromagnetic field of high-frequency electrical signal. As the same as all the other embodiments of the present invention, the basic constituent elements of the traveling-wave electrode shown in FIGS. 42 to 44 are the center conductor 4a and the ground conductors $4b^{(4)}$, $4b^{(6)}$, $4c^{(4)}$ and $4c^{(6)}$. As will be noted from FIGS. 43 and 44, the center line VI drawn in the center of the center conductor 4a is the axis of symmetry for the traveling-wave electrode composed of the center conductor 4a and the ground conductors $4b^{(4)}$, $4b^{(6)}$, $4c^{(4)}$ and $4c^{(6)}$. Accordingly, since the basic structure of the traveling-wave electrode of the thirteenth embodiment has a structural symmetry with respect to the center line of the center conductor 4a as the axis of symmetry, comparing to the second example in related art shown in FIG. 54 which does not have a structural symmetry, the symmetrical electromagnetic field at the connector and the input feed through section can be stably propagated with low loss.

As described above, in the thirteenth embodiment, by making the structure relating to the interaction optical waveguides and the ridge sections symmetrical with respect to the center line V provided in the center of the two pieces of interaction optical waveguides and making the basic structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

However, as will be noted in comparison with the drawings shown in FIGS. 36 and 44, the thickness of the coupling ground conductor $4b^{(28)}$ shown in FIG. 44 is smaller than that of the coupling ground conductor $4b^{(5)}$ shown in FIG. 36, thus it is somewhat less advantageous for fast optical modulation in terms of the skin effect.

As described in the tenth embodiment, the center line VI drawn in the center of the center conductor 4a is the axis of symmetry with respect to the center conductor 4a and the ground conductors $4b^{(4)}$, $4b^{(6)}$, $4c^{(4)}$ and $4c^{(6)}$ that are the basic structure of the traveling-wave electrode. In terms of the symmetry of basic structure of traveling-wave electrode being important, for example, in FIG. 43, a thin coupling ground conductor that couples the ground conductor $4b^{(4)}$ and the ground conductor $4b^{(6)}$ may be provided in place of the void section 11a, and a void section may be provided in place of the thin ground conductor $4c^{(28)}$, and in FIG. 44, the placement of the thick coupling ground conductor $4b^{(5)}$ and the thin coupling ground conductor $4c^{(28)}$ may be switched around. In other words, in FIGS. 43 and 44, the left and right constituent elements of the electrode may be switched around with respect to the center line VI.

Further, in the thirteenth embodiment, similar to the eleventh embodiment shown in FIG. 38, it will be appreciated that the void section 11a and the thin coupling ground conductor $4c^{(5)}$', and the thick coupling ground conductors $4b^{(28)}$ and $4c^{(5)}$ may be shifted against one another in the direction of the interaction optical waveguides 3a and 3b.

Fourteenth Embodiment

Figure 45:
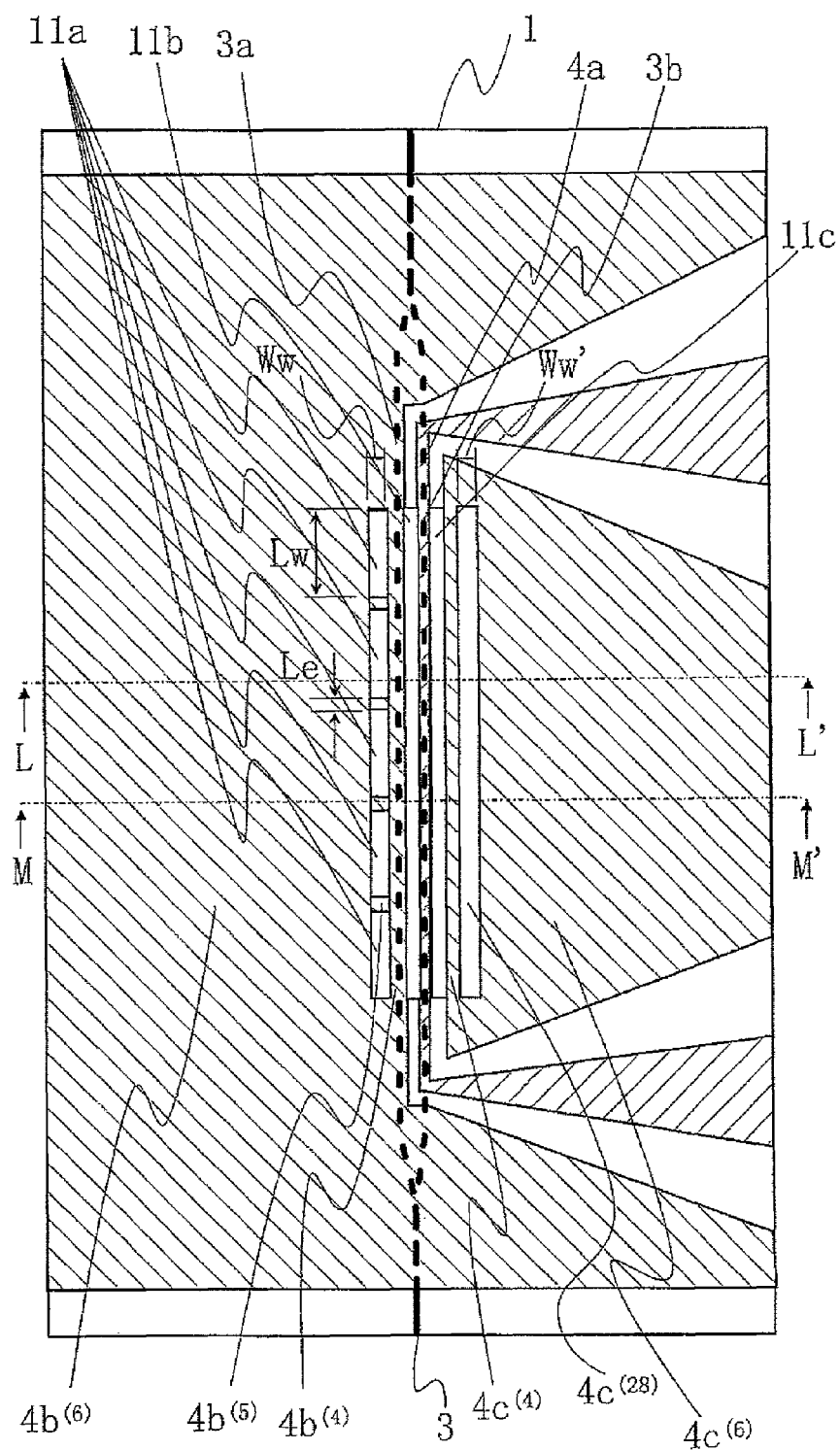
FIG. 45 is a top view schematically illustrating the structure of an optical modulator according to a fourteenth embodiment of the present invention.
Figure 46:
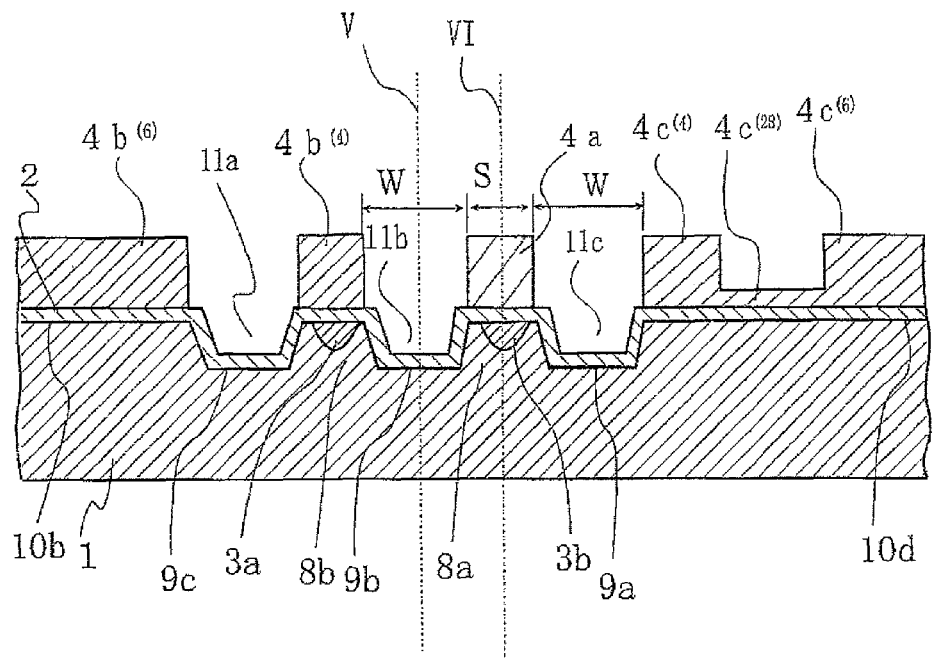
FIG. 46 is a cross-sectional view taken along the line L-L' shown in FIG. 45.
Figure 47:
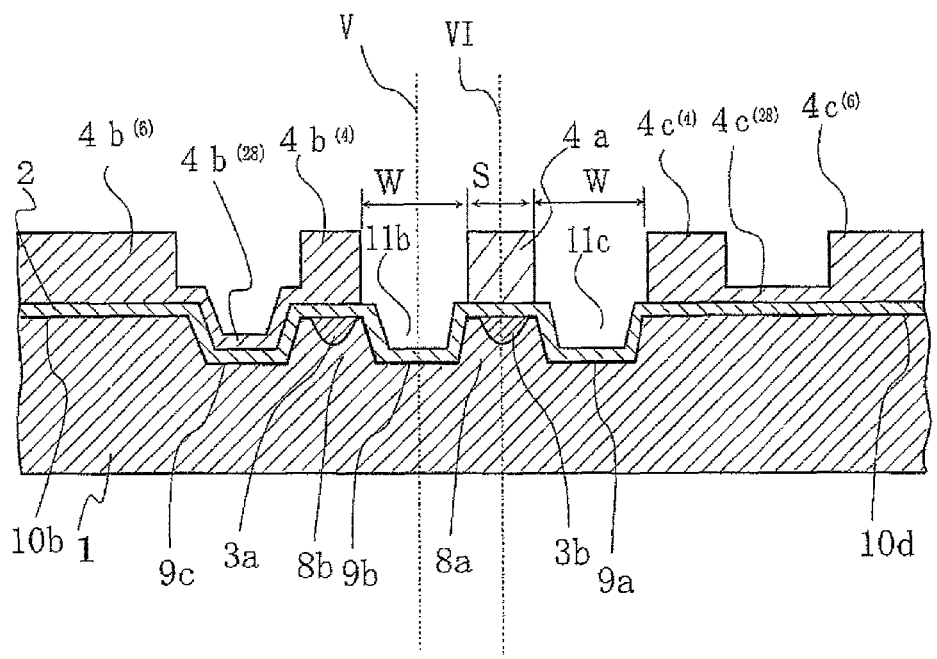
FIG. 47 is a cross-sectional view taken along the line M-M' shown in FIG. 45.

FIG. 45 is a top view illustrating a fourteenth embodiment of the present invention. FIGS. 46 and 47 show respective cross-sectional views taken along the lines L-L' and M-M' shown in FIG. 45. Reference numeral 11a represents a void section as the same as that of the tenth embodiment. Reference numerals $4b^{(4)}$, $4b^{(6)}$, $4b^{(28)}$, $4c^{(4)}$, $4c^{(6)}$ and $4c^{(28)}$ represent ground conductors. The ground conductor $4b^{(28)}$ couples the ground conductors $4b^{(4)}$ and $4b^{(6)}$, and the ground conductor $4c^{(28)}$ couples the ground conductors $4c^{(4)}$ and $4c^{(6)}$ (the ground conductor $4b^{(28)}$ and the ground conductor $4c^{(28)}$ are also called as coupling ground conductors). Reference numerals 10b and 10d represent circumference sections. Reference numerals 8a and 8b represent ridge sections. The void section 11a is the section where the conductor is missing in the ground conductor (or a window opened in the ground conductor).

In FIGS. 46 and 47, the line V is the center line provided in the center of the interaction optical waveguides 3a and 3b, and the interaction optical waveguides 3a and 3b (or the ridge sections 8a and 8b or the recessed sections 9a, 9b and 9c) are structured to be symmetrical with respect to the center line V. Therefore, the line V is the axis of symmetry for the interaction optical waveguides 3a and 3b. As described in the foregoing, the ridge sections 8a and 8b have slant sections (the side surfaces or slant surfaces of the ridge sections 8a and 8b) where the distribution of electrical charges caused by the pyroelectric effect differs from those of the bottom surfaces of the recessed sections 9a, 9b and 9c and the upper surface of the z-cut LN substrate 1. In the fourteenth embodiment, in terms of the interaction optical waveguides 3a and 3b, since the recessed sections 9a, 9b and 9c including such slant sections are structured to be symmetrical with respect to the center line V, the distribution of electrical charges by the pyroelectric effect, i.e. the distribution of electrical field, is also symmetrical with respect to the center line V, and thus the temperature drift in response to the changes in surroundings becomes extremely stable.

Next, in the same manner as the tenth embodiment, considerations will be given in terms of the distribution of electromagnetic field of high-frequency electrical signal. As the same as all the other embodiments of the present invention, the basic constituent elements of the traveling-wave electrode shown in FIGS. 45 to 47 are the center conductor 4a and the ground conductors $4b^{(4)}$, $4b^{(6)}$, $4c^{(4)}$ and $4c^{(6)}$. As will be noted from FIGS. 46 and 47, the center line VI drawn in the center of the center conductor 4a is the axis of symmetry for the basic constituent elements of the traveling-wave electrode composed of the center conductor 4a and the ground conductors $4b^{(4)}$, $4b^{(6)}$, $4c^{(4)}$ and $4c^{(6)}$. Accordingly, since the basic structure of the traveling-wave electrode of the fourteenth embodiment has a structural symmetry with respect to the center line of the center conductor 4a as the axis of symmetry, comparing to the second example in related art shown in FIG. 54 which does not have a structural symmetry, the symmetrical electromagnetic field at the connector and the input feed through section can be stably propagated with low loss.

As described above, in the fourteenth embodiment, by making the structure relating to the interaction optical waveguides and the ridge sections symmetrical with respect to the center line V provided between the two pieces of interaction optical waveguides and making the basic structure relating to the traveling-wave electrode symmetrical with respect to the center line VI of the center conductor, comparing to the cases without having their structural symmetry, the temperature drift in response to the changes in ambient temperature is reduced, the mode of high-frequency electrical signal is stabilized, and the high-frequency electrical signal is propagated with low loss.

However, as will be noted in comparison with the drawings shown in FIGS. 46 and 47, the thicknesses of the coupling ground conductor $4c^{(28)}$ shown in FIG. 46 and the coupling ground conductor $4b^{(28)}$ shown in FIG. 47 are made to be small, thus it is somewhat less advantageous for fast optical modulation in terms of the skin effect.

As described in the tenth embodiment, the center line VI drawn in the center of the center conductor 4a is the axis of symmetry with respect to the center conductor 4a and the ground conductors $4b^{(4)}$, $4b^{(6)}$, $4c^{(4)}$ and $4c^{(6)}$ that are the basic structure of the traveling-wave electrode. In terms of the symmetry of basic structure of traveling-wave electrode being important, for example, in FIG. 46, a thin coupling ground conductor coupling the ground conductors $4b^{(4)}$ and $4b^{(6)}$ may be provided in place of the void section 11a, and a void section may be provided in place of the thin ground conductor $4c^{(28)}$. In other words, in FIGS. 46 and 47, the placement of the left and right constituent elements of the traveling-wave electrode may be switched around with respect to the center line VI (note that, even when the placement of the left and right constituent elements of the traveling-wave electrode shown in FIG. 47 are switched around, the structure is the same as the original one).

Fifteenth Embodiment

Figure 48:
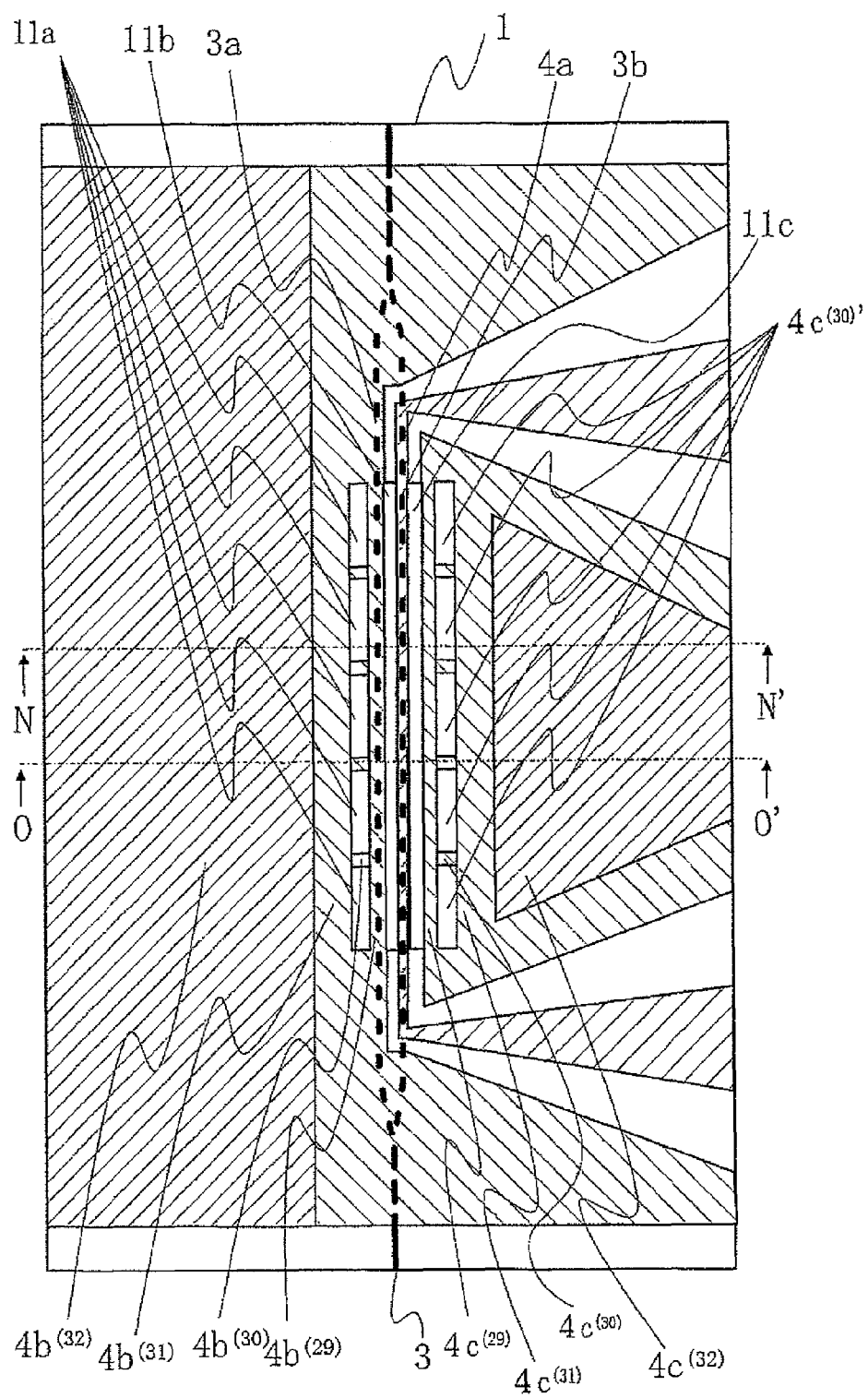
FIG. 48 is a top view schematically illustrating the structure of an optical modulator according to a fifteenth embodiment of the present invention.
Figure 49:
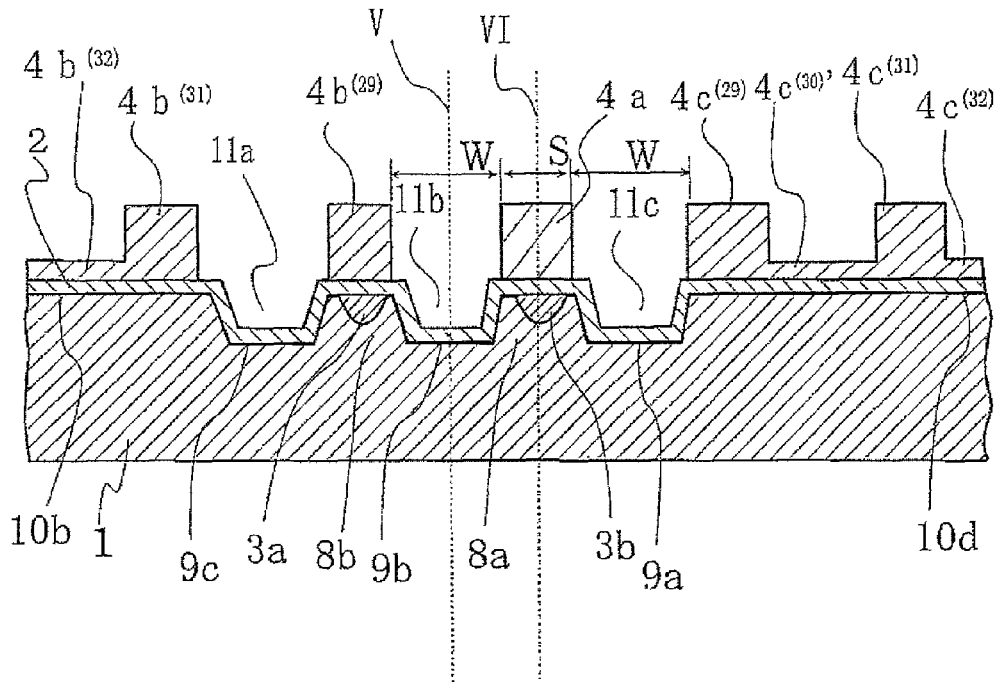
FIG. 49 is a cross-sectional view taken along the line N-N' shown in FIG. 48.
Figure 50:
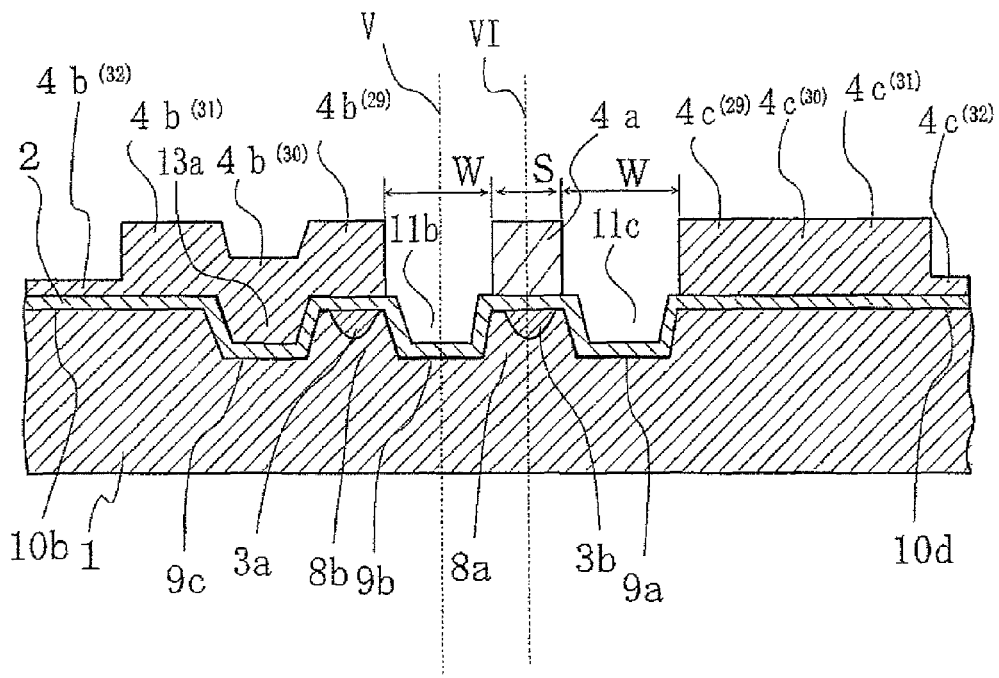
FIG. 50 is a cross-sectional view taken along the line O-O' shown in FIG. 48.

FIG. 48 is a top view illustrating a fifteenth embodiment of the present invention. FIGS. 49 and 50 show respective cross-sectional views taken along the lines N-N' and O-O' shown in FIG. 48. A reference numeral 11a represents a void section as the same as that of the tenth embodiment. Reference numerals $4b^{(29)}$, $4b^{(30)}$, $4b^{(31)}$, $4b^{(32)}$, $4c^{(29)}$, $4c^{(30)}$, $4c^{(30)}$', $4c^{(31)}$ and $4c^{(32)}$ represent ground conductors. The ground conductor $4b^{(30)}$ couples the ground conductors $4b^{(29)}$ and $4b^{(31)}$, and the ground conductors $4c^{(30)}$ and $4c^{(30)}$' couple the ground conductors $4c^{(29)}$ and $4c^{(31)}$ (the ground conductor $4b^{(30)}$ and the ground conductors $4c^{(30)}$ and $4c^{(30)}$' are also called as coupling ground conductors). Reference numerals 10b and 10d represent circumference sections. Reference numerals 8a and 8b represent ridge sections. The void section 11a is the section where the conductor is missing in the ground conductor (or a window opened in the ground conductor).

Figure 51:
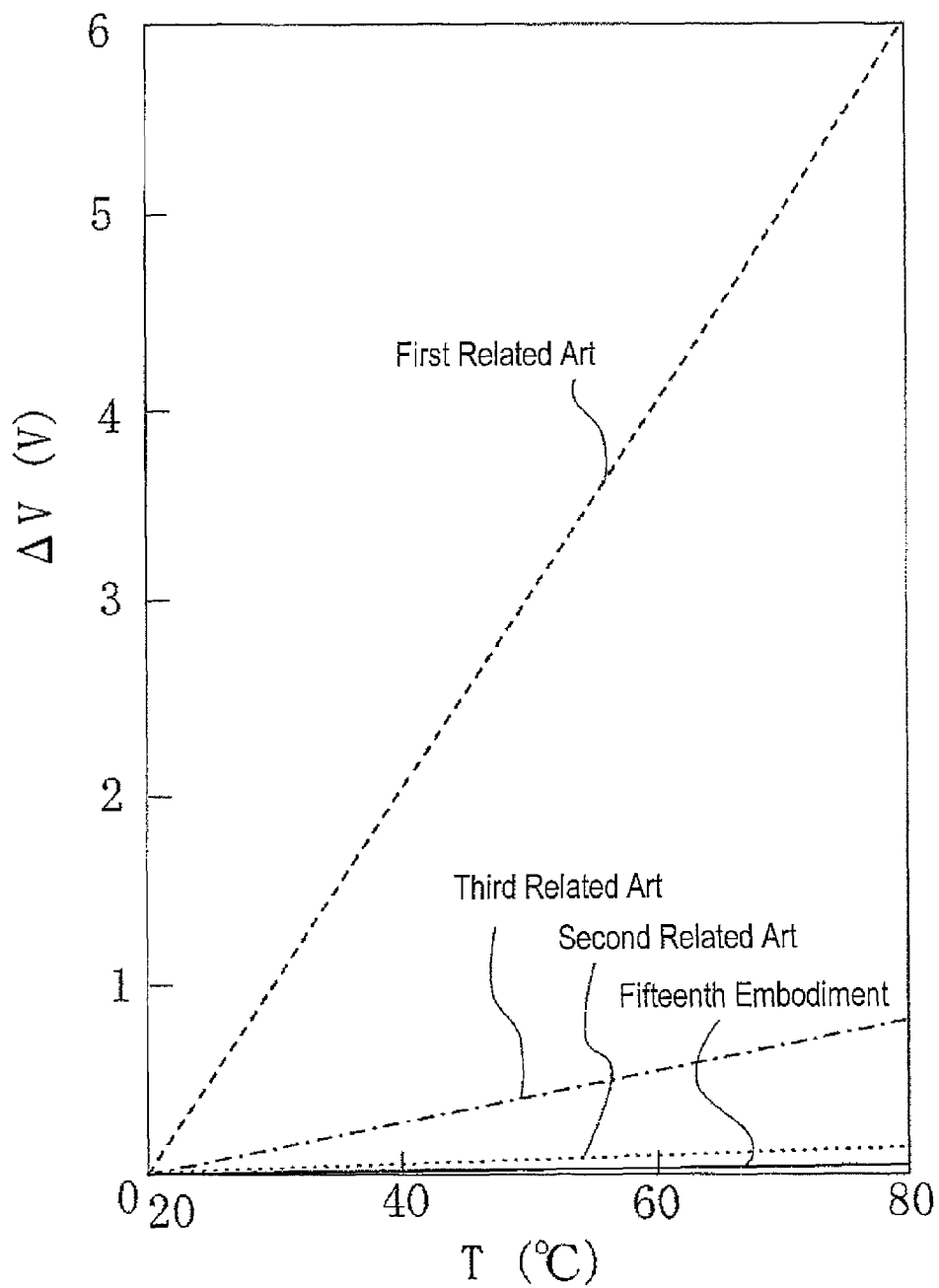
FIG. 51 is a graph illustrating characteristics of the fifteenth embodiment.
Figure 52:
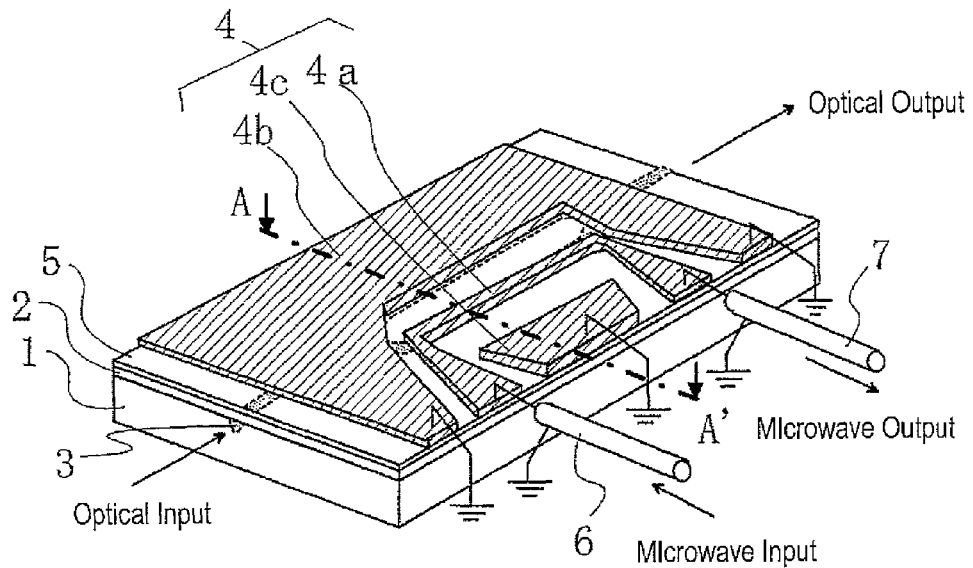
FIG. 52 is a perspective view schematically illustrating the structure of an optical modulator of a first example in related art.
Figure 53:
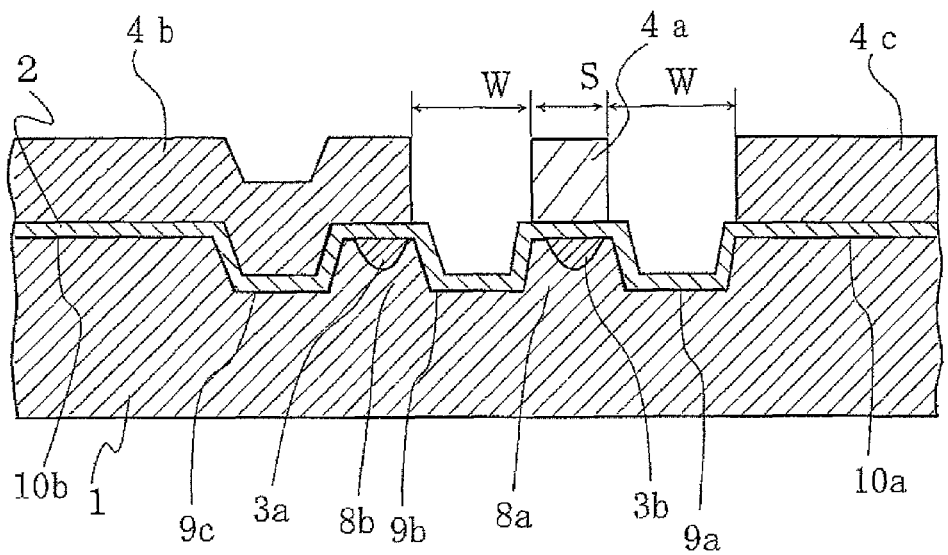
FIG. 53 is a cross-sectional view taken along the line A-A' shown in FIG. 52.

The matter highlighted in the fifteenth embodiment is that the thicknesses of the ground conductors $4b^{(32)}$ and $4c^{(32)}$ are as small as, for example, 300 nm. When the thickness of the ground conductor is large, the stress exerted to the z-cut LN substrate 1 and eventually to the ridge sections 8a and 8b due to the principle of leverage (or the stress by the moment)

becomes large. Therefore, in the fifteenth embodiment, the thickness of the ground conductor $4b^{(32)}$ in the circumference section $10b$ is made small in order to make the stress small. Furthermore, in order to further enhance the effect of the present invention, the thickness of the ground conductor $4c^{(32)}$ formed on the circumference section $10d$ is also made small. By implementing this measure, as shown in FIG. 51, the temperature drift of the DC bias corresponding to the changes in ambient temperature in the range of 20 to 80 degrees Celsius was further reduced from that of the tenth embodiment.

In the fifteenth embodiment, the thicknesses of the ground conductors $4b^{(32)}$ and $4c^{(32)}$ disposed above the circumference sections $10a$ and $10d$ were made to be small based on the tenth embodiment as an example, the concept of the fifteenth embodiment can be applied to all the other embodiments of the present invention including the eleventh to the fourteenth embodiments.

As described in the foregoing, considering the gap between the interaction optical waveguides $3a$ and $3b$ being about 15 μm, the width of the interaction section where the high-frequency electrical signal and the light passing through the interaction optical waveguides $3a$ and $3b$ interact with each other is extremely narrow comparing to the width of the z-cut LN substrate 1 (about 1 to 5 mm). Consequently, by making the thicknesses of the ground conductors $4b^{(32)}$ and $4c^{(32)}$ small, the usage amount of Au that is expensive can be substantially reduced, thereby contributing to cost reduction.

In addition, the ground conductors $4b^{(32)}$ and $4c^{(32)}$ having wide areas, although being small in thickness, make them advantageous for securely establishing an electrical earth in teens of high-frequency electrical signal and in terms of connectivity by wire or ribbon to the chassis that is the electrical earth. The same applies to all of the embodiments of the present invention.

In FIGS. 49 and 50, making the thickness of only either one of the ground conductors $4b^{(32)}$ or $4c^{(32)}$ small is still effective to some degree. Further, since the strength of electromagnetic field of high-frequency electrical signal in the circumference section is small originally, the symmetry being broken in such degree has small influence on the propagation characteristics of high-frequency electrical signal. The same applies to all of the embodiments of the present invention.

Tenth to Fifteenth Embodiments

In the present invention, while it has been described that it is desirable that the traveling-wave electrode be bilaterally symmetrical with respect to the center line of the center conductor in terms of the propagation of high-frequency electrical signal, this applies to the main structure. More specifically, in FIG. 38, although the coupling ground conductors $4b^{(5)}$ and $4c^{(5)}$ are shifted against one another in the longitudinal direction of the optical waveguides (up and down directions in the drawings in FIGS. 34, 38 and 41), the ground conductors continuing in the longitudinal direction of the center conductor $4a$ and the optical waveguides that are the basic structure of the traveling-wave electrode ($4b^{(4)}$ and $4c^{(4)}$, and $4b^{(6)}$ and $4c^{(6)}$) are symmetrical with respect to the center axis of the center conductor $4a$, and thus serve as a nearly symmetrical electrode structure for high-frequency electrical signal. It will be appreciated that the void sections $11b$ and $11c$ may be formed to the very edge of the interaction section in the longitudinal direction. In other words, even though the structure is not strictly symmetrical, as long as the main elements are nearly symmetrical, it is still referable to the present invention.

In the tenth embodiment shown in FIG. 36 and in the twelfth embodiment shown in FIG. 41, while the thicknesses of the coupling ground conductors have been described being as large as that of the center conductor, the thickness of the coupling ground conductor may not necessarily be even. When forming the coupling ground conductor in the recessed section, in particular, the thickness of the coupling ground conductor may become larger or smaller than that of the center conductor depending on conditions of process such as resist coating and plating as the electrode is formed in the area which is recessed. However, it is still considered referable to the present invention.

While the Mach-Zehnder optical waveguide is used as an example of a branching optical waveguide, the present invention can be applied to other optical waveguides of branching and multiplexing types such as a directional coupler. The concept can also be applied to the optical waveguides of three or more pieces and a phase modulator having a single optical waveguide. When applied to the phase modulator, the single piece of optical waveguide and the traveling-wave electrode become symmetrical with respect to the center line of the center conductor. As for the method of forming the optical waveguides, other than the Ti thermal diffusion method, various forming methods of optical waveguides such as proton-exchange method may be used. As for the buffer layer, various materials other than the $SiO_2$ such as $Al_2O_3$ may also be used.

While the z-cut LN substrate has been descried, LN substrates of other plane directions such as an x-cut and a y-cut may be used, and substrates of different materials such as a lithium tantalate substrate or even a semiconductor substrate may also be used. Further, while the electrode has been described as a traveling-wave electrode, since a lumped parameter electrode may be used in principle, the scope of the traveling-wave electrode in the present invention also includes the lumped parameter electrode.

In addition, while each of the recessed sections is normally formed with nearly the same width, when the recessed section close to the circumference section is etched to be quite wide (as the height of the circumference section comes to nearly the same as the bottom portion of the recessed section), it is still referable to the present invention since the widely etched portion can be regarded as a practical circumference section.

INDUSTRIAL APPLICABILITY

As described in the foregoing, the optical modulator in a high performance ridge type optical modulator according to the present invention is useful as the optical modulator that improves the temperature drift characteristics by making the structure relating to the recessed sections and the optical waveguides provided to the substrate symmetrical with respect to the center line provided in the center of the two pieces of optical waveguides, and the propagation characteristics of high-frequency electrical signal by making the structure relating to the traveling-wave electrode symmetrical with respect to the center line of the center conductor and, by making the thickness of Au small in the circumference sections, further enhances the temperature drift characteristics and achieves cost reduction.

What is claimed is:

1. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and a ridge section structured with a recessed section that is formed by carving at least a part of said substrate in an area where a strength of electrical field of high-frequency electrical signal propagating through said traveling-wave electrode is strong, wherein said ridge section includes a center conductor ridge section where said center conductor is formed in an upper portion thereof and a ground conductor ridge section where said ground conductor is formed in an upper portion thereof, said center conductor ridge section is provided with one of said two pieces of optical waveguides, and said ground conductor ridge section is provided with the other one of said two pieces of optical waveguides, said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section, said ground conductor is not provided above said first recessed section and said second recessed section, one portion of said ground conductor where said ground conductor is formed and another portion of said ground conductor where said ground conductor is not formed are alternately provided above said third recessed section in a direction of said optical waveguide, and one portion of said ground conductor where said ground conductor is formed and another portion of said ground conductor where said ground conductor is not formed are alternately provided above said substrate adjacent to said second recessed section on a side where said center conductor ridge section does not lie and at a position symmetrical to said third recessed section with respect to a center line of said center conductor in the direction of said optical waveguide in a similar manner to said third recessed section.

2. The optical modulator set forth in claim 1, wherein said ground conductor is structured to be symmetrical with respect to the center line of said center conductor.

3. The optical modulator set forth in claim 2, wherein said ground conductor formed above said third recessed section has nearly the same thickness as that of said center conductor or at least a part of said ground conductor.

4. The optical modulator set forth in claim 2, wherein said ground conductor formed above said third recessed section has a thickness smaller than that of said center conductor.

5. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and
a ridge section structured with a recessed section that is formed by carving at least a part of said substrate in an area where a strength of electrical field of high-frequency electrical signal propagating through said traveling-wave electrode is strong, wherein
said ridge section includes a center conductor ridge section where said center conductor is formed in an upper portion thereof and a ground conductor ridge section where said ground conductor is formed in an upper portion thereof, said center conductor ridge section is provided with one of said two pieces of optical waveguides, and said ground conductor ridge section is provided with the other one of said two pieces of optical waveguides, said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section, said ground conductor is not provided above said first recessed section and said second recessed section, said ground conductor having a thickness smaller than that of said center conductor is formed above said third recessed section on an entire surface thereof, said ground conductor having a thickness smaller than that of said center conductor is formed above said substrate adjacent to said second recessed section on a side where said center conductor ridge section does not lie and at a position symmetrical to said third recessed section with respect to a center line of said center conductor on an entire surface thereof, and said ground conductor is structured to be symmetrical with respect to said center line of said center conductor.

6. The optical modulator set forth in any one of claims 2 to 5, wherein said ground conductor formed above said substrate adjacent to said third recessed section on a side where said ground conductor ridge section does not lie and in an area away from said third recessed section by a predefined distance where a strength of electromagnetic field of said high-frequency electrical signal is small is structured to have a thickness smaller than that of said ground conductor in areas other than said area.

7. The optical modulator set forth in any one of claims 2 to 5, wherein said ground conductor formed above said substrate adjacent to said second recessed section on a side where said center conductor ridge section does not lie and in an area away from said second recessed section by a predefined distance where a strength of electromagnetic field of said high-frequency electrical signal is small is structured to have a thickness smaller than that of said ground conductor in areas other than said area.

8. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and
a ridge section structured with a recessed section that is formed by carving at least a part of said substrate in an area where a strength of electrical field of high-frequency electrical signal propagating through said traveling-wave electrode is strong, wherein
said ridge section includes a center conductor ridge section where said center conductor is formed in an upper portion thereof and a ground conductor ridge section where said ground conductor is formed in an upper portion thereof, said center conductor ridge section is provided with one of said two pieces of optical waveguides, and said ground conductor ridge section is provided with the other one of said two pieces of optical waveguides, said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section, said ground conductor is not provided above said first recessed section and said second recessed section, one portion of said ground conductor formed having a thickness smaller than that of said center conductor and another portion of said ground conductor formed having nearly the same thickness as that of said center conductor or said ground conductor facing said center conductor are alternately provided above said third recessed section in a direction of said optical waveguide, and one portion of said ground conductor formed having a thickness smaller than that of said center conductor and another portion of said ground conductor formed having nearly the same thickness as that of said center conductor or said ground conductor facing said center conductor are alternately provided above said substrate adjacent to said second recessed section on a side where said center conductor ridge section does not lie and at a position symmetrical to said third recessed section with respect to a center line of said center conductor in the direction of said optical waveguide.

9. The optical modulator set forth in claim 8, wherein when one portion of said ground conductor formed above said third recessed section having a thickness smaller than that of said center conductor is defined as a first thin coupling ground conductor, another portion of said ground conductor formed above said third recessed section having nearly the same thickness as that of said center conductor or said ground conductor facing said center conductor is defined as a first thick coupling ground conductor, one portion of said ground conductor formed at a position symmetrical to said third recessed section with respect to said center line of said center conductor having a thickness smaller than that of said center conductor is defined as a second thin coupling ground conductor, and another portion of said ground conductor formed at a position symmetrical to said third recessed section with respect to said center line of said center conductor having nearly the same thickness as that of said center conductor or said ground conductor facing said center conductor is defined as a second thick coupling ground conductor, said first thin coupling ground conductor and said second thin coupling ground conductor are provided to be symmetrical with respect to said center line of said center conductor.

10. The optical modulator set forth in claim 8, wherein when one portion of said ground conductor formed above said third recessed section having a thickness smaller than that of said center conductor is defined as a first thin coupling ground conductor, another portion of said ground conductor formed above said third recessed section having nearly the same thickness as that of said center conductor or said ground conductor facing said center conductor is defined as a first thick coupling ground conductor, one portion of said ground conductor formed at a position symmetrical to said third recessed section with respect to said center line of said center conductor having a thickness smaller than that of said center conductor is defined as a second thin coupling ground conductor, and another portion of said ground conductor formed at a position symmetrical to said third recessed section with respect to said center line of said center conductor having nearly the same thickness as that of said center conductor or said ground conductor facing said center conductor is defined as a second thick coupling ground conductor, said first thin coupling ground conductor and said second thin coupling ground conductor are formed different from one another in at least one of position, length and width in the direction of said optical waveguide.

11. The optical modulator set forth in any one of claims 8 to 10, wherein said ground conductor formed above said substrate adjacent to said third recessed section on a side where said ground conductor ridge section does not lie and in an area away from said third recessed section by a predefined distance where a strength of electromagnetic field of said high-frequency electrical signal is small is structured to have a thickness smaller than that of said ground conductor in areas other than said area.

12. The optical modulator set forth in any one of claims 8 to 10, wherein said ground conductor formed above said substrate adjacent to said second recessed section on a side where said center conductor ridge section does not lie and in an area away from said second recessed section by a predefined distance where a strength of electromagnetic field of said high-frequency electrical signal is small is structured to have a thickness smaller than that of said ground conductor in areas other than said area.

13. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and
a ridge section structured with a recessed section that is formed by carving at least a part of said substrate in an area where a strength of electrical field of high-frequency electrical signal propagating through said traveling-wave electrode is strong, wherein
said ridge section including a center conductor ridge section where said center conductor is formed in an upper portion thereof and a ground conductor ridge section where said ground conductor is formed in an upper portion thereof, said center conductor ridge section is provided with one of said two pieces of optical waveguides, and said ground conductor ridge section is provided with the other one of said two pieces of optical waveguides,
said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section,
said ground conductor is not provided above said first recessed section and said second recessed section,
one portion of said ground conductor where said ground conductor is formed as a first coupling ground conductor and another portion of said ground conductor where said ground conductor is not formed as a first void section are alternately provided above said third recessed section in a direction of said optical waveguide,
one portion of said ground conductor where said ground conductor is formed as a second coupling ground conductor and another portion of said ground conductor where said ground conductor is not formed as a second void section are alternately provided above said substrate adjacent to said second recessed section on a side where said center conductor ridge section does not lie and at a position symmetrical to said third recessed section with respect to a center line of said center conductor in the direction of said optical waveguide, and at least a part of said first void section and said second void section of said ground conductor is formed different from one another in at least one of position, length and width in the direction of said optical waveguide.

14. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and
a ridge section structured with a recessed section that is formed by carving at least a part of said substrate in an area where a strength of electrical field of high-frequency electrical signal propagating through said traveling-wave electrode is strong, wherein said ridge section includes a center conductor ridge section where said center conductor is formed in an upper portion thereof and a ground conductor ridge section where said ground conductor is formed in an upper portion thereof, said center conductor ridge section is provided with one of said two pieces of optical waveguides, and said ground conductor ridge section is provided with the other one of said two pieces of optical waveguides, said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section, said ground conductor is not provided above said first recessed section and said second recessed section, one portion of said ground conductor where said ground conductor is formed as a first coupling ground conductor and another portion of said ground conductor where said ground conductor is not formed as a first void section are alternately provided above said third recessed section in a direction of said optical waveguide, one portion of said ground conductor where said ground conductor is formed as a second coupling ground conductor and another portion of said ground conductor where said ground conductor is not formed as a second void section are alternately provided above said substrate adjacent to said second recessed section on a side where said center conductor ridge section does not lie and at a position symmetrical to said third recessed section with respect to a center line of said center conductor in the direction of said optical waveguide, and at least a part of said first coupling ground conductor and said second coupling ground conductor is formed different from one another in at least one of position, length, width and thickness in the direction of said optical waveguide.

15. The optical modulator set forth in claim 13 or 14, wherein said ground conductor formed above said substrate adjacent to said third recessed section on a side where said ground conductor ridge section does not lie and in an area away from said third recessed section by a predefined distance where a strength of electromagnetic field of said high-frequency electrical signal is small is structured to have a thickness smaller than that of said ground conductor in areas other than said area.

16. The optical modulator set forth in claim 13 or 14, wherein said ground conductor formed above said substrate adjacent to said second recessed section on a side where said center conductor ridge section does not lie and in an area away from said second recessed section by a predefined distance where a strength of electromagnetic field of said high-frequency electrical signal is small is structured to have a thickness smaller than that of said ground conductor in areas other than said area.

17. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and
a ridge section structured with a recessed section that is formed by carving at least a part of said substrate in an area where a strength of electrical field of high-frequency electrical signal propagating through said traveling-wave electrode is strong, wherein said ridge section includes a center conductor ridge section where said center conductor is formed in an upper portion thereof and a ground conductor ridge section where said ground conductor is formed in an upper portion thereof, said center conductor ridge section is provided with one of said two pieces of optical waveguides, and said ground conductor ridge section is provided with the other one of said two pieces of optical waveguides, said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section, said ground conductor is not provided above said first recessed section and said second recessed section, one portion of said ground conductor where said ground conductor is formed as a coupling ground conductor and another portion of said ground conductor where said ground conductor is not formed as a void section are alternately provided above either one of said third recessed section or said substrate adjacent to said second recessed section on a side where said center conductor ridge section does not lie and at a position symmetrical to said third recessed section with respect to a center line of said center conductor in a direction of said optical waveguide, and one portion of said ground conductor formed having a thickness smaller than that of said center conductor and another portion of said ground conductor formed having nearly the same thickness as that of said center conductor or said ground conductor facing said center conductor are alternately provided above the other one of said third recessed section or said substrate adjacent to said second recessed section on a side where said center conductor ridge section does not lie and at a position symmetrical to said third recessed section with respect to the center line of said center conductor in the direction of said optical waveguide.

18. An optical modulator, comprising:
a substrate having an electro-optical effect;
two pieces of optical waveguides formed in said substrate;
a buffer layer formed on said substrate;
a traveling-wave electrode composed of a center conductor and a ground conductor disposed above said buffer layer; and
a ridge section structured with a recessed section that is formed by carving at least a part of said substrate in an area where a strength of electrical field of high-frequency electrical signal propagating through said traveling-wave electrode is strong,
said ridge section including a center conductor ridge section where said center conductor is formed in an upper portion thereof and a ground conductor ridge section where said ground conductor is formed in an upper portion thereof, one of said two pieces of optical waveguides being formed in said center conductor ridge section, and the other one of said two pieces of optical waveguides being formed in said ground conductor ridge section, wherein
said recessed section includes a first, a second and a third recessed sections, said second recessed section and said third recessed section are formed at symmetrical positions with respect to a center line of said first recessed section, said center conductor ridge section is formed between said first recessed section and said second recessed section, said ground conductor ridge section is formed between said first recessed section and said third recessed section,
said ground conductor is not provided above said first recessed section and said second recessed section,
one portion of said ground conductor where said ground conductor is formed as a coupling ground conductor and another portion of said ground conductor where said ground conductor is not formed as a void section are alternately provided above either one of said third recessed section or said substrate adjacent to said second recessed section on a side where said center conductor ridge section does not lie and at a position symmetrical to said third recessed section with respect to a center line of said center conductor in a direction of said optical waveguide, and
said ground conductor formed having a thickness smaller than that of said center conductor is provided above the other one of said third recessed section or said substrate adjacent to said second recessed section on a side where said center conductor ridge section does not lie and at a position symmetrical to said third recessed section with respect to the center line of said center conductor on an entire surface thereof.

19. The optical modulator set forth in claim 17 or 18, wherein said coupling ground conductor has nearly the same thickness as that of said center conductor or at least a part of said ground conductor.

20. The optical modulator set forth in claim 17 or 18, wherein said coupling ground conductor has a thickness smaller than that of said center conductor.

21. The optical modulator set forth in claim 17 or 18, wherein said ground conductor formed above said substrate adjacent to said third recessed section on a side where said ground conductor ridge section does not lie and in an area away from said third recessed section by a predefined distance where a strength of electromagnetic field of said high-frequency electrical signal is small is structured to have a thickness smaller than that of said ground conductor in areas other than said area.

22. The optical modulator set forth in claim 17 or 18, wherein said ground conductor formed above said substrate adjacent to said second recessed section on a side where said center conductor ridge section does not lie and in an area away from said second recessed section by a predefined distance where a strength of electromagnetic field of said high-frequency electrical signal is small is structured to have a thickness smaller than that of said ground conductor in areas other than said area.

* * * * *